United States Patent
Yamaguchi et al.

(10) Patent No.: US 7,046,461 B2
(45) Date of Patent: May 16, 2006

(54) OPTICAL COMPONENT POSITIONING JIG AND MANUFACTURING APPARATUS OF OPTICAL DEVICE

(75) Inventors: Hideo Yamaguchi, Matsumoto (JP); Masashi Kitabayashi, Horigane-mura (JP); Hidetoshi Hashizume, Hotaka-machi (JP); Shohei Fujisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 24 days.

(21) Appl. No.: 10/793,839

(22) Filed: Mar. 8, 2004

(65) Prior Publication Data

US 2005/0030648 A1    Feb. 10, 2005

(30) Foreign Application Priority Data

| Mar. 10, 2003 | (JP) | ............................. 2003-063087 |
| Mar. 10, 2003 | (JP) | ............................. 2003-063121 |
| Apr. 18, 2003 | (JP) | ............................. 2003-114145 |

(51) Int. Cl.
    *G02B 7/02*    (2006.01)
(52) U.S. Cl. ....................................... 359/819; 359/822
(58) Field of Classification Search ............... 359/819, 359/821–824, 827
    See application file for complete search history.

(56) References Cited

U.S. PATENT DOCUMENTS

| 5,056,891 | A  | * | 10/1991 | Masunaga .................... 359/813 |
| 6,377,407 | B1 | * | 4/2002  | Susuki et al. ................ 359/814 |
| 6,741,406 | B1 | * | 5/2004  | Kitamura et al. ............ 359/819 |
| 2003/0179472 | A1 | * | 9/2003 | Schaefer et al. ............. 359/819 |
| 2004/0103421 | A1 | * | 5/2004 | Nakata et al. ............... 720/689 |
| 2005/0063254 | A1 | * | 3/2005 | Yabuki et al. ............ 369/13.12 |

FOREIGN PATENT DOCUMENTS

| JP | A 3-264835   | 11/1991 |
| JP | A 2001-100335 | 4/2001 |
| JP | A 2002-31843  | 1/2002 |
| JP | A 2003-57529  | 2/2003 |

* cited by examiner

*Primary Examiner*—Jordan Schwartz
*Assistant Examiner*—Jessica Stultz
(74) *Attorney, Agent, or Firm*—Oliff & Berridge, PLC

(57) ABSTRACT

A manufacturing apparatus (100) of an optical unit includes an optical component positioning jig (300) that has a plurality of holders for holding a plurality of optical components and is positioned at a designed predetermined position of the plurality of optical component, and a table (200) that holds an optical component casing so that a part of the optical component positioning jig (300) can be inserted into an opening formed on the optical component casing.

12 Claims, 37 Drawing Sheets

FIG.24
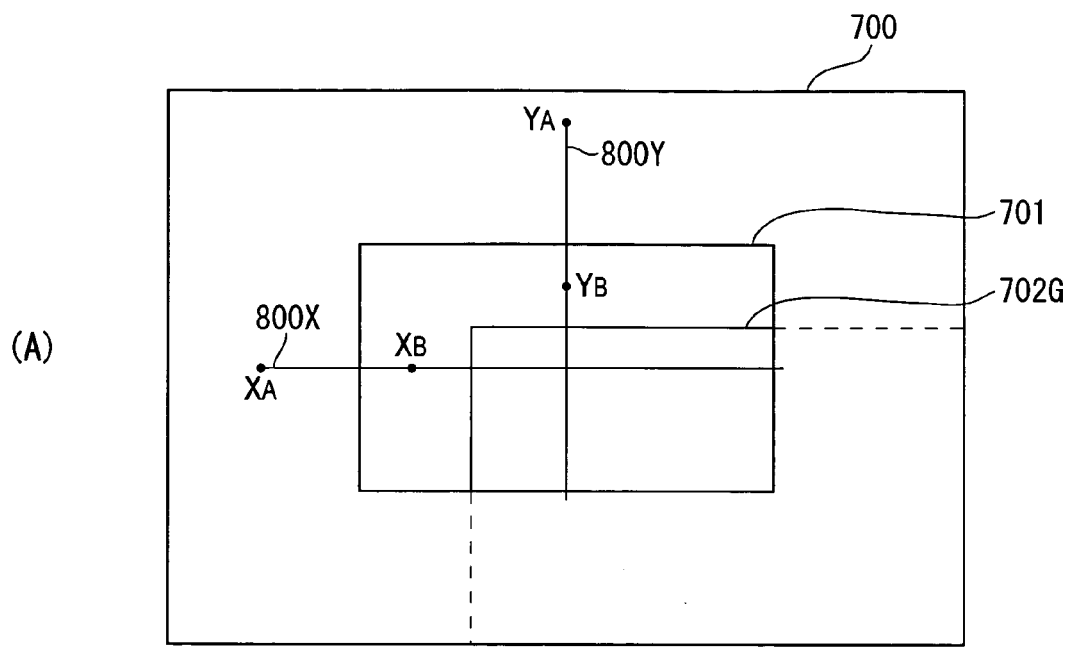
(A)
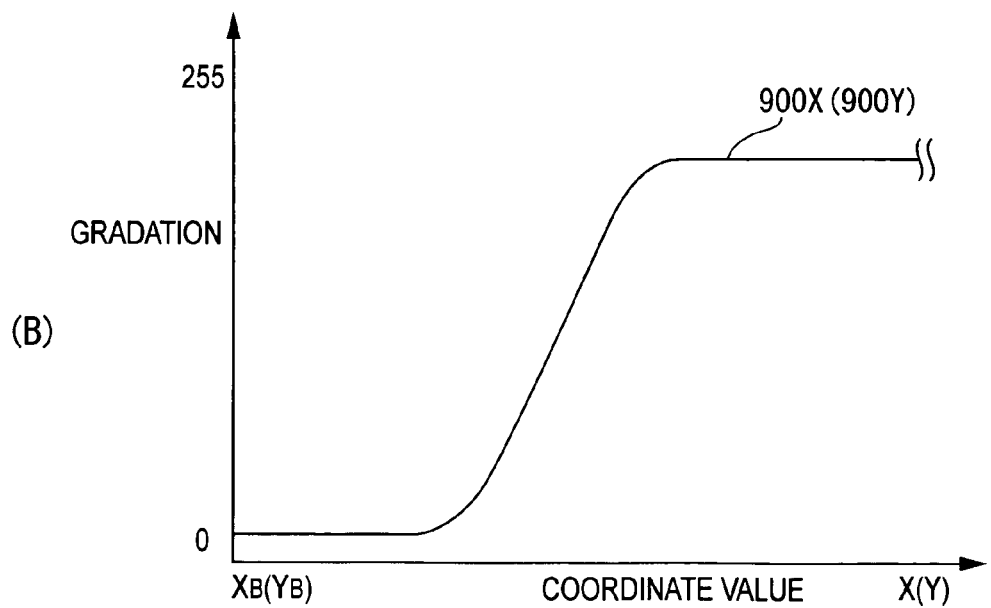
(B)

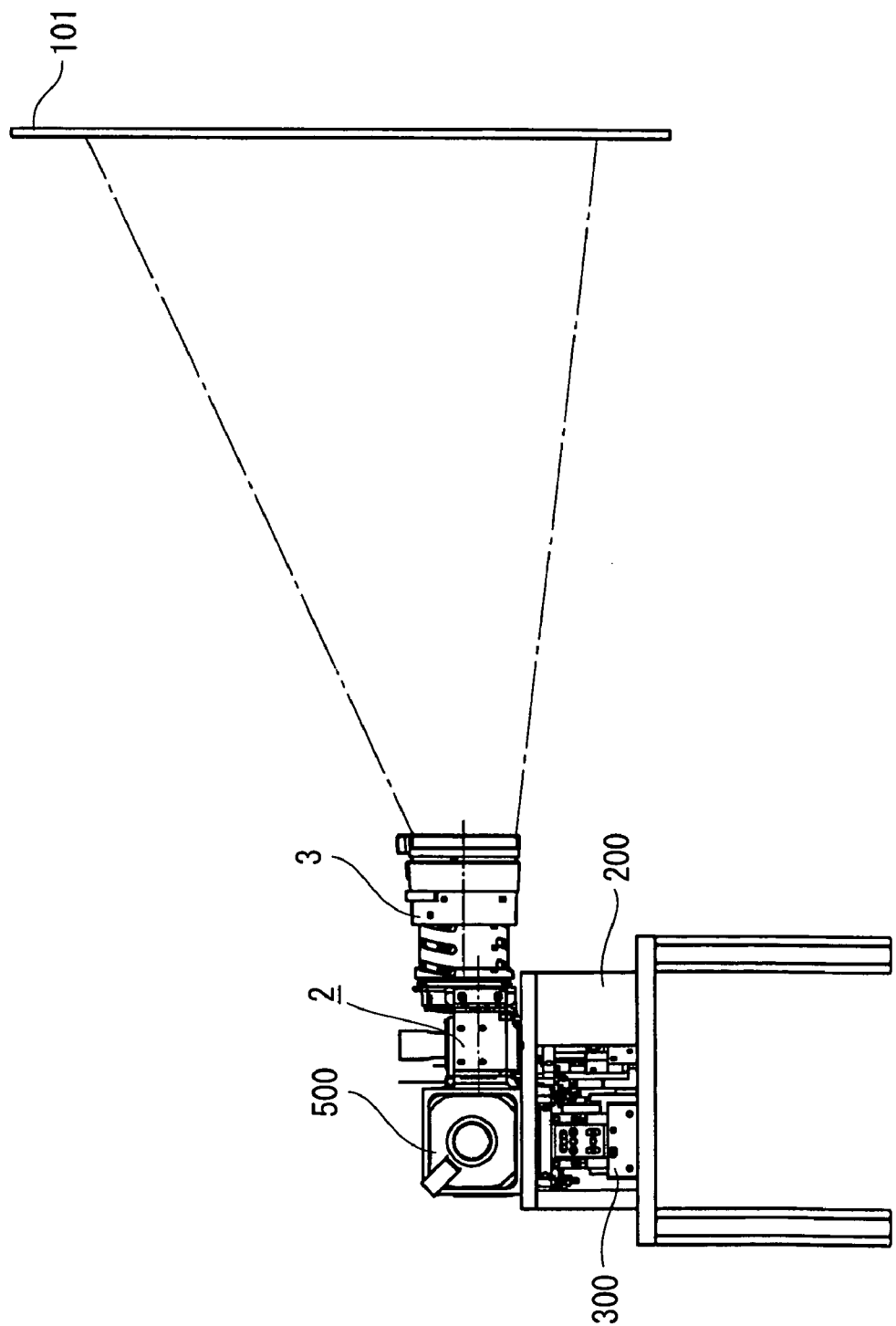

OPTICAL COMPONENT POSITIONING JIG AND MANUFACTURING APPARATUS OF OPTICAL DEVICE

TECHNICAL FIELD

The present invention relates to an optical component positioning jig and a manufacturing apparatus of an optical device.

BACKGROUND ART

Conventionally, a projector that makes an optical modulator to modulate a light beam irradiated by a light source in accordance with image information and form an optical image and projects the optical image in an enlarged manner has been known (for example, refer to Patent Publication 1 (JP2002-31843A)).

The projector includes an optical device that mainly consists of: optical components such as a lens for superposing the light beam irradiated by the light source on an image formation area of the optical modulator, a dichroic mirror for separating the light beam irradiated by the light source into three color lights (R, G and B) and a reflection mirror for conducting the light beam irradiated by the light source to the optical modulator; and an optical component casing in which the optical components are housed and arranged at predetermined positions on an illumination optical axis of the light beam irradiated by the light source.

The optical component casing, which is a synthetic resin molding product manufactured by molding such as injection molding, has a groove formed on an inner side thereof to engage with each optical component.

In manufacturing the optical device, each optical component is slid from the upper side and fitted into the groove to be engaged therewith, and thus housed and arranged therein. That is, the groove formed on the inner side of the optical component casing serves as an external position reference of the optical component.

In the above-described manufacturing method of the optical device, although the optical component can easily be housed and arranged on the optical component casing, the groove formed on the inner side of the optical component casing requires to be highly accurately formed. Accordingly, since a molding die for the optical component casing needs to be a complicated profile and to be highly accurately manufactured, the production cost of the optical component casing may be increased, and consequently, the production cost of the optical device may be increased.

An object of the present invention is to provide an optical component positioning jig and a manufacturing apparatus of an optical device that can reduce the production cost and can easily be manufactured.

DISCLOSURE OF THE INVENTION

According to the present invention, an optical component positioning jig positions optical components at predetermined positions on an optical component casing to manufacture an optical device including: the plurality of optical components arranged on an optical path of a light beam irradiated by a light source; and the optical component casing in which an illumination optical axis of the light beam is set and the optical components are housed and arranged at the predetermined positions on the illumination optical axis, and the optical component positioning jig includes: a plurality of holders for holding the plurality of optical components, and in which the plurality of holders are arranged at designed predetermined positions of the plurality of optical components.

In the present invention, the holder included in the optical component positioning jig holds the optical components, so that the plurality of optical components are positioned at the designed predetermined positions. Accordingly, as compare to the conventional optical component casing having an external position reference face therein and requiring highly accurate manufacturing, the accuracy need not to be so high. Thus, the production cost of the optical component casing can be reduced, and consequently, the production cost of the optical device can be reduced. The plurality of optical components can easily be positioned by the holder, and accordingly the optical device can easily be manufactured.

In the optical component positioning jig according to the present invention, it is preferable that at least one of the plurality of holders abuts on an outer periphery of the optical component and has a support face as an external position reference face for the optical component.

According to the present invention, since at least one of the plurality of holders has the support face as the external position reference face for the optical component, the periphery of the optical component abuts on the support face and thus the optical component can easily be positioned.

The optical component positioning jig according to the present invention, it is preferable that an intake hole capable of sticking the outer periphery of the optical component thereto is formed on the support face.

According to the present invention, since the intake hole is formed on the support face, the outer periphery of the optical component can surely abut on the support face by intake of air through the intake hole and thus the optical component can highly accurately be positioned.

For example, when the optical component positioning jig holds the optical component from the upper side of the optical component, the optical component can surely be held by the intake of air thorough the intake hole.

The optical component positioning jig according to the present invention preferably includes an attitude adjuster that changes the position of at least one of the plurality of holders to adjust the attitude of the optical component held by the holder.

According to the present invention, since the optical component positioning jig includes the attitude adjuster, the position of the optical component can be adjusted by operating the attitude adjuster when the plurality of optical components are not positioned at the designed predetermined positions or when the optical component requiring the adjustment is included among the plurality of optical component.

According to the present invention, a manufacturing apparatus of an optical device manufactures an optical device including: a plurality of optical components arranged on an optical path of a light beam irradiated by a light source; and an optical component casing in which an illumination optical axis of the light beam is set and the optical components are housed and arranged at predetermined positions on the illumination optical axis, in which the optical component casing has at least one opening penetrating toward the inside thereof, and the manufacturing apparatus of the optical device includes: the above-described optical component positioning jig; and an optical component casing holder for holding the optical component casing so that a part of the optical component positioning jig can be inserted into the opening.

The optical component casing is only required to have at least one opening. For instance, the optical component casing may be a container structure or a hollow structure having a plurality of openings.

According to the present invention, since the manufacturing apparatus of the optical device includes the above-described optical component positioning jig and the optical component casing holder, the same functions and advantages as the above-described optical component positioning jig can be obtained.

The manufacturing apparatus of the optical device according to the present invention preferably includes: a light beam irradiator for conducting a light beam to the optical device; and an optical image detecting device for detecting an optical image irradiated by the light beam irradiator and passed through the plurality of optical components.

The light beam irradiator may employ the approximately the same structure of the light source device in an optical equipment equipped with the optical device.

The optical image detecting device may be configured to directly detect the optical image passed through the plurality of optical components, or may be configured to detect the optical image projected on the screen by projecting the optical image passed through the plurality of optical components on the screen in an enlarged manner. As the optical image detecting device, for example, an image pickup element such as a CCD (Charge Coupled Device), a MOS (Metal Oxide Semiconductor) sensor may be applicable.

According to the present invention, since the manufacturing apparatus of the optical device includes the light beam irradiator, the light source device in the optical equipment is unnecessary, for example. That is, it is unnecessary to use a power source and a lamp drive circuit for driving the light source device in the optical equipment, and accordingly there is no need to use a cooling mechanism for cooling the power source, the lamp drive circuit and the light source device upon driving the power source and the lamp drive circuit. Since the illuminance of the light beam irradiator can be adjusted according to the detection sensitivity of the optical image detecting device, the optical image can appropriately be detected by the optical image detecting device.

Since the manufacturing apparatus of the optical device includes the optical image detecting device, it can easily be determined whether the plurality of optical components are positioned at the designed predetermined positions based on the optical image detected by the optical image detecting device. Herein, if the optical image detecting device is configured to directly detect the optical image passed though the plurality of optical components, the screen will be unnecessary and consequently the manufacturing apparatus can be downsized as compared to the configuration for detecting the optical image projected on the screen.

In the manufacturing apparatus of the optical device according to the present invention, it is preferable that the optical component positioning jig is capable of adjusting the position of the optical component, the manufacturing apparatus including: a jig driver for driving the optical component positioning jig; and a controlling unit for controlling the jig driver, the controlling unit including: an image capture that captures an image detected by the optical image detecting device and converts the image into an image signal; a luminance acquiring unit that acquires a luminance value of the image based on the image signal output from the image capture; and an arithmetic unit that computes a position adjustment amount of the optical component based on the luminance value acquired by the luminance acquiring unit.

The controlling unit may be a PC (Personal Computer) including a CPU (Central Processing Unit) for reading and executing a control program and the like. The image capture may be a video capture board etc. that inputs a signal output from the image pickup and converts into an image signal for the PC.

According to the present invention, the image capture captures the image detected by the optical image detecting device and converts the image into the image signal. The luminance acquiring unit acquires the luminance value of the image based on the image signal captured through the image capture. The arithmetic unit computes the position adjustment amount of the optical component based on the luminance value acquired by the luminance acquiring unit. The controlling unit adjusts the position of the optical component by controllably driving the optical component positioning jig based on the position adjustment amount computed by the arithmetic unit. Accordingly, when the plurality of optical components are not positioned at the designed predetermined positions or when the optical component requiring the adjustment is included among the plurality of optical component, the positions of the optical components can be adjusted by controllably driving the optical component positioning jig based on the optical image detected by the optical image detecting device. Further, as compared to the check of the position adjustment of the optical component with eyes, ambiguity in the adjustment accuracy of the check with eyes is eliminated and the optical component can appropriately be positioned on the optical component casing.

In the manufacturing apparatus of the optical device according to the present invention, it is preferable that the controlling unit shifts the optical component to shift an illumination area of the optical image passed through the optical component by controlling the jig driver to drive the optical component positioning jig, the controlling unit including a boundary point acquiring unit that acquires a boundary point of the illumination area based on the luminance value acquired by the luminance acquiring unit, and that the arithmetic unit computes a position adjustment amount of the optical component based on the boundary point of the illumination area acquired by the boundary point acquiring unit.

According to the present invention, the controlling unit shifts the optical component to shift the illumination area of the optical image passed through the optical component by controllably driving the optical component positioning jig. Then, the optical image detecting device detects an end image of the illumination area. Then the boundary point acquiring unit acquires the boundary point of the illumination area based on the luminance value acquired by the luminance acquiring unit. Subsequently, the arithmetic unit computes the position adjustment amount of the optical component based on the boundary points acquired by the boundary point acquiring unit. Accordingly, since the acquisition of the boundary point of the illumination area facilitates the recognition of the deviation of the relative positions of the plurality of optical components, the optical component can highly accurately be positioned.

The manufacturing apparatus of the optical device according to the present invention, it is preferable that the optical component positioning jig is capable of holding the optical component from the lower side, and that the optical component casing holder mounts and fixes the optical component positioning jig thereon, the optical component casing holder including a table on which the optical component casing is mounted.

According to the present invention, the optical component positioning jig is capable of holding the optical components from the lower side. Further, the optical component casing holder mounts and fixes the optical component positioning jig thereon, and includes the table on which the optical component casing is mounted. Accordingly, since the plurality of optical components and the optical component casing can easily be placed on the manufacturing apparatus from the upper side, the optical device can be further easily manufactured.

The manufacturing apparatus of the optical device according to the present invention, it is preferable that a positioning portion for positioning the optical component casing at a predetermined position corresponding to the plurality of optical components is formed on the table.

According to the present invention, the positioning portion for placing the optical component casing is formed on the table. Accordingly, since the optical component casing can appropriately be placed at the position corresponding to the plurality of optical components, the optical device can highly accurately be manufactured.

BRIEF DESCRIPTION OF DRAWINGS

FIG. 24 is an illustration showing an example of a method for acquiring a luminance curve by a luminance curve acquiring unit according to the aforesaid embodiment;

FIG. 37 is an illustration showing the state of a step S450 of FIG. 35.

BEST MODE FOR CARRYING OUT THE INVENTION

An embodiment of the present invention will be described below with reference to the attached drawings.

(1) Structure of Projector

Figure 1:
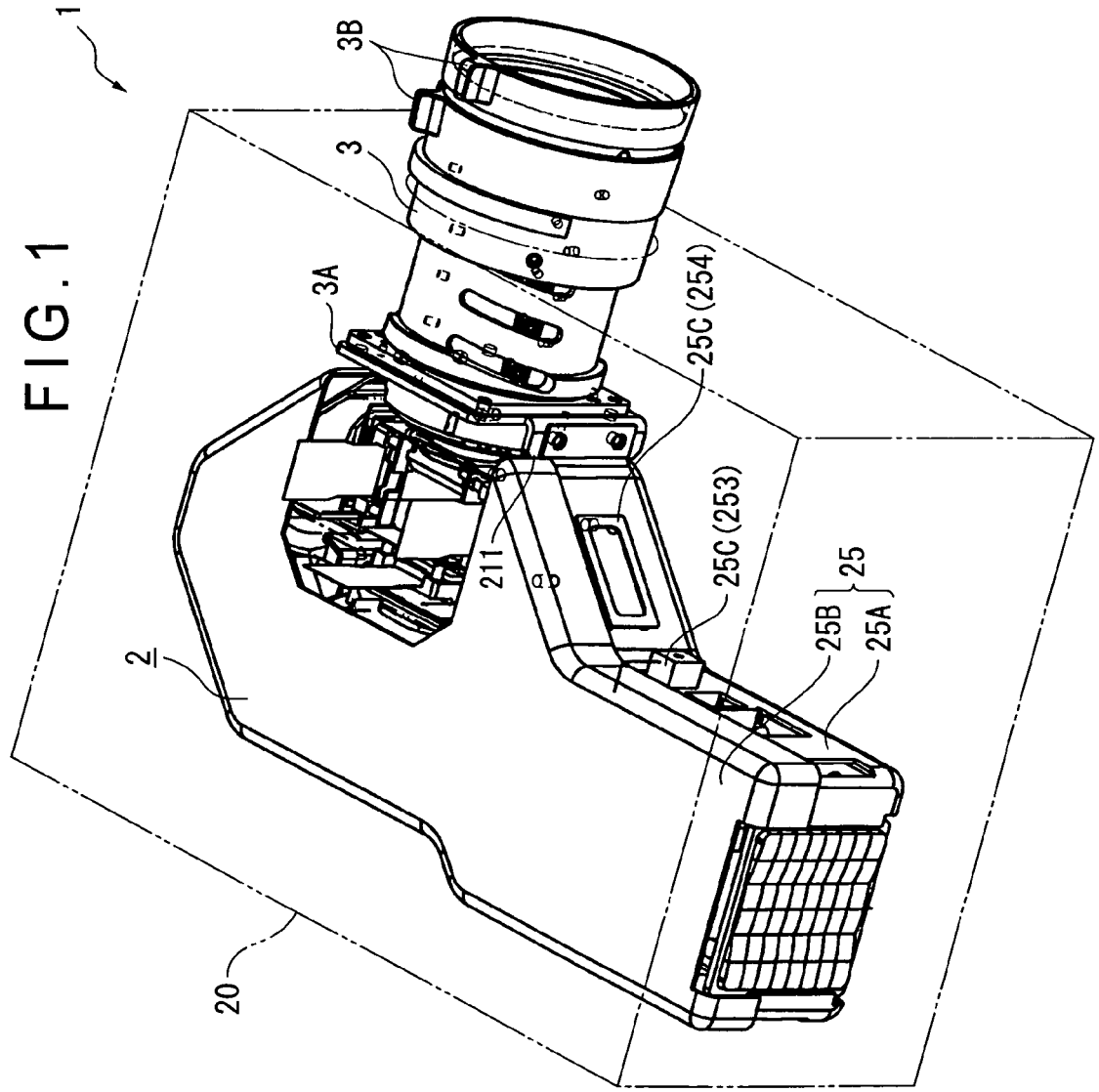
FIG. 1 is a perspective view showing an example of structure of a projector according to a present embodiment.

FIG. 1 is a perspective view showing an example of structure of a projector 1.

The projector 1 modulates a light beam irradiated by a light source in accordance with image information and projects the light beam on a projection surface such as a screen in an enlarged manner. The projector 1, as shown in FIG. 1, has a planarly-viewed L-shaped optical unit 2 as an optical device and a projection lens 3 connected to an end of the optical unit 2.

Incidentally, though not particularly shown, the projector 1 includes a light source device for conducting the light beam to the optical unit 2, a power source unit for providing electric power supplied from the outside to the components of the projector 1, a control board for controllably driving a below-described liquid crystal panel of the optical unit 2 and a cooling unit having a cooling fan for blowing cooling air to the components of the projector 1 in addition to the optical unit 2 and the projection lens 3.

As shown in FIG. 1 with a dotted line, the respective components of the projector 1 such as the optical unit 2, a part of the projection lens 3, the power source unit, the control board and the cooling unit etc. are housed in an exterior case 20. The projection lens 3 is arranged in the state that an image can be projected outside through an opening of the exterior case 20.

Under the control of the control board (not shown), the optical unit 2 forms an optical image in accordance with image information provided from the outside. Though described below in detail, as shown in FIG. 1, the optical unit 2 includes an optical component casing 25 that has a container 25A formed in a container-shape and a lid 25B for closing an opening of the container 25A, and a plurality of optical components arranged and housed in the optical component casing 25.

The projection lens 3, which is connected to an end of the optical unit 2 thorough a flange 3A as shown in FIG. 1, enlarges and projects the optical image modulated by the optical unit 2 in accordance with image information. The projection lens 3 is a lens set including a plurality of lenses housed in a cylindrical lens barrel, which has a lever 3B capable of changing the relative position of the plurality of lenses so that the focus and magnification of the projected image can be adjusted.

(2) Structure of Optical Unit 2

(2-1) Structure of Optical System

Figure 2:
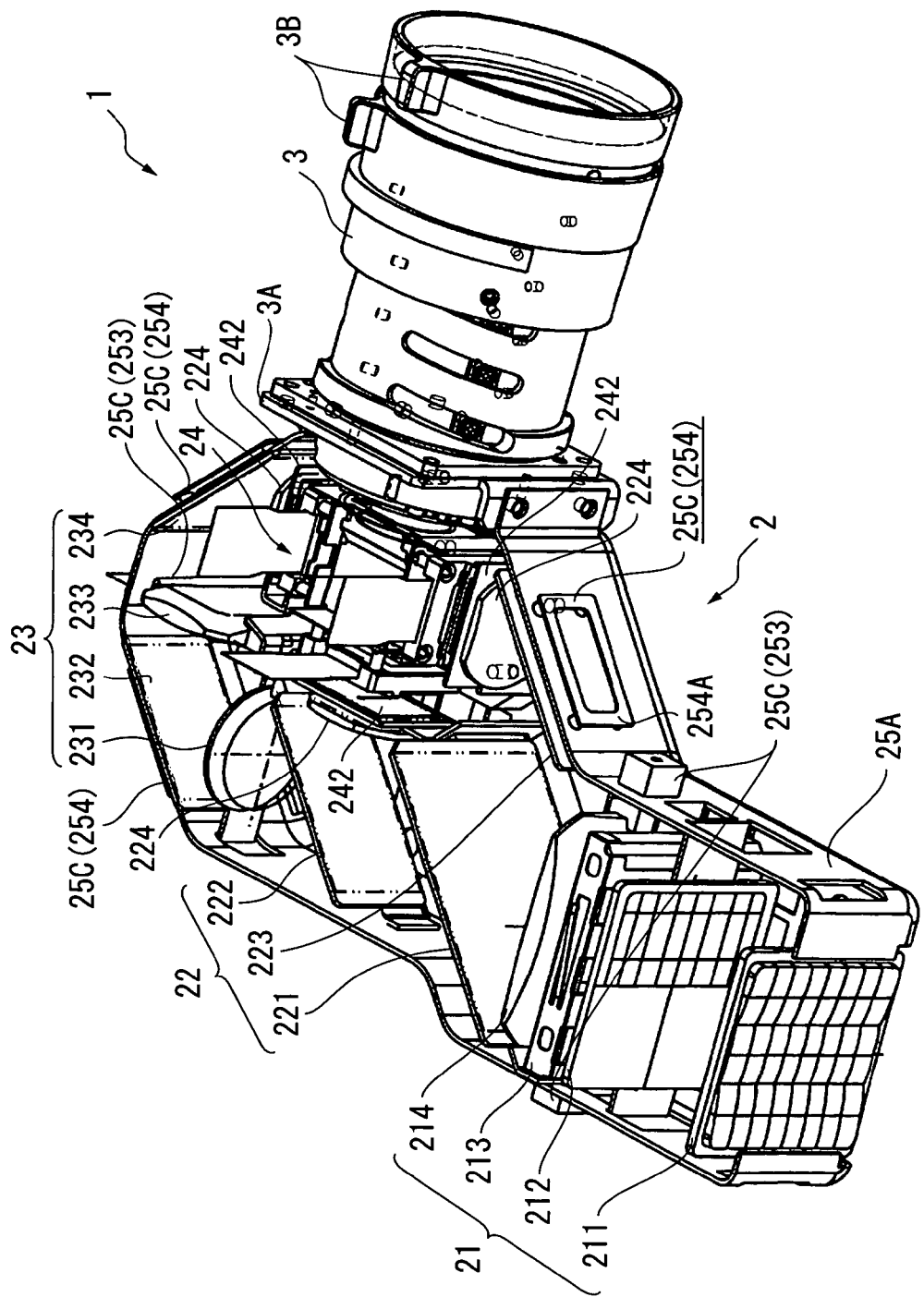
FIG. 2 is a plan view schematically showing inside structure of an optical unit according to the aforesaid embodiment.
Figure 3:
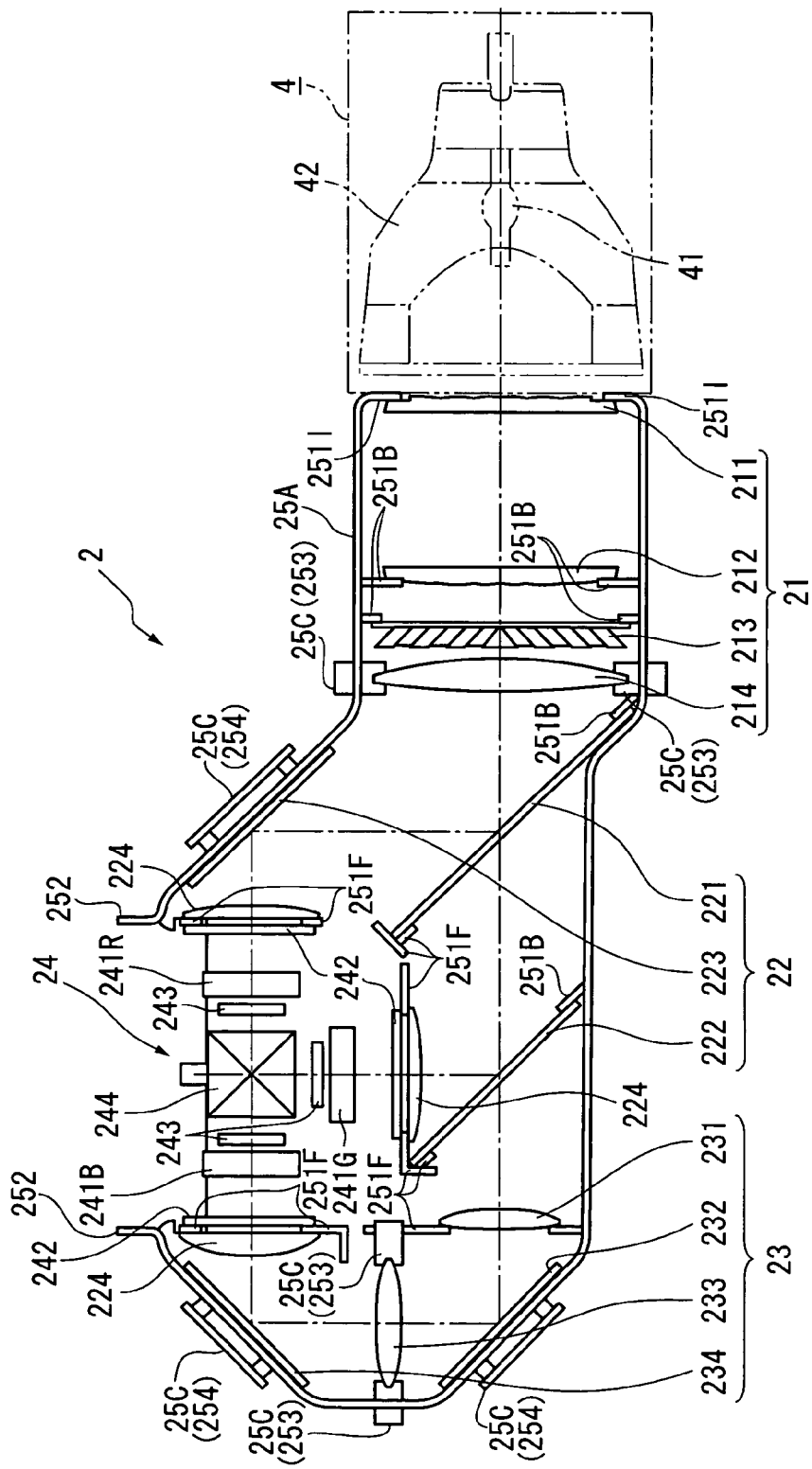
FIG. 3 is an illustration explaining an optical system of the optical unit according to the aforesaid embodiment.

FIG. 2 is a perspective view showing the inside structure of the optical unit 2. Specifically, FIG. 2 is an illustration of the optical unit 2 in FIG. 1 with the lid 25B removed. FIG. 3 is an illustration to explain an optical system.

As shown in FIG. 2, the optical components of the projector 1 include an integrator illuminating optical system 21, a color-separating optical system 22, a relay optical system 23 and the electric optical device 24 integrating an optical modulator and a color-combining optical device. As shown in FIG. 3, the light beam is conducted from a light source device 4 placed on the other end of the planarly-viewed L-shaped optical unit 2.

The light source device 4, as shown in FIG. 3, includes a light source lamp 41 (a radial light source), a reflector 42 and the like. The radial light beam irradiated by the light source lamp 41 is reflected by the reflector 42 to be an approximately parallel light beam and is irradiated toward the outside. The light source lamp 41 may be a high-pressure mercury lamp, a metal halide lamp, a halogen lamp or the like. The reflector 42 may be a parabolic mirror, an ellipsoidal mirror or the like.

The integrator illuminating optical system 21 is an optical system for equalizing the iluminance of the light beam irradiated by the light source device 4 on a plane orthogonal to the illumination optical axis. As shown in FIG. 2 or FIG. 3, the integrator illuminating optical system 21 has a first lens array 211, a second lens array 212, a polarization converter 213 and a superposing lens 214.

The first lens array 211 has small lenses arranged in a matrix, the lenses having substantially rectangular profile seen in the illumination optical axis direction. The respective lenses separates the light beam irradiated by the light source device 4 (FIG. 3) into sub-beams and emits the sub-beams in the illumination optical axis direction.

The second lens array 212 is arranged approximately in the same manner as the first lens array 211, which includes small lenses arranged in a matrix. The second lens array 212 together with the superposing lens 214 superpose the image of the respective small lenses of the first lens array 211 onto the image formation areas of the below-described liquid crystal panels of the electric optical device 24.

The polarization converter 213 converts the light from the second lens array 212 into substantially uniform polarized light, thereby enhancing the light utilization efficiency of the electric optical device 24.

Specifically, the respective sub-beams converted into substantially uniform polarized light by the polarization converter 213 are substantially superposed on the image formation areas of the below-described liquid crystal panels of the electric optical device 24 by the superposing lens 214. Since only one-type of polarized light can be used in a projector using the liquid crystal panels that modulate a polarized light, approximately half of the light beam from the light source device 4 emitting random polarized light cannot be used. Accordingly, with the use of the polarization converter 213, the light beam irradiated by the light source device 4 is converted into substantially uniform polarized light to enhance the light utilization efficiency of the electric optical device 24. Incidentally, such polarization converter 213 is disclosed in, for instance, JP H08-304739A.

The color-separating optical system 22 has two dichroic mirrors 221 and 222, and a reflection mirror 223. The plurality of sub-beams irradiated by the integrator illuminating optical system 21 are separated into three color lights of red (R), green (G) and blue (B) by the two dichroic mirrors 221 and 222.

The relay optical system 23 has an incident-side lens 231, a relay lens 233, and reflection mirrors 232 and 234. The relay optical system 23 guides the color light (blue light) separated by the color-separating optical system 22 toward the below-described liquid crystal panel of the electric optical device 24.

At this time, the dichroic mirror 221 of the color-separating optical system 22 transmits the green light component and blue light component of the light beam irradiated by the integrator illuminating optical system 21 and reflects the red light component. The red light reflected by the dichroic mirror 221 is reflected by the reflection mirror 223, which reaches to the liquid crystal panel 241R (FIG. 3) for red color through the field lens 224. The field lens 224 converts the respective sub-beams irradiated by the second lens array 212 into a light beam parallel to the central axis (main beam) thereof. The field lenses 224 provided on the light-incident side of the other liquid crystal panels 241(G and 241B (FIG. 3) function in the same manner.

In the blue and green lights passed through the dichroic mirror 221, the green light is reflected by the dichroic mirror 222, which reaches to the liquid crystal panel 241G (FIG. 3) for green light through the field lens 224. On the other hand, the blue light passes through the dichroic mirror 222, which passes through the relay optical system 23 to reach the liquid crystal panel 241B (FIG. 3) for blue light through the field lens 224.

Incidentally, the relay optical system 23 is used for the blue light in order to avoid deterioration in the light utilization efficiency on account of light dispersion and the like caused by the longer length of the optical path of the blue light than the optical path of the other color light. In other words, the relay optical system 23 is used for directly transmitting the sub-beams incident on the incident-side lens 231 to the field lens 224. Incidentally, though the blue light of the three color lights passes through the relay optical system 23, the red light, for instance, may alternatively pass through the relay optical system 23.

The electric optical device 24 modulates the incident light beam in accordance with image information to form a color image. As shown in FIG. 3, the electric optical device 24 has three incident-side polarization plates 242 on which the respective color lights separated by the color-separating optical system 22 are incident, the liquid crystal panels 241R, 241G and 241B (optical modulators) and irradiate-side polarization plates 243 disposed on the downstream of the respective incident-side polarization plates 242, and a cross dichroic prism 244 (color-combining optical device).

The liquid crystal panels 241R, 241G and 241B use, for instance, a polycrystalline silicon TFT as a switching element, which has a pair of opposing transparent substrates with liquid crystal sealed therebetween. The liquid crystal panels 241R, 241G and 241B irradiate the light beam incident thereon through the incident-side polarization plates 242 after modulating in accordance with image information. Incidentally, the liquid crystal panels 241R, 241G and 241B are accommodated and held in a holder frame (not shown) having an opening as an image formation area of the liquid crystal panels 241R, 241G and 241B.

The incident-side polarization plate 242 transmits a polarized light in a predetermined direction out of the respective color lights separated by the color-separating optical system 22 and absorbs the other light beam, which have a substrate made of sapphire glass and the like with a polarization film attached thereon.

The irradiation-side polarization plate 243 is also arranged substantially in the same manner as the incident-side polarization plate 242, which transmits the polarized light in a predetermined direction out of the light beam irradiated by the liquid crystal panels 241R, 241G and 241B, where the polarization axis of the transmitted polarized light is set orthogonal to the polarization axis of the polarized light passed through the incident-side polarization plate 242.

The cross dichroic prism 244 combines the optical image irradiated by the irradiation-side polarization plate 243 and modulated for each color light to form a color image. In the cross dichroic prism 244, a dielectric multi-layer film for reflecting the red light and a dielectric multi-layer film for reflecting the blue light are formed along the boundaries of four right-angle prisms approximately in X-shape, the dielectric multi-layer films combining the three color lights.

Incidentally, the cross dichroic prism 244 is fixed on a mount (not shown). Further, the liquid crystal panels 241R, 241G and 241B, and the three irradiation-side polarization plates 243 are respectively fixed on the three light-incident sides of the cross dichroic prism 244 to be unitized. Hereinafter, the unit, in which the cross dichroic prism 244, the mount, the liquid crystal panels 241R, 241G and 241B and the three irradiation-side polarization plates 243 are integrated, is called as a "prism unit" for convenience. Positioning projections (not shown) for the container 25A are formed on a lower side of the mount.

Note that, the electric optical device 24 may be equipped with a visual-angle corrector plate arranged between the incident-side polarization plate 242 and the irradiation-side polarization plate 243 to correct the visual field angle of the optical image formed by the liquid crystal panels 241R, 241G and 241B in addition to the liquid crystal panels 241R, 241G and 241B, the incident-side polarization plate 242, the irradiation-side polarization plate 243 and the cross dichroic prism 244. The visual field angle of the projection image is enlarged and the contrast of the projected image is enhanced since the visual-angle corrector plate is arranged.

(2-2) Structure of Optical Component Casing 25

As shown in FIG. 1 or 2, the optical component casing 25 includes the container 25A in which the various optical components of the above-described optical systems 21, 22 and 23 and the electric optical device 24 are housed, the lid 25B for closing the upper opening of the container 25A, and a fixing member 25C for fixing the optical components 214, 223 and 232 to 234 at the predetermined positions on the container 25A.

Figure 4:
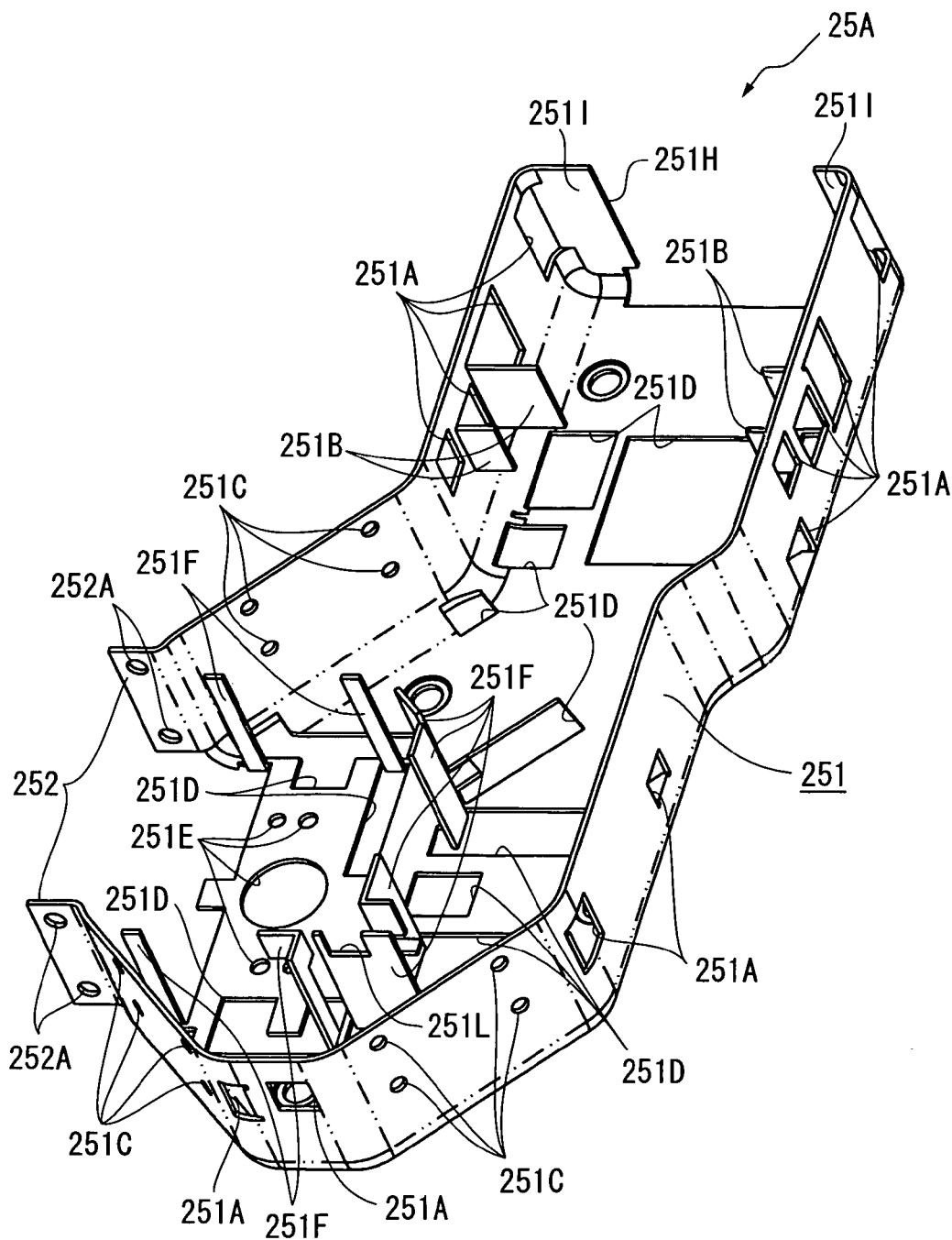
FIG. 4 is a perspective view showing an upper side of a container according to the aforesaid embodiment.
Figure 5:
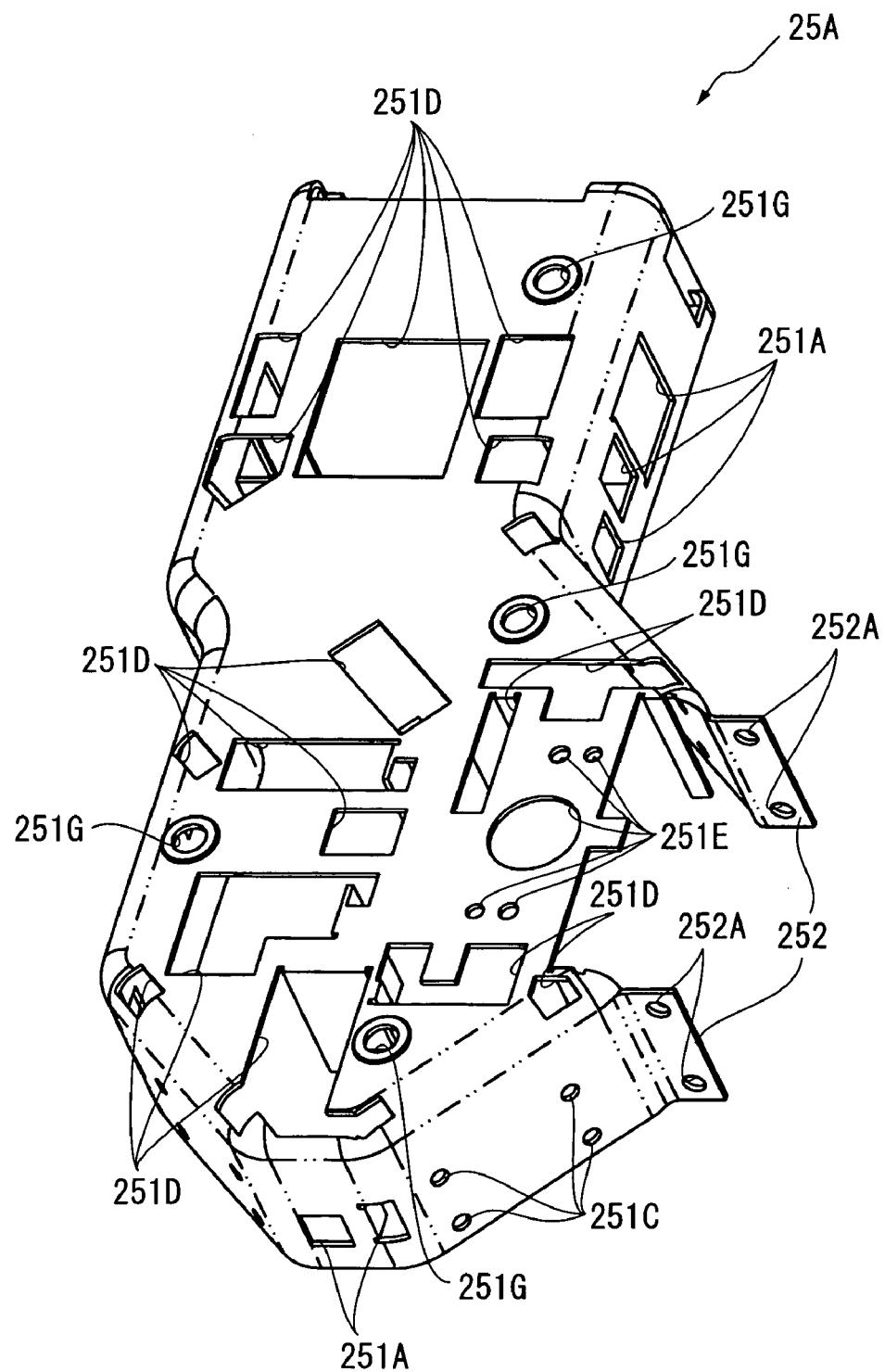
FIG. 5 is a perspective view showing a lower side of the container according to the aforesaid embodiment.

FIG. 4 is a perspective view showing an upper side of the container 25A. FIG. 5 is a perspective view showing a lower side of the container 25A.

As shown in FIGS. 1 to 5, the container 25A made of an aluminum plate by sheet metal processing includes a component housing 251 in which the various optical components of the optical systems 21, 22 and 23 (FIGS. 2 and 3) and the electric optical device 24 are housed, and a projection lens mount 252 on which the projection lens 3 is placed.

As shown in FIG. 4 or 5, the component housing 251 is formed in a container shape by drawing with an upper side thereof being opened. The projection lens mount 252 is provided on an end of the component housing 251, and the opening 251H for conducting the light beam irradiated by the light source device 4 and a support portion 251I for supporting the periphery of the optical component 211 are formed on the other end thereof.

As shown in FIG. 4, a plurality of holes 251A are formed on the lateral side of the component housing 251 corresponding to the positions of the optical components 211 to 214, 221, 222, 231 and 233 (FIGS. 2 and 3). A part of each hole 251A is formed by cutting and folding the part of the lateral side toward the inside of the container 25A. The cut and folded parts serve as support portions 251B for supporting the peripheries of the optical components 212, 213, 221, 222 and 231. Further, the plurality of circular holes 251C are formed on the lateral side to penetrate toward the inside corresponding to the positions of the optical components 223, 232 and 234 (FIGS. 2 and 3).

As shown in FIG. 5, a plurality of holes 251D, into which a part of the optical component positioning jig of a below-described manufacturing apparatus can be inserted, and positioning holes 251E for fixing the position of the prism unit are formed on the bottom side of the component housing 251. As shown in FIG. 4, some of the holes 251D provided near the positioning holes 251E out of the plurality of the holes 251D are formed by cutting and folding the parts of the bottom side which serve as the support portions 251F for supporting the peripheries of the optical components 221, 222, 224, 231 and 242. As shown in FIG. 5, four positioning holes 251G for placing the container 25A at the predetermined position of the below-described manufacturing apparatus are formed on a back side of the bottom side of the component housing 251.

Though not shown, the plurality of burring holes with the screw grooves are formed on the upper end of the component housing 251.

As shown in FIG. 4 or 5, the projection lens mount 252 formed by bending so that a lateral side on the end of the component housing 251 extends toward a front side thereof to support the projection lens 3 from both left and right sides via the flange 3A. Screw holes 252A for fixing the projection lens 3 are formed on the projection lens mount 252, and the projection lens 3 is placed on the projection lens mount 252 by fixing screws (not shown) screwing into screw holes (not shown) formed on the flange 3A of the projection lens 3 through the screw holes 252A.

The lid 25B is made of an aluminum plate by sheet metal processing as is the above-described container 25A to connect the upper end of the container 25A. As shown in FIG. 1, the lid 25B is formed in a planarly-viewed F-shape that opens an upper side of the electric optical device 24 housed in the component housing 251 of the container 25A and closes the opening of the other opening part of the component housing 251. Though not shown, a plurality of holes are formed on the lid 25B so that the lid 25B is fixed to the container 25A by screws etc. through the holes and burring holes (not shown) formed on the container 25A.

Incidentally, the inner side of the component housing 251 of the above-described container 25A and the lower side of the lid 25B are coated with anodized black-aluminum.

As shown in FIG. 1 or FIG. 2, the fixing member 25C has a first fixing member 253 for fixing the superposing lens 214 and the relay lens 233 at the predetermined positions on the container 25A and a second fixing member 254 for fixing the reflection mirrors 223, 232 and 234 at the predetermined positions on the container 25A.

The first fixing member 253 is made of synthetic resin (acrylic material) transmitting ultraviolet ray and formed in a quadratic prism member which is inserted through the hole 251A formed on the lateral side of the container 25A. A groove (not shown) having an approximately V-shaped cross-section is formed on an end of the quadratic prism of the first fixing member 253. The first fixing members 253 sandwich the superposing lens 214 or the relay lens 233 from left and right directions by the grooves (not shown) abutting on the outer periphery of these optical components 214 and 233 through the holes 251A formed on the lateral side of the container 25A. At this time, an ultraviolet curing adhesive is filled between the first fixing member 253 and the holes 251A of the container 25A, and between the groove (not shown) of the first fixing member 253 and the outer periphery of the optical components 214 and 233, so that the optical components 214 and 233 are held and fixed on the optical component casing 25 by curing the adhesive.

The second fixing member 254 made of synthetic resin (acrylic member) transmitting ultraviolet ray includes a rectangular frame 254A and four cylindrical pins (not shown) that are projected from four corners of an end of the rectangular frame 254A and orthogonal to the end. The pin (not shown) is inserted to the second fixing member 254 through a hole 251C formed on the lateral side of the container 25A so that an tip end of the pin (not shown) abuts on back sides of the reflection faces of the reflection mirrors 223, 232 and 234. At this time, an ultraviolet curing adhesive is filled between the pin (not shown) and the back sides of the reflection faces of the reflection mirrors 223, 232 and 234 and between a periphery of the pin (not shown) and the hole 251C, so that the reflection mirrors 223, 232 and 234 are held and fixed on the optical component casing 25 by curing the adhesive.

The first fixing member 253 and the second fixing member 254 may be made of other synthetic resins transmitting ultraviolet ray in addition to the acrylic material, and alternatively, may be made of optical glass, crystal, sapphire glass, quartz or the like.

(3) Structure of Manufacturing Apparatus of Optical Unit 2

Figure 6:
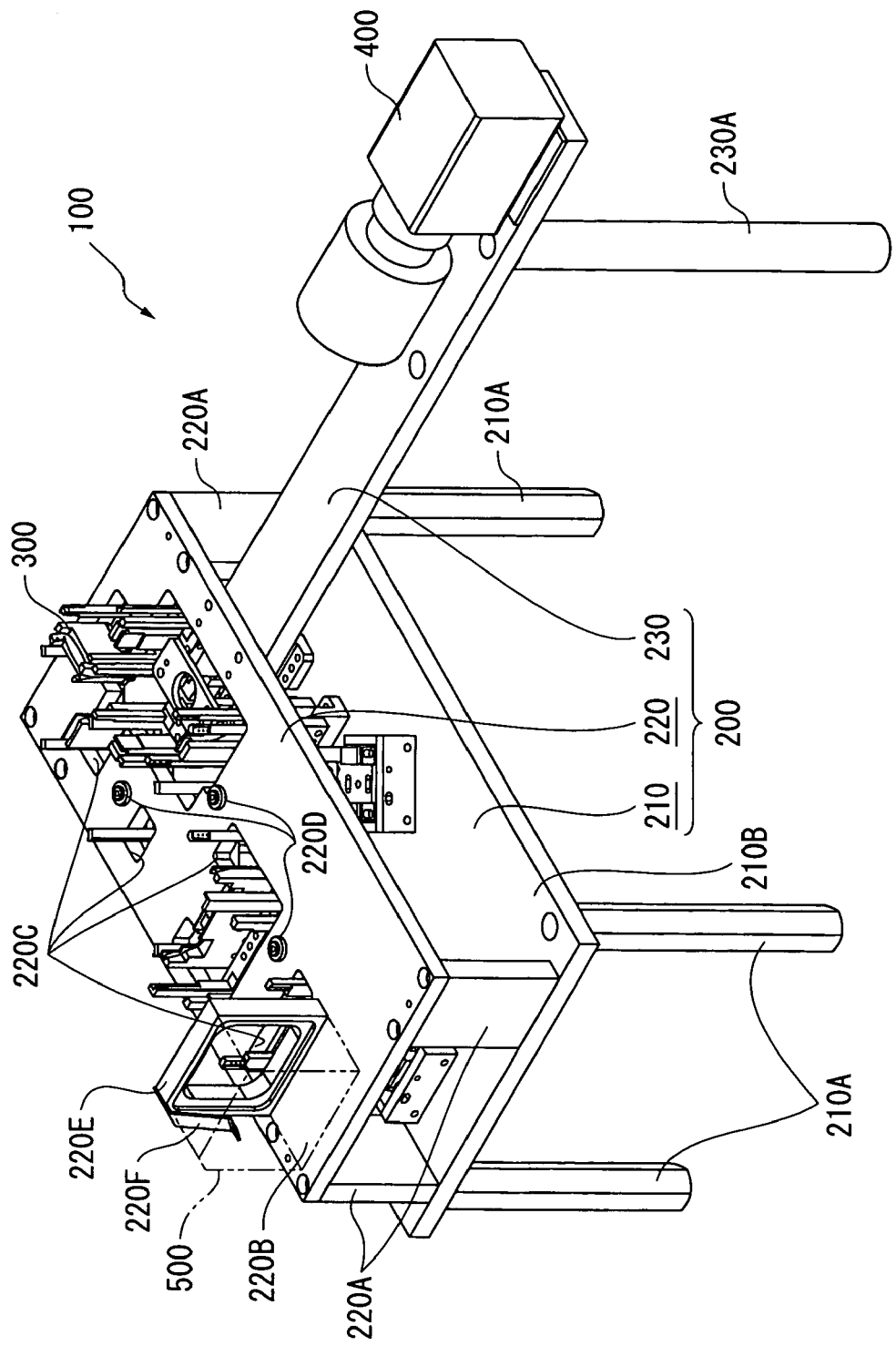
FIG. 6 is an entire perspective view showing brief structure of a manufacturing apparatus of the optical unit according to the aforesaid embodiment.

FIG. 6 is an entire perspective view showing brief structure of the manufacturing apparatus 100 of the optical unit 2 according to the present embodiment. Structure of the manufacturing apparatus 100 will be described as follows.

The manufacturing apparatus 100 is a device for positioning and fixing the optical components 211 to 214, 221 to 224, 231 to 234 and 242 at predetermined positions corresponding to the optical component casing 25 (FIG. 1). As shown in FIG. 6, the manufacturing apparatus 100 includes a table 200 (an optical component casing holder), an optical component positioning jig 300, an optical image detecting device 400, an adjustment light source device 500 (a light beam irradiator) and a control device 600.

(3-1) Structure of Table 200

The table 200 mounts and fixes the optical unit 2 (FIG. 1), the optical component positioning jig 300, the optical image detecting device 400 and the adjustment light source device 500. As shown in FIG. 6, the table 200 includes a first table 210, a second table 220 and a third table 230.

The first table 210 is formed in a table shape having legs 210A on four corners thereof, and the optical component positioning jig 300 and the second table 220 are mounted and fixed on an upper side 210B as a mount face. Though not shown, a vacuum pump controllably driven by the control device 600 and an ultraviolet irradiator etc. are placed below the first table 210.

The second table 220 is formed in a table shape having legs 220A on four corners thereof as is the first table 210, and the container 25A of the optical unit 2 and the adjustment light source device 500 are mounted on an upper side 220B as a mount face. The second table 220 having a plurality of openings 220C is mounted and fixed on the first table 210 with parts of the optical component positioning jigs 300 inserted to the plurality of openings 220C.

Positioning projections 220D as positioning portions are formed on the upper side 220B of the second table 220 for mounting the container 25A of the optical unit 2 at a predetermined position. The container 25A is then mounted at the predetermined position by the positioning projections 220D engaging with the positioning holes 251G (FIG. 5) formed on the bottom side of the above-described container 25A.

Further, a rectangular frame-shaped light source device mount 220E for placing the adjustment light source device 500 at a predetermined position is formed on the upper side 220B of the second table 220. A biasing portion 220F is attached to the light source device mount 220E so that the adjustment light source device 500 is biased and fixed on the light source device mount 220E by the biasing portion 220F.

The third table 230 is connected to the second table 220, which mounts the optical image detecting device 400 on the upper side. An end of the third table 230 is fixed on a lower side of the second table 220, and the other end thereof is supported by the legs 230A.

(3-2) Structure of Optical Component Positioning Jig 300

Figure 7:
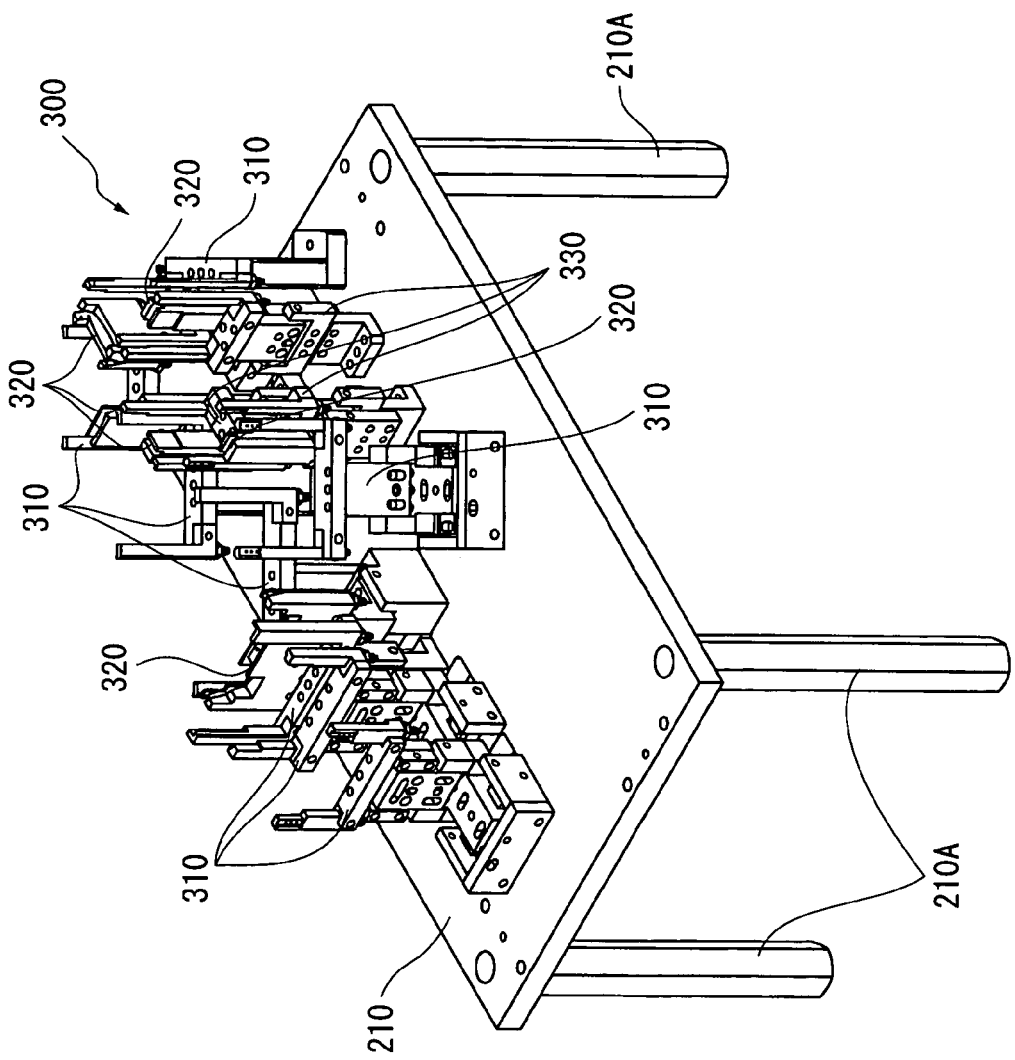
FIG. 7 is a perspective view showing brief structure of an optical component positioning jig according to the aforesaid embodiment.

FIG. 7 is a perspective view showing brief structure of the optical component positioning jig 300 according to the present embodiment.

Each optical component positioning jig 300 is placed on designed predetermined positions of the optical components 211 to 214, 221 to 224, 231 to 234 and 242 on the first table 210 to support the optical components 211 to 214, 221 to 224, 231 to 234 and 242 and also to adjust the positions of the optical components 212 to 214, 223 and 233 which have the optical axis. As shown in FIG. 7, the optical component positioning jigs 300 can be classified broadly into first positioning jigs 310 for positioning the optical components 211 to 213, 221 to 223, 232 and 234, second positioning jigs 320 for positioning the optical components 214, 224, 231 and 233, and a third positioning jig 330 for positioning the optical component 242 by grouping similar structures. Incidentally, the optical positioning jig 300 will be described below with an XYZ orthogonal coordinate system in which the illumination optical axis of the light beam irradiated by the light source device 4 (FIG. 3) represents Z-axis, and directions orthogonal to the Z-axis represent X-axis and Y-axis.

(3-2-1) Structure of First Positioning Jig 310

Figure 8:
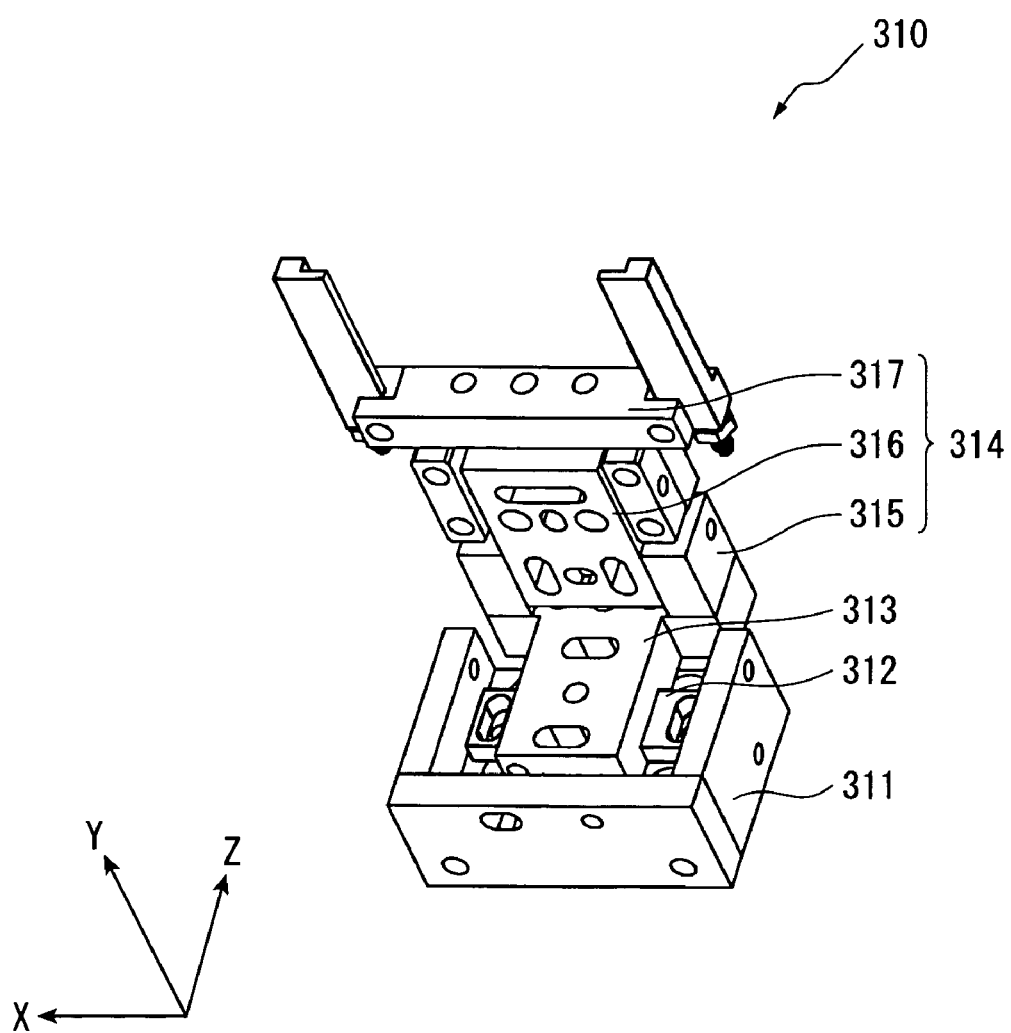
FIG. 8 is a perspective view showing structure of a first positioning jig according to the aforesaid embodiment.

FIG. 8 is a perspective view showing structure of the first positioning jig 310. As described above, since the first positioning jigs 310 for positioning the first lens array 211, the second lens array 212, the polarization converter 213, the dichroic mirrors 221 and 222, and the reflection mirrors 223, 232 and 234 have similar structures, the first positioning jig 310 for positioning the second lens array 212 will mainly be described here. The first positioning jigs 310 for positioning the optical components 211, 212, 221 to 223, 232 and 234 excluding the second lens array 212 have approximately the same structures.

As shown in FIG. 8, the first positioning jig 310 includes a base 311, a Z-axis shifter 312, an X-axis shifter 313 and a first optical component support portion 314.

The base 311 having an approximately planarly-viewed C-shape is fixed at a position corresponding to the second lens array 212 on the first table 210 so that a distal side of the C-shape faces Z-axis direction. In the base 311, an engaging groove (not shown) is formed on the inside of the planarly-viewed C-shape along the distal side of the C-shape to engage with the Z-axis shifter 312.

The Z-axis shifter 312 having an approximately parallel-epiped profile and being orthogonal to the distal side of the C-shape of the base 311 engages with the engaging groove (not shown) formed on the base 311 to shift in the Z-axis direction relative to the base 311. Further, the Z-axis shifter 312 serves as a rail of the X-axis shifter 313.

The X-axis shifter 313 extends in X-axis direction while the approximately center part thereof in the X-axis direction has a planarly-viewed T-shape extending in the Z-axis direction. An engaging groove (not shown) is formed on a lower side of the end thereof extending in the Z-axis direction to engage with the Z-axis shifter 312 to shift in the X-axis direction relative to the Z-axis shifter 312.

The first optical component support portion 314 is connected to the end of the X-axis shifter 313 extending in the X-axis direction and formed to extend from the end in Y-axis direction for supporting the second lens array 212. As shown in FIG. 8, the first optical component support portion 314 has a base 315, a shifter 316 and a first holder 317.

The base 315 has an approximately planarly-viewed C-shape fixed on an upper side of an end of the X-axis shifter 313 extending in the X-axis direction so that a distal side of the C-shape extends in the Z-axis direction. In the base 315, an engaging groove (not shown) is formed on the inside of the planarly-viewed C-shape along the Y-axis direction to engage with the shifter 316.

The shifter 316 extends from the inside of the base 315 in the Y-axis direction and has a planarly-viewed T-shape, of which the distal end in the extending direction extends in the X-axis direction. The shifter 316 engages with the engaging groove (not shown) formed on the base 315 to shift in the Y-axis direction relative to the base 315 and to turn in a rotation direction around the Y-axis.

That is, an attitude adjuster according to the present invention corresponds to the Z-axis shifter 312, the X-axis shifter 313 and the shifter 316.

Figure 9:
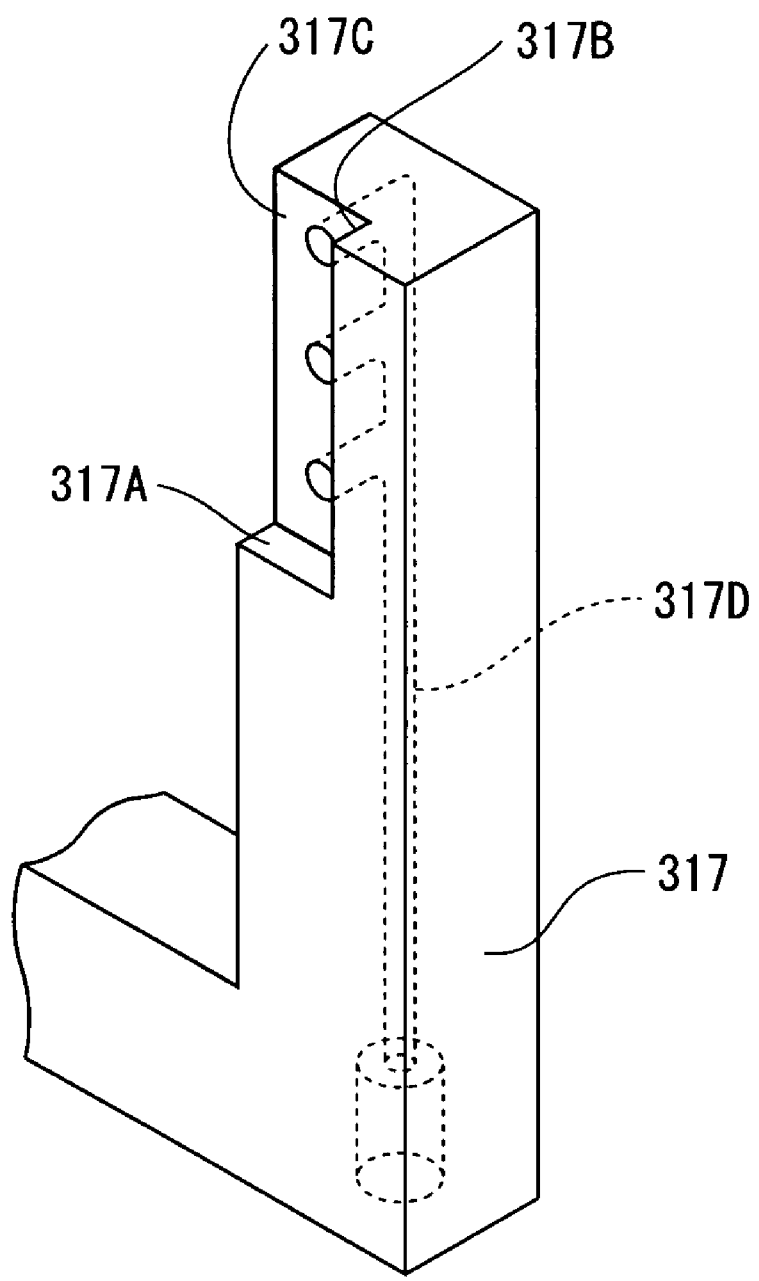
FIG. 9 is an illustration showing holding structure of a first holder for the optical component according to the aforesaid embodiment.

FIG. 9 is an illustration showing holding structure of the optical component by the first holder 317.

The first holder 317 has an approximately planarly-viewed C-shape of which a base end is fixed on an end of the shifter 316 in +Y-axis direction to support the second lens array 212 by the tip ends of the planarly-viewed C-shape. As shown in FIG. 9, a first support face 317A for supporting the lower side of the second lens array 212, a second support face 317B for supporting the lateral side of the second lens array 212 and a third support face 317C for supporting the light-incident side of the second lens array 212 are formed on each tip end of the first holder 317. The first support face 317A, the second support face 317B and the third support face 317C are arranged as external position reference faces of the second lens array 212.

As shown in FIG. 9, a communication hole 317D as an intake hole is formed inside the first holder 317 along the distal side of the planarly-viewed C-shape so that an end of the communication hole 317D connects the third support face 317C with the end being split into three, and the other end thereof connects the lower side of the first holder 317. The second lens array 212 can stick to the third support face 317C by intake of air from the side of the other end with a vacuum pump (not shown) placed below the first table 210 through a tube (not shown). With such sticking, the second lens array 212 is held by the first holder 317.

In the above-described first positioning jig 310, pulse motors (not shown) are fixed on the Z-axis shifter 312, the X-axis shifter 313 and the shifter 316 so that the pulse motors are driven under the control of the control device 600 (not shown here) to appropriately shift the Z-axis shifter 312, the X-axis shifter 313 and the shifter 316. Incidentally, without limiting to the control of the control device 600, the Z-axis shifter 312, the X-axis shifter 313 and the shifter 316 can be shifted by a manual operation of an operator.

(3-2-2) Structure of Second Positioning Jig 320

Figure 10:
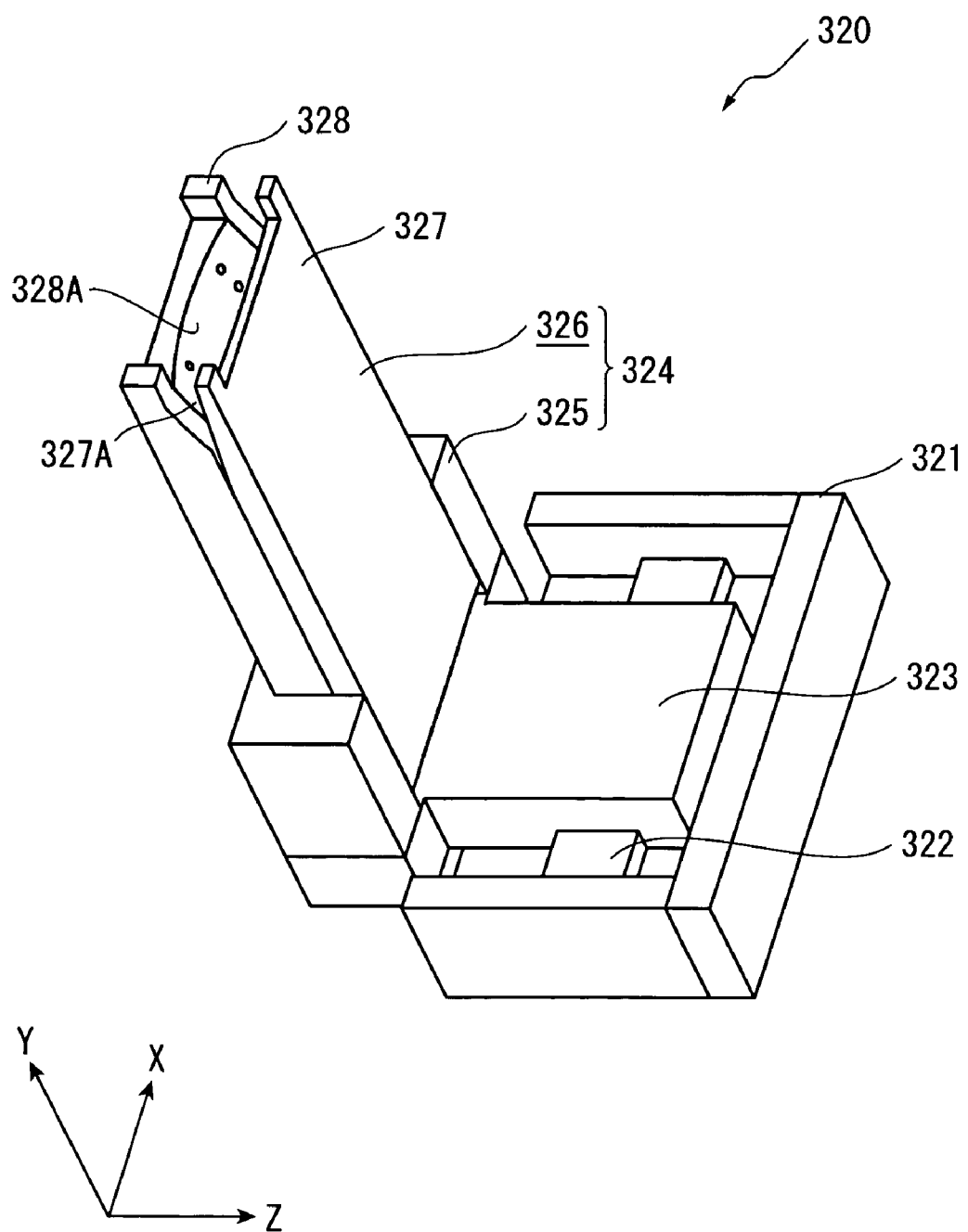
FIG. 10 is a perspective view showing structure of a second positioning jig according to the aforesaid embodiment.

FIG. 10 is a perspective view showing structure of the second positioning jig 320. As described above, since the second positioning jigs 320 for positioning the superposing lens 214, the field lens 224, the incident-side lens 231 and the relay lens 233 have similar structures, the second positioning jig 320 for positioning the relay lens 233 will mainly be described here. The second positioning jigs 320 for positioning the optical components 214, 224 and 231 other than the relay lens 233 have approximately the same structures.

As shown in FIG. 10, the second positioning jig 320 includes a second optical component support portion 324 in addition to a base 321, a Z-axis shifter 322 and an X-axis shifter 323 having approximately the same structures as the above-described base 311, the Z-axis shifter 312 and the X-axis shifter 313 of the first positioning jig 310. Note that, since the structures of the base 321, the Z-axis shifter 322 and the X-axis shifter 323 are approximately the same as that of the base 311, the Z-axis shifter 312 and the X-axis shifter 313 of the second positioning jig 310, the description will be omitted.

The second optical component support portion 324 is connected to an end of the X-axis shifter 323 extending in the X-axis direction and formed to extend from the end in the Y-axis direction for supporting the relay lens 233. As shown in FIG. 10, the second optical component support portion 324 has a base 325 and a second holder 326 as a holder.

The base 325 having an approximately planarly-viewed C-shape is fixed on the end of the X-axis shifter 323 extending in the X-axis direction so that distal side of the C-shape extends in the Z-axis direction. An engaging groove (not shown) is formed on the inside of the approximately planarly-viewed C-shape of the base 325 along the Y-axis direction to engage with the second holder 326.

The second holder 326 has an approximately parallelepiped profile extending from the inside of the C-shape of the base 325 in the Y-axis direction to hold the relay lens 233 at a tip end thereof and to engage with the engaging groove (not shown) formed on the base 325 so as to shift in the Y-axis direction relative to the base 325.

That is, an attitude adjuster according to the present invention corresponds to the Z-axis shifter 322, the X-axis shifter 323 and the second holder 326.

As shown in FIG. 10, the second holder 326 includes a first support member 327 and a second support member 328, the first support member 327 and the second support member 328 being integrated each other.

The first support member 327 has an approximately parallelepiped profile with the thickness of an end thereof opposite to the second support member 328 being formed taper to be smaller toward the side of the end in the +Y-axis direction. The taper part serves as a first support face 327A for supporting the light-irradiation side of the relay lens 233.

The second support member 328 has an approximately parallelepiped profile on which a recess corresponding to the profile of the periphery of the relay lens 233 is formed on the end opposite to the first support member 327 at the side of the end in the +Y-axis direction. The recess serves as a second support face 328A for supporting the light-incident side of the relay lens 233.

Figure 11:
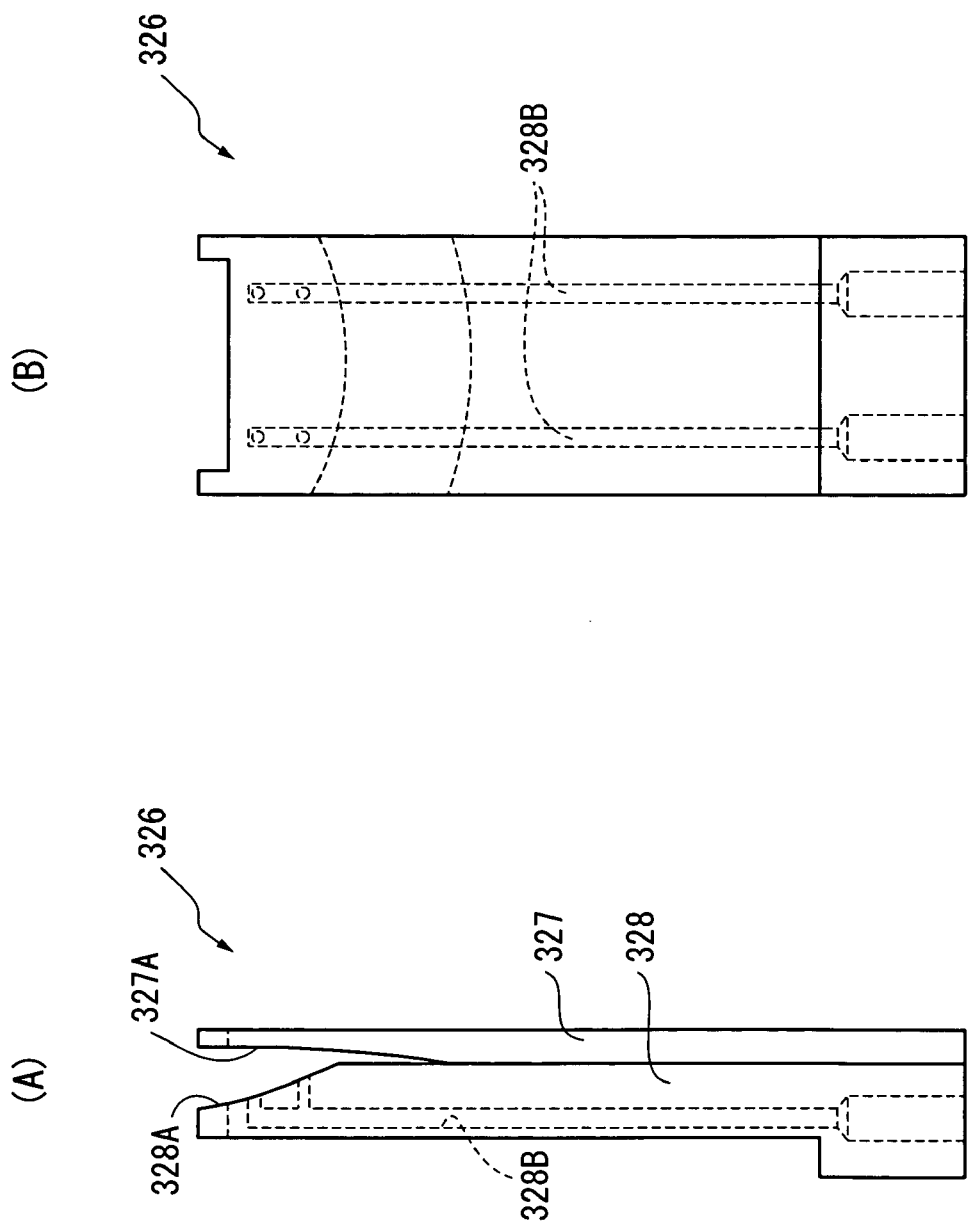
FIG. 11 is an illustration showing holding structure of a second holder for the optical component according to the aforesaid embodiment.

FIG. 11 is an illustration showing holding structure of the optical component by the second holder 326.

As shown in FIG. 11(A), two communication holes 328B as intake holes are formed inside the second support member 328 of the second holder 326 in parallel along the Y-axis direction. As shown in FIG. 11(B), the communication holes 328B connects the second support face 328A at ends thereof with each end being split into two and connects the lower side of the second support member 328 at other ends thereof. The relay lens 233 can stick to the second support face 328A by intake of air from the side of other ends with the vacuum pump (not shown) placed below the first table 210 through the tube (not shown). With such sticking, the relay lens 233 is held by the second holder 326.

In the above-described second positioning jig 320, pulse motors (not shown) are fixed on the Z-axis shifter 322, the X-axis shifter 323 and the second holder 326 so that the pulse motors are driven under the control of the control device 600 (not shown here) to appropriately shift the Z-axis shifter 322, the X-axis shifter 323 and the second holder 326.

Incidentally, without limiting to the control of the control device 600, the Z-axis shifter 322, the X-axis shifter 323 and the second holder 326 can be shifted by a manual operation of an operator.

(3-2-3) Structure of Third Positioning Jig 330

Figure 12:
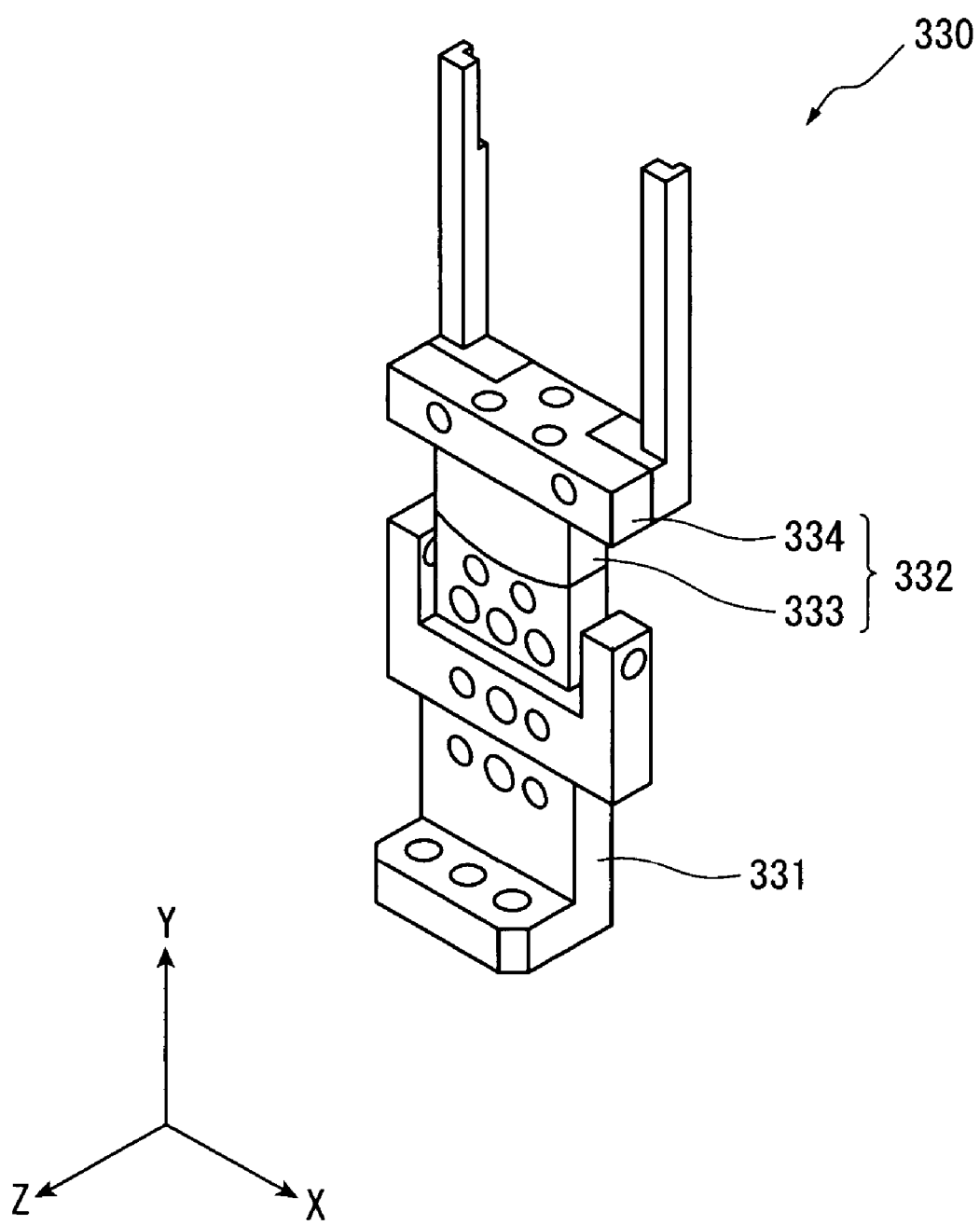
FIG. 12 is a perspective view showing structure of a third positioning jig according to the aforesaid embodiment.

FIG. 12 is a perspective view showing structure of the third positioning jig 330.

The third positioning jig 330 positions the incident-side polarization plate 242. Specifically, the third positioning jigs 330 are respectively placed at the positions corresponding to the three incident-side polarization plates 242 on the first table 210. As shown in FIG. 12, the third positioning jig 330 has a base 331 and a third optical component support portion 332.

The base 331 is a plate having a laterally-viewed L-shape connecting to a position corresponding to the incident-side polarization plate 242 on the first table 210 at an end thereof and extending in the X-axis direction at the other end. A circular groove (not shown) is formed on the other end of the base 331 around the center of the incident-side polarization plate 242 held by the third optical component support portion 332 to engage with the third optical component support portion 332.

The third optical component support portion 332 holds the incident-side polarization plate 242 and also engages with an engaging groove (not shown) of the base 331 so as to be turnable around the Z-axis relative to the base 331. As shown in FIG. 12, the third optical component support portion 332 has a turning portion 333 as an attitude adjuster and a third holder 334 as a holder.

The turning portion 333, which is formed in an approximately parallelepiped profile extending in the X-axis direction, has an engaging portion (not shown) corresponding to the circular engaging groove (not shown) formed on the base 331. The turning portion 333 is turnable around the center of the incident-side polarization plate 242 held by the third holder 334 relative to the base 331 by changing the engaging state with the base 331.

The third holder 334 has an approximately planarly-viewed C-shape of which a base end of the C-shape is fixed on an end of the turning portion 333 in the +Y-axis direction to support the incident-side polarization plate 242 at tip ends of the planarly-viewed C-shape.

Though not shown, the structure of the third holder 334, which is approximately the same as the above-described first holder 317 of the first positioning jig 310, includes a first support face, a second support face and a third support face respectively corresponding to the first support face 317A, the second support face 317B and the third support face 317C of the first holder 317.

Though not shown, a communication hole is formed inside the third holder 334 as an intake hole of which an end connects the third support face with the end split into three and the other end connects a lower side of the third holder 334 in the same manner as the first holder 317. The incident-side polarization plate 242 can stick to the third support face by intake of air from the side of the other end with the vacuum pump (not shown) placed below the first table 210 through the tube (not shown). With such sticking, the incident-side polarization plate 242 is held by the third holder 334.

In the above-described third positioning jig 330, a pulse motor (not shown) is fixed on the turning portion 333 so that the pulse motor is driven under the control of the control device 600 (not shown here) to appropriately turn the turning portion 333. Incidentally, without limiting to the control of the control device 600, the turning portion 333 can be turned by a manual operation of an operator.

(3-3) Structure of Optical Image Detecting Device 400

Figure 13:
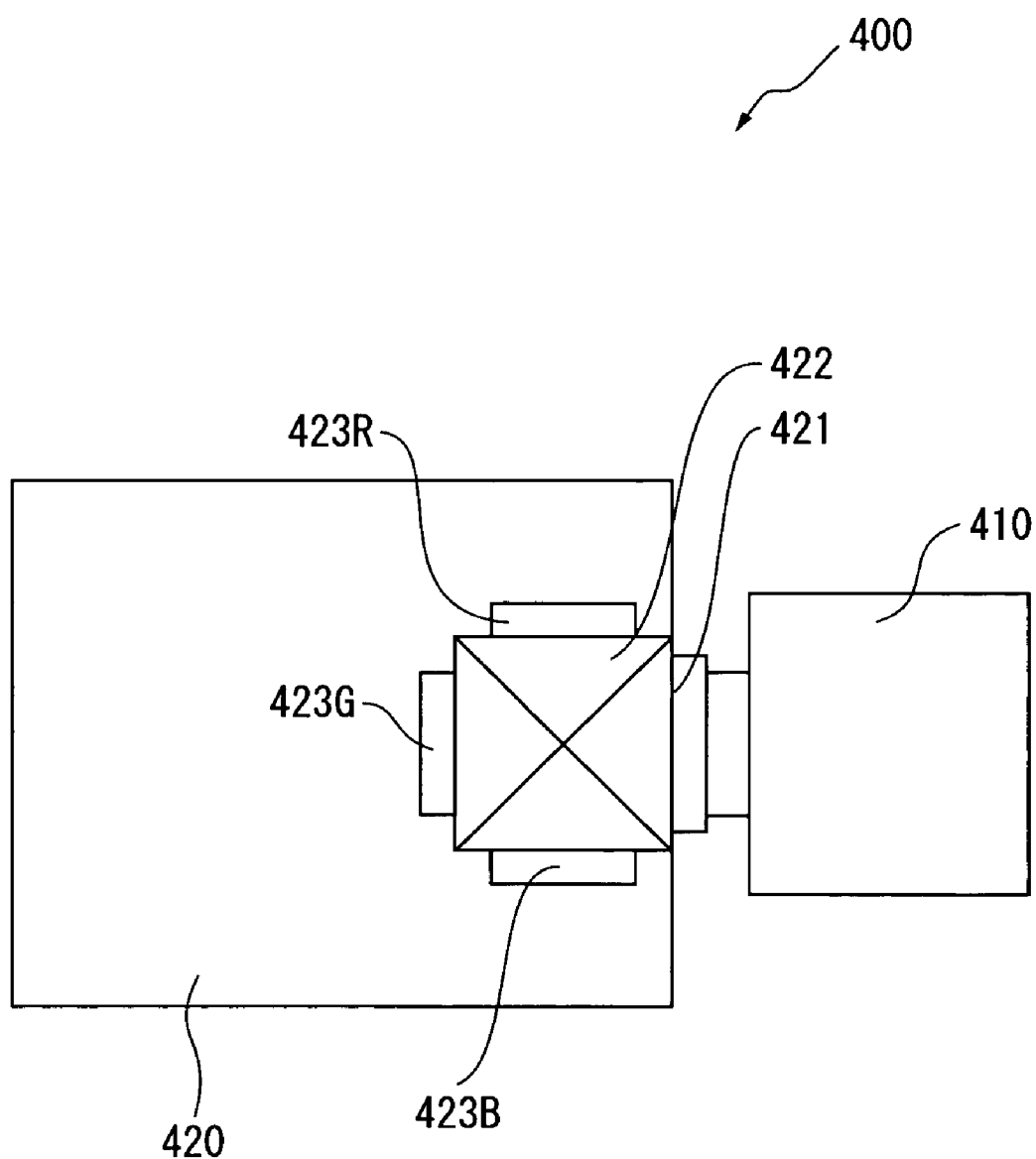
FIG. 13 is a schematic illustration showing structure of an optical image detecting device according to the aforesaid embodiment.

FIG. 13 is a schematic illustration showing structure of the optical image detecting device 400.

The optical image detecting device 400 placed on the above-described third table 230 detects the optical image irradiated by the below-described adjustment light source device 500 through the optical unit 2. As shown in FIG. 13, the optical image detecting device 400 includes a condenser lens 410 and an image pickup 420.

The condenser lens 410 is arranged by a plurality of group lenses to condense the optical image irradiated by the light-irradiation side of the cross dichroic prism 244 (FIG. 3) of the optical unit 2, in other words, the optical image formed by the respective liquid crystal panels 241R, 241G and 241B of the optical unit 2, at the inside of the optical image detecting device 400.

The image pickup 420 includes an image plane 421 formed at a back-focus position of the condenser lens 410, the dichroic prism 422 for separating the image on the image plane 421 into the three colors of red, blue and green, and three CCDs 423R, 423G and 423B placed on the light-irradiation side of the dichroic prism 422 for superposing the respective irradiated color lights.

Figure 14:
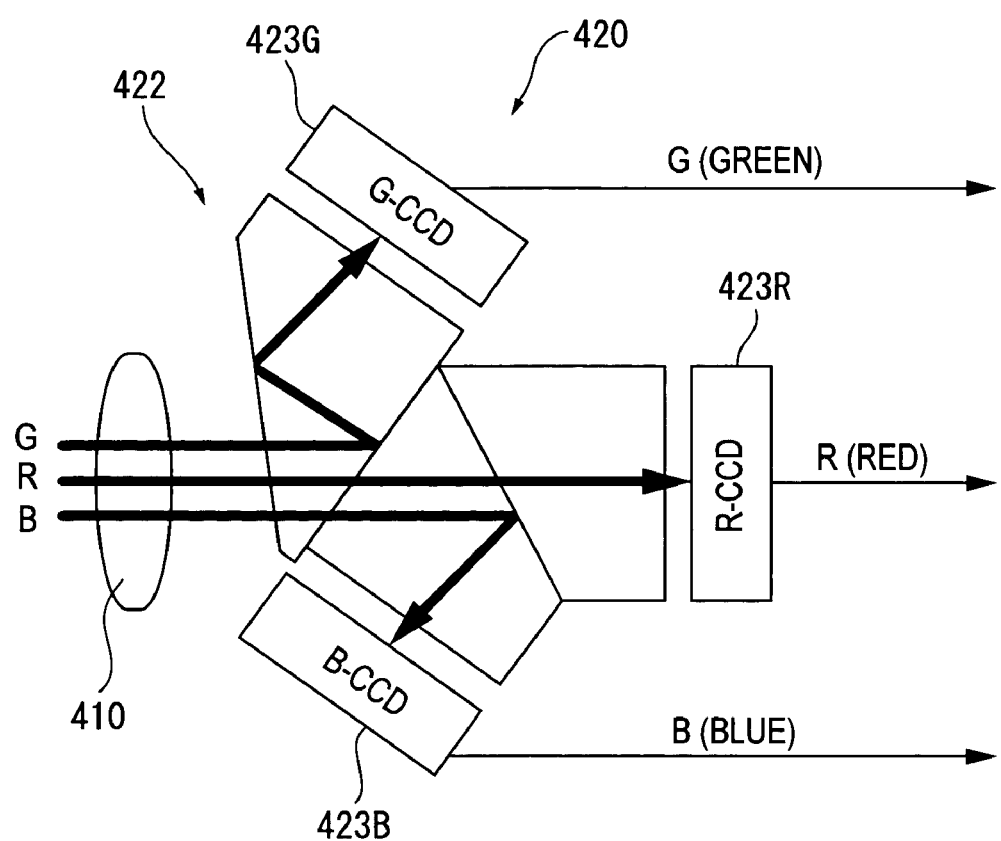
FIG. 14 is an illustration showing a modification of the optical image detecting device according to the aforesaid embodiment.

Incidentally, the image pickup 420 is not limited to such arrangement, and may employ an arrangement as shown in FIG. 14. More specifically, the dichroic prism 422 has three prisms. A blue light reflection film and a green light reflection film are formed among the three prisms. Accordingly, the light beam incident at the three prisms are separated into the respective color lights of R, G and B. Though the blue light reflection film and the green light reflection film are formed among the three prisms in this embodiment, a set of a blue light reflection film and a red light reflection film, or a set of a red light reflection film and a green light reflection film may be formed alternatively.

The three CCDs 423R, 423G and 423B are electrically connected to the control device 600 so that image signal (R, G or B signal) per each color light picked by the CCDs 423R, 423G and 423B is output to the control device 600.

(3-4) Structure of Adjustment Light Source Device 500

Figure 20:
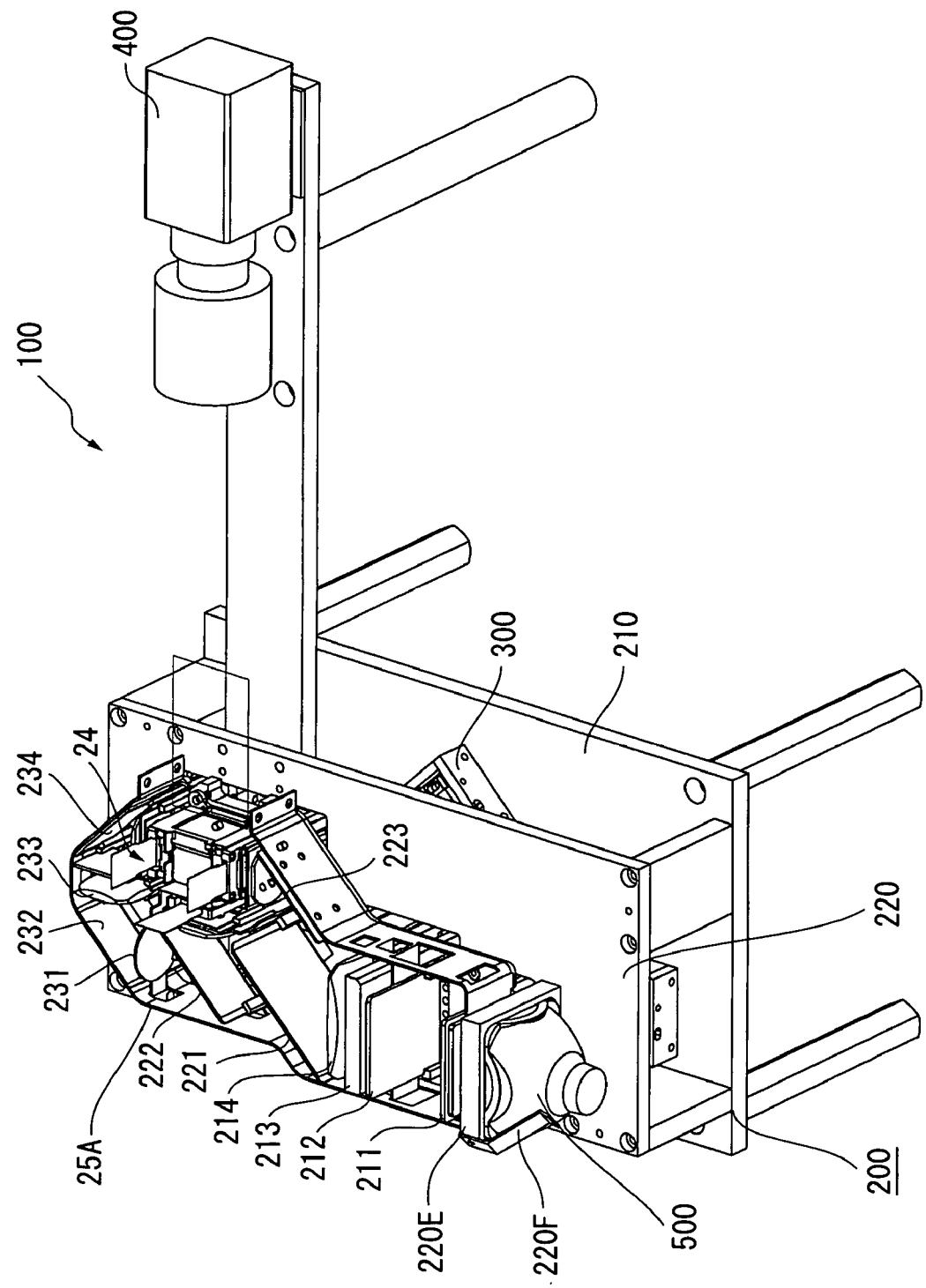
FIG. 20 is an illustration showing the state that the container and the optical component are placed on the manufacturing apparatus according to the aforesaid embodiment.

Referring to FIG. 20, the adjustment light source device 500 has a light source lamp and a reflector (both not shown) as the above-described light source device 4 of the projector 1, which is placed on the light source device mount 220E formed on the second table 220. The adjustment light source device 500 irradiates the light beam inside the optical unit 2 placed on the second table 220 on account of the electric power supplied by a power source device and a light source drive circuit (both not shown) placed below the first table 210 by way of a cable (not shown).

(3-5) Control Structure of Control Device 600

Figure 15:
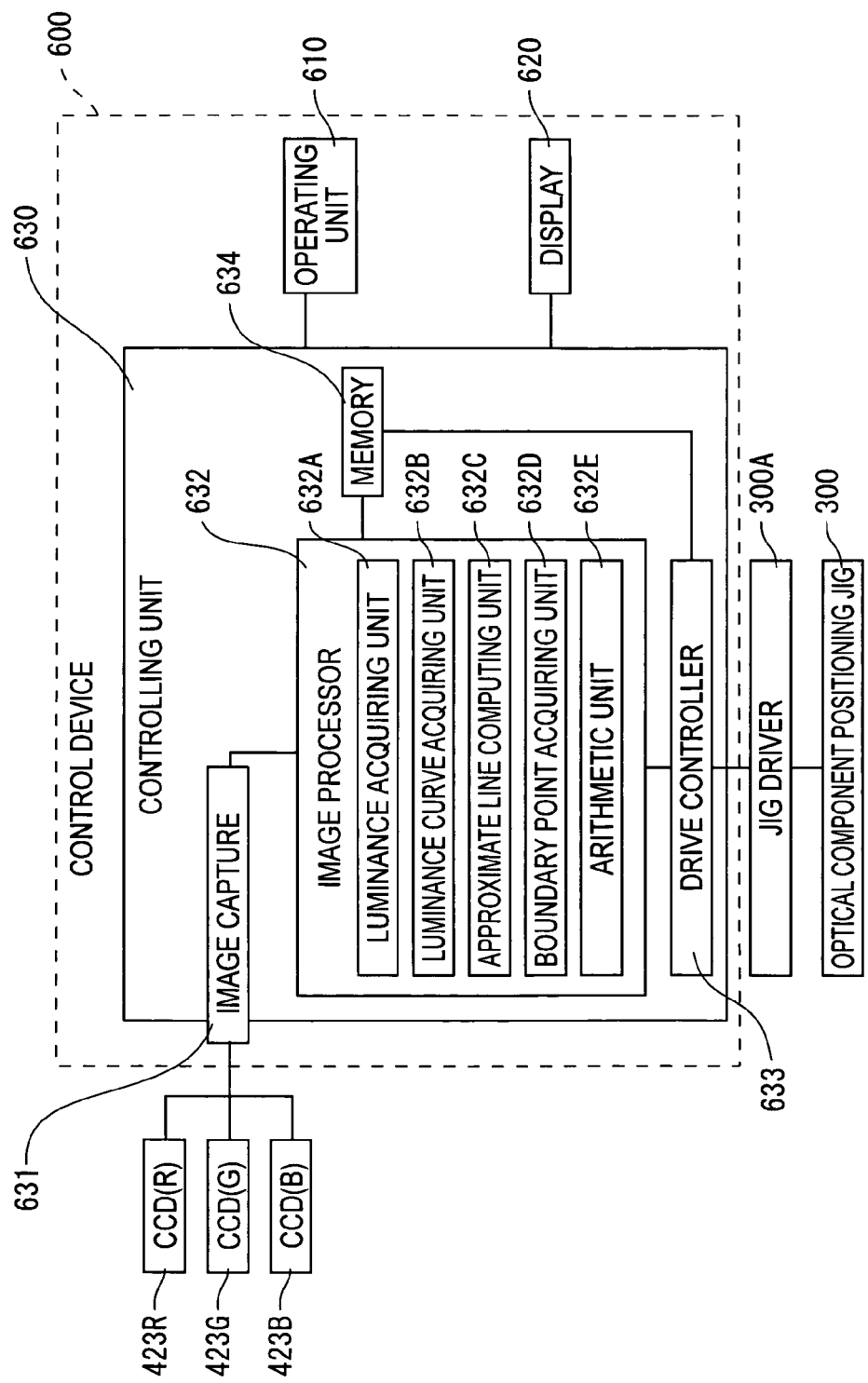
FIG. 15 is a block diagram schematically showing control structure of a control device according to the aforesaid embodiment.

FIG. 15 is a block diagram schematically showing control structure of the control device 600.

The control device 600 has a computer equipped with a CPU (Central Processing Unit) and a hard disk to entirely control the manufacturing apparatus 100 by executing various programs. As shown in FIG. 15, the control device 600 includes an operating unit 610, a display 620 and a controlling unit 630.

The operating unit 610 has, for instance, various operation buttons (not shown) input and operated by way of a keyboard, a mouse or the like. According to the input operation of the operation buttons etc., the control device 600 is operated and the operation of the control device 600 is configured for information displayed on the display 620 for example. Based upon the input operation of the operating unit 610 by an operator, a predetermined operation signal is output from the operating unit 610 to the controlling unit 630.

Note that, the input operation of the operating unit 610 is not limited to by way of the operation buttons. For instance, various requirements can be set and input by way of a touch panel, voice or the like.

The display 620 is controlled by the controlling unit 630 to display a predetermined image. For example, when displaying of an image processed by the controlling unit 630 or the input operation of the operating unit 610 causes setting or updating information stored in a below-described memory of the controlling unit 630, data in the memory output from the controlling unit 630 is appropriately displayed. The display 620 employs, for instance, a liquid crystal panel, an organic EL (electroluminescence), a PDP (Plasma Display Panel) or a CRT (Cathode-Ray Tube) etc.

The controlling unit 630, which is a program running on an OS (Operating System) for controlling the CPU, processes an image by capturing the image picked by the optical image detecting device 400 in response to the operation signal input from the operating unit 610, and controllably drives the optical component positioning jig 300 based on the processed image. As shown in FIG. 15, the controlling unit 630 includes an image capture 631, an image processor 632, a drive controller 633 and a memory 634.

For example, the image capture 631 has a video capture board etc. to input R, G and B signals output from the three CCDs 423R, 423G and 423B of the optical image detecting device 400 and to output the input R, G and B signals to the image processor 632 after being converted into an image signal.

The image processor 632 reads the image signal output from the image capture 631, processes the image corresponding to the read image signal and outputs a predetermined signal to the drive controller 633. As shown in FIG. 15, the image processor 632 includes a luminance acquiring unit 632A, a luminance curve acquiring unit 632B, an approximate line computing unit 632C, a boundary point acquiring unit 632D and an arithmetic unit 632E.

The luminance acquiring unit 632A acquires a luminance value of the image corresponding to the read image signal and relates the acquired luminance value to a coordinate value (plan position X and Y) corresponding to the luminance value to store in the memory 634.

The luminance curve acquiring unit 632B reads out the information stored in the memory 634 and acquires a luminance curve that represents variation of the luminance value on predetermined line (in X or Y direction) according to the read coordinate value.

The approximate line computing unit 632C computes an approximate line of the variation of the luminance value based on the luminance curve acquired by the luminance curve acquiring unit 632B.

The boundary point acquiring unit 632D acquires a boundary point of an illumination area included in the image corresponding to the read image signal, and each boundary point of the image formation areas of the liquid crystal panels 241R, 241G and 241B, the boundary point being included in the image corresponding to the read image signal, based on the approximate line computed by the approximate line computing unit 632C. The acquired boundary point is then stored in the memory 634.

The arithmetic unit 632E reads out the information stored in the memory 634 to compute each position adjustment amount of the respective optical components based on the read boundary points (of the illumination area and the image formation area) or the luminance value. Then, the computed position adjustment amount is output to the drive controller 633 after being converted into a predetermined signal.

The drive controller 633 outputs a control signal to a jig driver 300A in response to a predetermined control program and the signal output from the image processor 632 to operate the jig driver 300A to drive the optical component positioning jig 300.

The memory 634 stores the predetermined control program as is the information output from the image processor 632.

(4) Manufacturing Method of Optical Unit 2

A manufacturing method of the optical unit 2 by way of the above-described manufacturing apparatus 100 will be described below with reference to FIGS. 6, 15 and 16.

Figure 16:
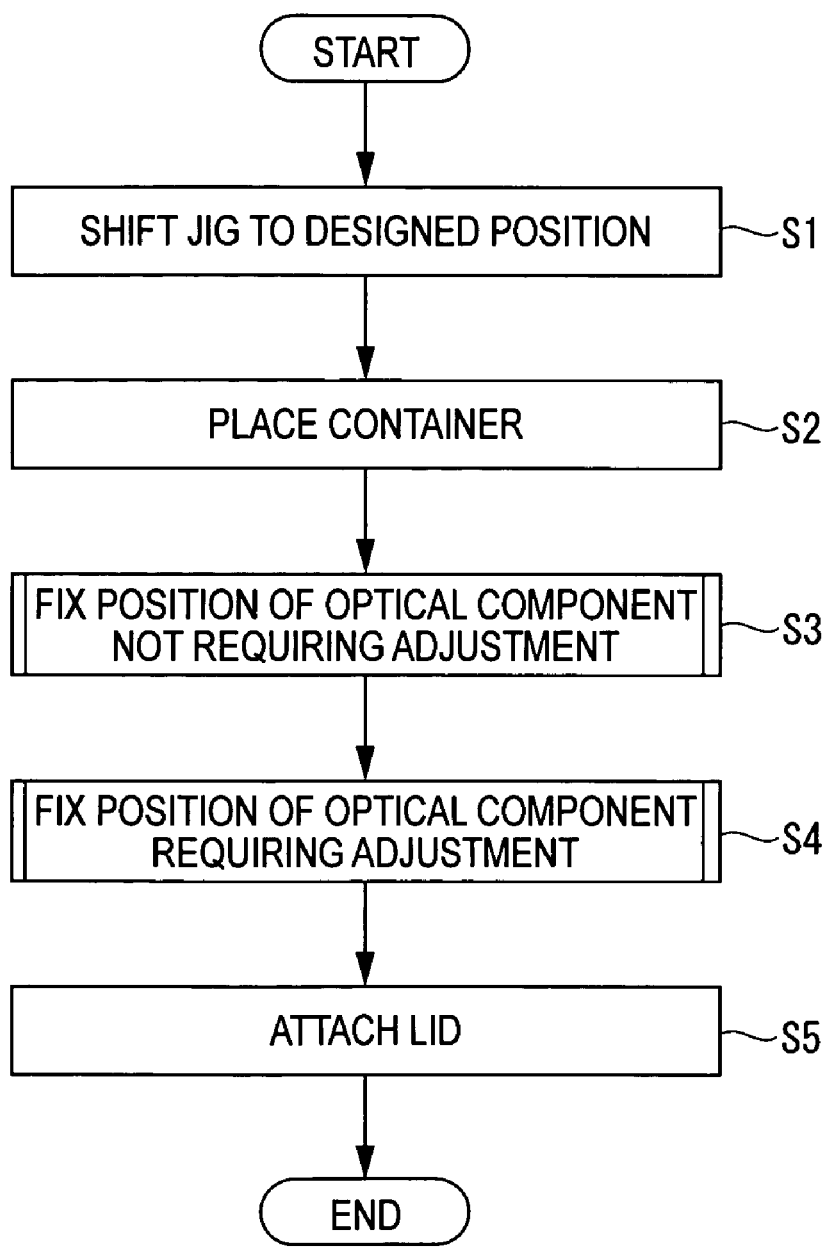
FIG. 16 is a flowchart explaining a manufacturing method of the optical unit according to the aforesaid embodiment.

FIG. 16 is a flowchart explaining the manufacturing method of the optical unit 2.

Firstly, an operator operates the operating unit 610 of the control device 600 to call up a predetermined program corresponding to the specifications of the optical unit 2 to be manufactured. The drive controller 633 of the control device 600 reads out the program stored in the memory 634 to output the control signal to the jig driver 300A, the signal requesting to shift the optical component positioning jig 300 to the designed predetermined position. Then, the pulse motors (not shown) are driven by the jig driver 300A to shift the Z-axis shifter 312, the X-axis shifter 313 and the shifter 316 of the first positioning jig 310; the Z-axis shifter 322, the X-axis shifter 323 and the second holder 326 of the second positioning jig 320; and the turning portion 333 of the third positioning jig 330 so that the optical component positioning jig 300 is arranged on the designed predetermined position (step S1).

Secondly, the container 25A is placed on the second table 220 of the manufacturing apparatus 100 (step S2).

Specifically, the operator shifts the container 25A so that the part of the optical component positioning jig 300 projecting from the upper side of the second table 220 is inserted to the hole 251D formed on the bottom side of the container 25A. Further, the positioning projection 220D formed on the upper side of the second table 220 is engaged with the positioning hole 251G formed on the bottom side of the container 25A so that the container 25A is placed at the predetermined position on the second table 220.

(4-1) Fixing Position of Optical Component Not Requiring Adjustment

Figure 17:
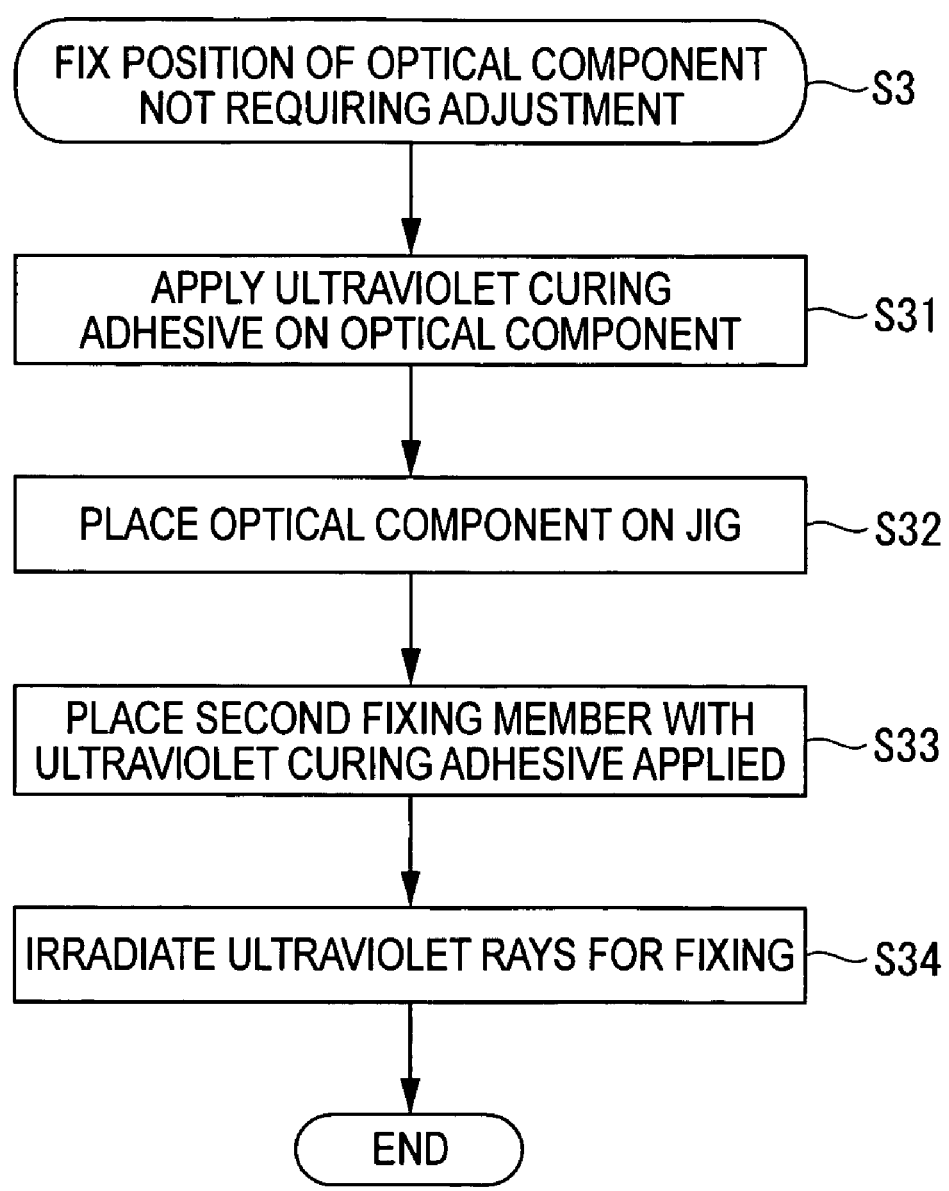
FIG. 17 is a flowchart explaining a manufacturing method of the optical unit according to the aforesaid embodiment.

After the step S2, the positions of the optical components 211, 221, 222, 224, 231, 232 and 234 not requiring the adjustment are fixed at the predetermined positions on the container 25A (step S3). In other words, the above procedure is performed according to a flowchart shown in FIG. 17.

Firstly, the operator applies the ultraviolet curing adhesive on the peripheries of the first lens array 211, the dichroic mirror 221 and 222, the three field lenses 224 and the incident-side lens 231 (step S31). The step S31 is necessary only for the optical components 211, 221, 222, 224 and 231. The step S31 is unnecessary for the reflection mirrors 232 and 234.

Then, the first lens array 211, the dichroic mirrors 221 and 222, the three field lenses 224 and the incident-side lens 231 each of which the ultraviolet curing adhesive is applied, and the reflection mirrors 232 and 234 each of which the ultraviolet curing adhesive is not applied are respectively placed on the corresponding optical component positioning jigs 300 (step S32).

Figure 18:
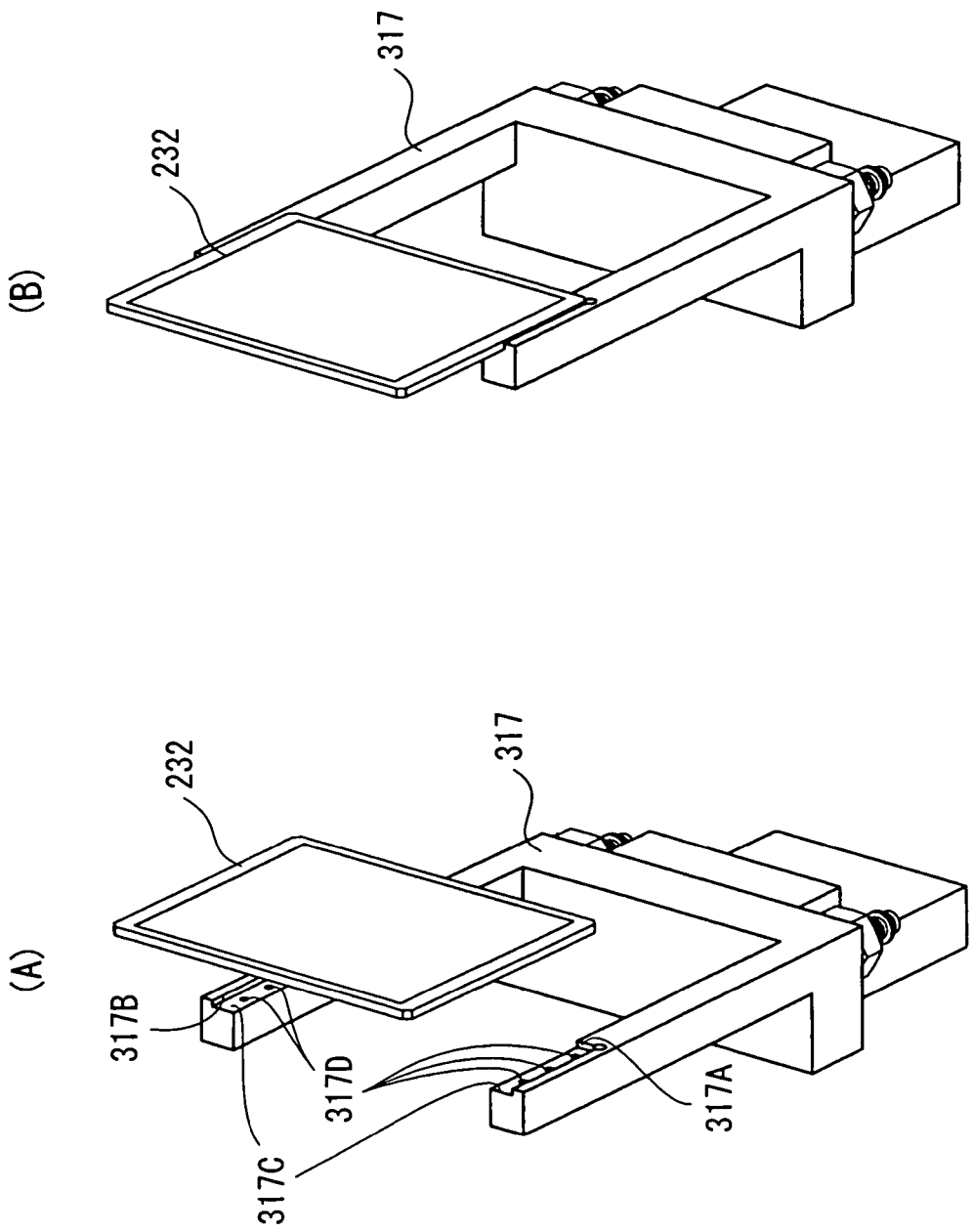
FIG. 18 is an illustration to explain a method for placing the optical component on the optical component positioning jig according to the aforesaid embodiment.

FIG. 18 is an illustration to explain a placing method of the optical component on the optical component positioning jig 300. FIG. 18 shows a placing method of the reflection mirror 232 on the first holder 317 of the first positioning jig 310. Since, other than the above, the first lens array 211, the dichroic mirrors 221 and 222, the three field lenses 224, the incident-side lens 231 and the reflection mirror 234 can be placed on the optical component jigs 300 in the approximately same manner as the above, the description will be omitted.

Specifically, as shown in FIG. 18(A), the operator places the reflection mirror 232 on the first holder 317 so that the outer periphery of the reflection mirror 232 abuts on the corresponding first support face 317A, the second support face 317B and the third support face 317C of the first positioning jig 310. At this time, the operator operates the operating unit 610 of the manufacturing apparatus 100 to output the operation signal for driving the vacuum pump (not shown) to the controlling unit 630. Based upon the input of the operation signal, the controlling unit 630 drives the vacuum pump (not shown) for intake of air in the communication hole 317D of the first positioning jig 310. As shown in FIG. 18(B), the reflection mirror 232 then sticks to the third support face 317C of the first holder 317 to be held by the first holder 317.

In this state, the first lens array 211, the dichroic mirrors 221 and 222, the three field lenses 224, the incident-side lens 231 and the reflection mirrors 232 and 234 have been positioned on the designed predetermined positions on the container 25A. Further, the peripheries of the first lens array 211, the dichroic mirrors 221 and 222, the three field lenses 224 and the incident-side lens 231 abut on the support portions 251B, 251F and 251I (FIG. 4) of the component housing 251 of the container 25A via the applied ultraviolet curing adhesive.

After the step S32, the ultraviolet curing adhesive is applied on the tip ends and the peripheries of the pins (not shown) of the second fixing member 254. The pins (not shown) of the second fixing member 254 each of which the ultraviolet curing adhesive is applied are inserted to the holes 251C (FIGS. 4 and 5) formed on the lateral side of the container 25A so that the tip ends of the pins abut on the back side of the reflection face of the reflection mirrors 232 and 234 (step S33). The step S33 is necessary only for the positioning operation of the reflection mirrors 232 and 234. The step S33 is unnecessary for other optical components 211, 221, 222, 224 and 231.

As described above, after positioning the optical components 211, 221, 222, 224, 231, 232 and 234 not requiring the adjustment, the ultraviolet curing adhesive is irradiated by ultraviolet ray so that the optical components 211, 221, 222, 224, 231, 232 and 234 are fixed on the container 25A (step S34).

More specifically, the operator operates the operating unit 610 of the manufacturing apparatus 100 to output the operation signal for driving the ultraviolet irradiator (not shown) to the controlling unit 630. Based upon the input of the operation signal, the controlling unit 630 drives the ultraviolet irradiator (not shown). The ultraviolet ray is irradiated from the upper side of the container 25A on the ultraviolet curing adhesive filled between the peripheries of the first lens array 211, the dichroic mirrors 221 and 222, the three field lenses 224 and the incident-side lens 231; and the respective support portions 251B, 251F and 251I (FIG. 4) of the component housing 251. Further, the ultraviolet ray is irradiated toward the second fixing members 254 from the lateral side of the container 25A. The irradiated ultraviolet ray passes through the rectangular frame 254A and the pins (not shown) to cure the ultraviolet curing adhesive applied between the peripheries of the pins and the holes 251C as well as the one applied between the tip ends of the pins and the back sides of the reflection faces of the reflection mirrors 232 and 234. According to the above manner, the optical components 211, 221, 222, 224, 231, 232 and 234 not requiring the adjustment are fixed on the container 25A.

(4-2) Fixing Position of Optical Component Requiring Adjustment

After the step S3, the positions of the optical components 212 to 214, 223, 233 and 242 requiring the adjustment are fixed at the predetermined positions on the container 25A (step S4). In other words, the above procedure is performed according to a flowchart shown in FIG. 19.

Firstly, the operator fits the positioning projection formed on the mount to the positioning hole 251E formed on the bottom side of the container 25A to fix the position of the prism unit on the container 25A by way of a screw (not shown) (step S41).

After step S41, the operator applies the ultraviolet curing adhesive on the peripheries of the second lens array 212, the polarization converter 213 and the incident-side polarization plate 242 (step S42). The step S42 is necessary only for the second lens array 212, the polarization converter 213 and the incident-side polarization plate 242. The step S42 is unnecessary for the superposing lens 214, the reflection mirror 223 and the relay lens 233.

Then, the second lens array 212, the polarization converter 213 and the incident-side polarization plate 242 each of which the ultraviolet curing adhesive is applied, and the superposing lens 214, the relay lens 233 and the reflection mirror 223 each of which the ultraviolet curing adhesive is not applied are respectively placed on the corresponding optical component positioning jigs 300 (step S43) Further, the peripheries of the second lens array 212, the polarization converter 213 and the incident-side polarization plate 242 abut on the support portions 251B and 251F (FIG. 4) of the component housing 251 on the container 25A via the applied ultraviolet curing adhesive. Since the method for positioning the optical components 212 to 214, 233 and 242 to the optical component positioning jig 300 is the approximately same manner as the above-described step S32, the description will be omitted.

After the step S43, the ultraviolet curing adhesive is applied on the grooves (not shown) and the peripheries of the first fixing members 253. Then, the first fixing members 253 with the ultraviolet curing adhesive being applied are inserted to the holes 251C formed on the lateral side of the container 25A so that the grooves (not shown) abut on the peripheries of the superposing lens 214 and the relay lens 233 at the left and right sides thereof. Further, in the same manner as the above-described step S33, the second fixing member 254 with the ultraviolet curing adhesive being applied is placed on the reflection mirror 223 (step S44). The step S44 is necessary only for the positioning operation of the superposing lens 214, the relay lens 233 and the reflection mirror 223. The step S44 is unnecessary for the second lens array 212, the polarization converter 213 and the incident-side polarization plate 242.

After the above-described operation, all of the optical components 211 to 214, 221 to 224, 231 to 234, 242 and the prism unit are placed on the designed predetermined positions of the container 25A (temporary positioning).

FIG. 20 shows the state that the container 25A, the optical components 211 to 214, 221 to 224, 231 to 234 and 242 and the prism unit have been placed on the manufacturing apparatus 100.

The operator operates the operating unit 610 of the control device 600 to call up a predetermined program for adjusting the positions of the optical components 212 to 214, 233 and 242. The control device 600 then reads out the predetermined program stored in the memory 634 to adjust the positions of the above optical components.

Firstly, the control device 600 operates a light source lamp of the adjustment light source device 500 to be lit so that light beam is conducted into the optical unit 2 (step 45). The control device 600 drives the optical image detecting device 400 to detect the optical image conducted into the optical unit 2 and formed by the liquid crystal panels 241R, 241G and 241B (step S46). When the optical image detecting device 400 detects the optical image, the image picked by the three CCDs 423R, 423G and 423B of the optical image detecting device 400 is separated into three colors of red, green and blue to output to the controlling unit 630 as R, G and B signals. The image capture 631 of the control device 600 inputs the three R, G and B signals and converts the R, G and B signals into the image signal to output to the image processor 632. The image processor 632 forms the picked image based on the input image signal.

Figure 21:
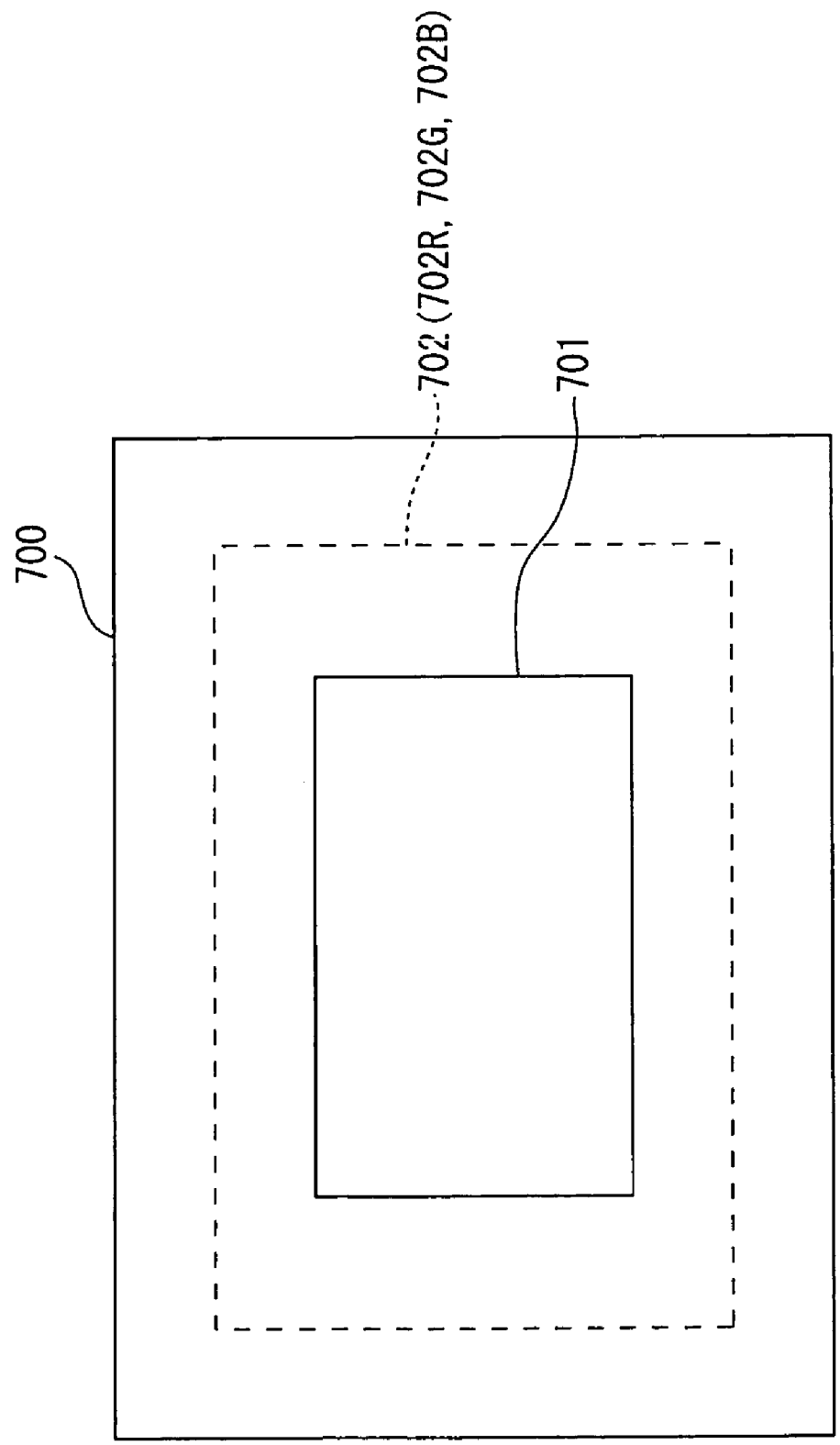
FIG. 21 is an illustration showing an example of an image captured by the control device, which is an optical image picked by the optical image detecting device, according to the aforesaid embodiment.

FIG. 21 is an illustration showing an example of the image captured by the control device 600, which is the optical image picked by the optical image detecting device 400. In FIG. 21, 700 denotes the picked image, 701 denotes an image formation area of the liquid crystal panels 241R, 241G and 241B, and 702 (702R, 702G and 702B) denotes each illumination-area reached to the respective liquid crystal panels 241R, 241G and 241B through the optical components.

In fact, shade may be displayed on the respective illumination areas 702R, 702G and 702G shown in FIG. 21 or the illumination distribution of the illumination area 702 may be uneven. This is because the positions of the optical components 211 to 214, 223 and 233 are relatively deviated. Based on the picked image 700, the relative positions of the optical components 211 to 214, 223 and 233 are adjusted to the optimum positions below.

(4-2-1) Position Adjustment of Second Lens Array 212 and Polarization Converter 213

Figure 22:
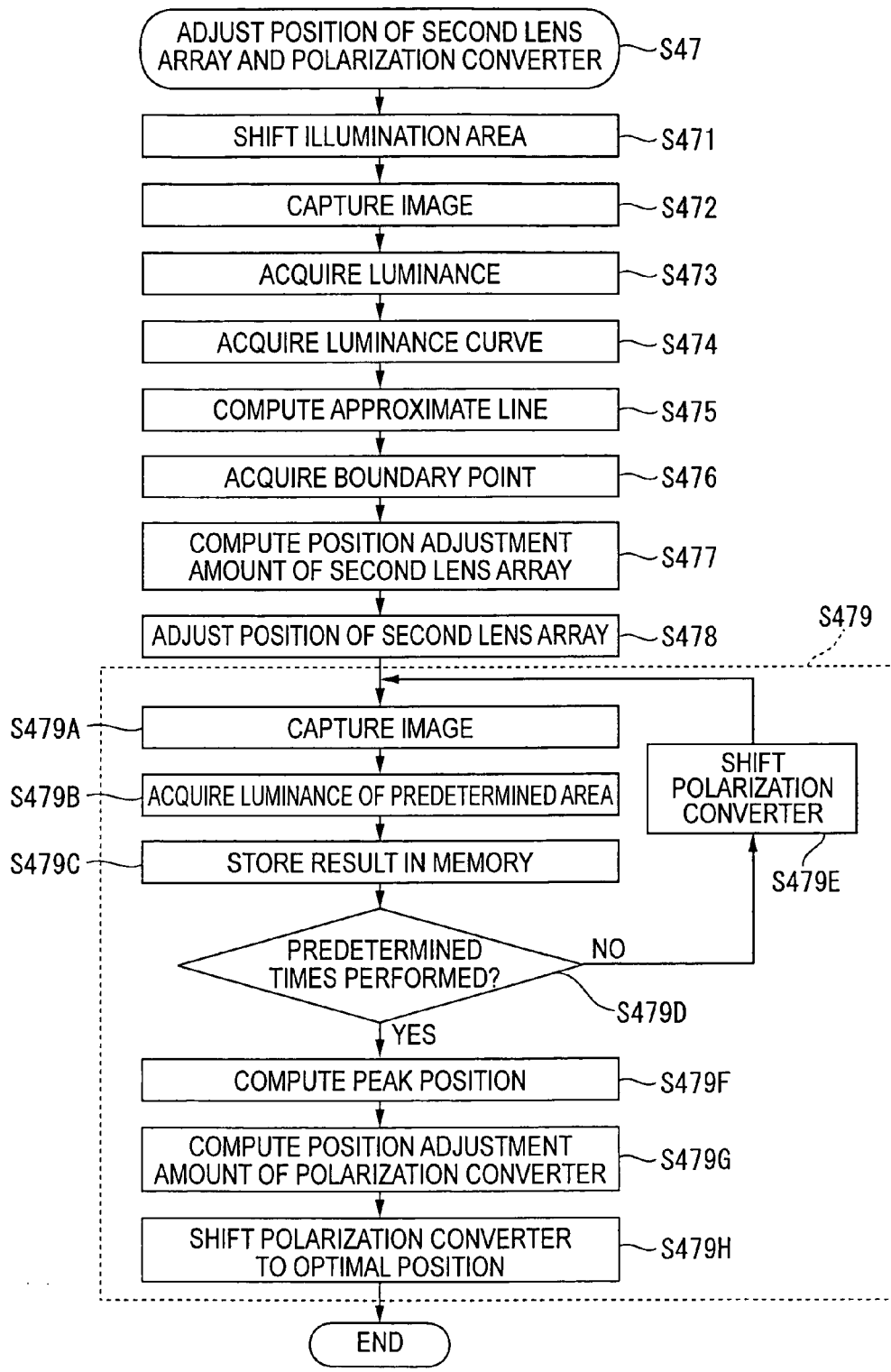
FIG. 22 is a flowchart explaining a manufacturing method of the optical unit according to the aforesaid embodiment.

After the step S46, the control device 600 adjusts the positions of the second lens array 212 and the polarization converter 213 based on the optical image picked by the CCD 423G for green light (FIGS. 13 and 14) (step S47). In other words, the above procedure is performed according to a flowchart shown in FIG. 22.

Firstly, the drive controller 633 of the control device 600 drives the jig driver 300A by outputting a predetermined control signal to the jig driver 300A. The pulse motors (not shown) are driven to shift the X-axis shifter 323 and the second holder 326 of the second positioning jig 320 for holding the superposing lens 214 for shifting the superposing lens 214 in X and Y directions only by a predetermined amount (step S471). At this time, on account of the surface tension of the ultraviolet curing adhesive, the first fixing members 253 suspending the superposing lens 214 follow when the superposing lens 214 shifts.

The image capture 631 of the controlling unit 630 inputs the G signal output from the CCD 423G for green light (FIGS. 13 and 14) of the optical image detecting device 400 and converts the input signal into an image signal to output to the image processor 632 (step S472).

Figure 23:
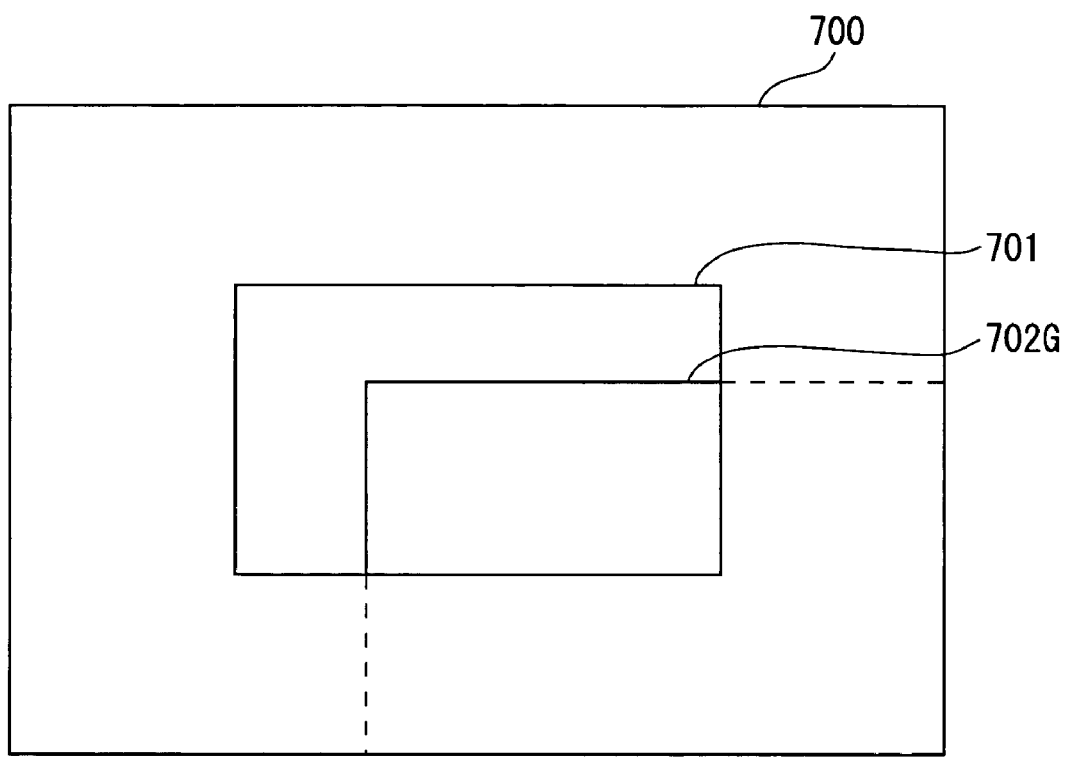
FIG. 23 is an illustration showing an example of an image captured by the control device, which is an optical image picked by the optical image detecting device, according to the aforesaid embodiment.

FIG. 23 is an illustration showing an example of the image captured by the control device 600, which is the optical image picked by the optical image detecting device 400.

In the step S471, as a result of that the superposing lens 214 is shifted in the X and Y directions only by the predetermined amount, the illumination area 702G shifts so that an upper left corner of the illumination area 702G is arranged inside the image formation area 701 as shown in FIG. 23.

Then, the luminance acquiring unit 632A of the control device 600 acquires the luminance value of the picked image 700 captured by the image capture 631 in the step S472 by dividing the luminance value into 256 gradations of 0 to 255 and relates the acquired luminance value to a coordinate value (plan position X and Y) corresponding to the luminance value to store in the memory 634 (step S473).

After the step S473, the luminance curve acquiring unit 632B of the control device 600 reads out the information stored in the memory 634 and acquires a luminance curve that represents variation of the luminance value on a predetermined X-coordinate and Y-coordinate (step S474).

Specifically, FIG. 24 shows an example of an acquiring method of the luminance curve by the luminance curve acquiring unit 632B.

As shown in FIG. 24(A) for example, the luminance curve acquiring unit 632B reads out the luminance value (gradation) on a scan line 800X (800Y) of the predetermined X-coordinate (Y-coordinate) and a coordinate value corresponding to the luminance value from the memory 634. As shown in FIG. 24(B), the luminance curve acquiring unit 632B plots a vertical axis as a gradation of the corresponding luminance value and a horizontal axis as a coordinate value on the scan line 800X (800Y) to acquire a luminance curve 900X (900Y).

In FIG. 24(B), in order to simplify the description of the luminance curve 900X (900Y), there is a luminance curve 900X (900Y) extending from a position XB (YB) of the FIG. 24(A) as a base point to the front of the right end (lower end) of the image formation area 701.

As shown in FIG. 24(B), the luminance curve 900X (900Y) is acquired as a crank-shape or an S-shape extending from the outside of the illumination area 702G to the inside thereof at the boundary of the illumination area 702G. Though not shown in FIG. 24(B), a luminance curve acquired from the range between the XA (YA) and XB (YB) in FIG. 24(A) and a luminance curve acquired from the range between the inside of the image formation area 701 and the outside thereof in FIG. 24(A) are also crank-shaped at the boundary of the image formation area 701.

After the step S474, the approximate line computing unit 632C of the control device 600 approximates the variation part of the luminance value in the luminance curve 900X or 900Y acquired by the luminance curve acquiring unit 632B as a line to compute the approximate line (step S475).

Figure 25:
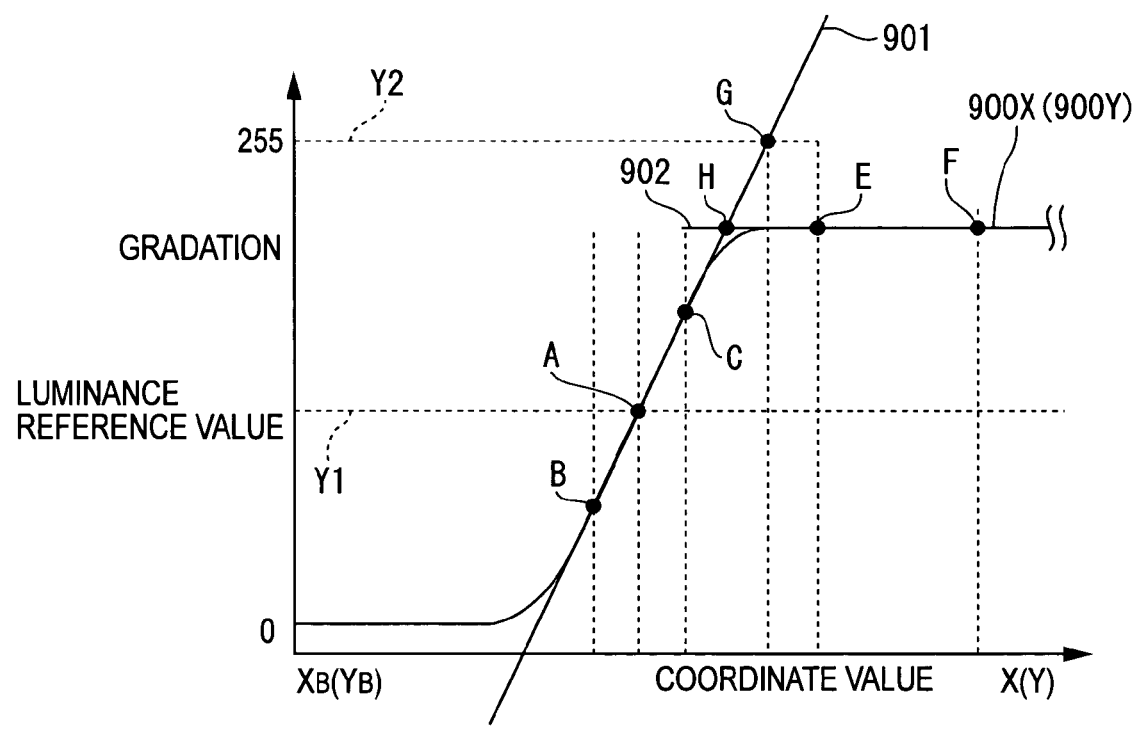
FIG. 25 is an illustration showing a part of the luminance curve in an enlarged manner according to the aforesaid embodiment.

FIG. 25 is an illustration in which a part of the luminance curve 900X (900Y) of FIG. 24(B) is enlarged Specifically, FIG. 25 shows an example of a computing method of the approximate line by the approximate line computing unit 632C.

As shown in FIG. 25 for instance, the approximate line computing unit 632C acquires a coordinate of an intersection point A defined by a luminance reference line Y1 representing a luminance reference value which is a predetermined reference and the luminance curve 900X (900Y). Further, the approximate line computing unit 632C acquires points B and C respectively spaced apart forward and backward from the intersection point A only by a predetermined coordinate X (Y) on the luminance curve 900X (900Y). The approximates line computing unit 632C then approximate the variation part of the luminance value between the acquired points B and C as a line to compute a variation approximate line 901.

Incidentally, in FIG. 25 as well as FIG. 24(B), there is a luminance curve 900X (900Y) extending from a position XB (YB) of the FIG. 24(A) as a base point to the front of the right end (lower end) of the image formation area 701. A luminance curve acquired from the range between the XA (YA) and XB (YB) of FIG. 24(A) and an approximate line of a luminance curve acquired from the range between the inside of the image formation area 701 and the outside thereof in FIG. 24(A) are computed in the same manner.

After the step S475, the boundary point acquiring unit 632D of the control device 600 acquires the boundary point of the illumination area 702G and the boundary point of the image formation area 701 (step S476). The boundary point acquiring unit 632D stores the acquired boundary points in the memory 634.

Specifically, FIG. 25 shows an example of an acquiring method of the boundary point by the boundary point acquiring unit 632D.

The boundary point acquiring unit 632D acquires an intersection point G defined by the variation approximate line 901 computed in the step S483 and a 255 gradation line Y2. Further, the boundary point acquiring unit 632D acquires a point E as a reference on the illumination area 702G at the coordinate shifted from the acquired intersection point G toward the center of the illumination area 702G only by a predetermined coordinate value X (or a predetermined coordinate value Y when acquiring the boundary point in the Y direction). Further, the boundary point acquiring unit 632D acquires a point F on the illumination area 702G as the approximate center of the picked image 700. Furthermore, the boundary point acquiring unit 632D approximates the illumination area 702G between the acquired points E and F to compute an illumination area approximate line 902. The boundary point acquiring unit 632D acquires an intersection point H defined by the variation approximate line 901 computed in the step S483 and the computed illumination area approximate line 902. The acquired intersection point H represents the boundary point (in the X or Y direction) of the illumination area 702G.

Note that, in the image formation area 701, boundary points of a left end and an upper end are acquired as the boundary points, and boundary points of a right end and a lower end are acquired as other boundary points after shifting the superposing lens 214. When the boundary points of the image formation area 701 are acquired, the use of a gradation line lower than the 255 gradation line Y2 for acquiring the intersection point G is only a matter different from that for acquiring the above-described intersection point H of the illumination area. Other than the above difference, since the intersection point G can be acquired in the same manner as the boundary point H of the illumination area, the description thereof will be omitted.

Further, though the steps S473 to S476 are performed for acquiring the boundary points of the image formation area 701, a designed position of the image formation area 701 can be set in advance, or boundary points of the image formation area 701 can be set in advance. With this arrangement, the steps S473 to 476 related to the image formation area 701 can be omitted.

After the step S476, the arithmetic unit 632E of the control device 600 reads out the boundary points of the illumination area 702G stored in the memory 634 to compute a position adjustment amount of the second lens array 212 based on the read boundary points (step S477). The arithmetic unit 632E stores the computed position adjustment amount in the memory 634. Specifically, the arithmetic unit 632E computes the position adjustment amount as follows for example.

The arithmetic unit 632E compares the read boundary points in the X and Y directions and the designed optimum boundary positions in the X and Y directions to compute a deviation in the X and Y directions relative to the designed optimum boundary positions. The deviation is occurred between the boundary points computed in the step S476 and the designed optimum boundary positions, because the second lens array 212 is deviated from the predetermined position relative to the first lens array 211. In other words, the computed deviations in the X and Y directions respectively correspond to an X-direction position adjustment amount and a Y-direction position adjustment amount of the second lens array 212.

After the step S477, the drive controller 633 reads out the X-direction position adjustment amount and the Y-direction position adjustment amount of the second lens array 212 stored in the memory 634 to output a control signal to the jig driver 300A for shifting the second lens array 212 only by the read position adjustment amounts in the X and Y directions. Based upon the input control signal, the jig driver 300A drives the pulse motors (not shown) to shift the X-axis shifter 323 and the second holder 326 of the second positioning jig 320 holding the second lens array 212 so that the second lens array 212 is shifted in the X and Y directions only by the position adjustment amounts computed in the step S485 (step S478).

Next, the controlling unit 630 of the control device 600 adjusts the position of the polarization converter 213 as follows (step S479).

The image capture 631 of the controlling unit 630 inputs the G signal output from the CCD 423G for green (FIGS. 13 and 14) light of the optical image detecting device 400 and converts the input signal into an image signal to output to the image processor 632 (step S479A).

Figure 26:
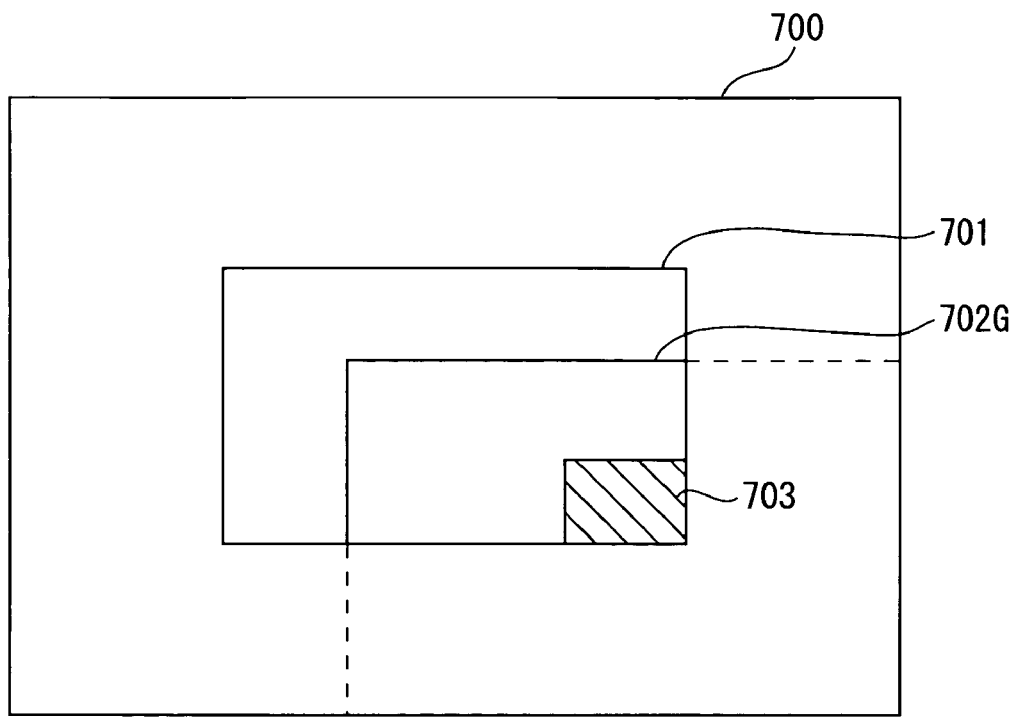
FIG. 26 is an illustration showing an example of an image captured by the control device, which is an optical image picked by the optical image detecting device, according to the aforesaid embodiment.

FIG. 26 is an illustration showing an example of the image captured by the control device 600, which is the optical image picked by the optical image detecting device 400.

Then, the luminance acquiring unit 632A of the control device 600 acquires a luminance value in a predetermined area 703 as shown in FIG. 26 in the picked image 700 captured by the image capture 631 in the step S479A (step S479B). The luminance acquiring unit 632A stores the acquired luminance value in the memory 634.

After the step S479B, the arithmetic unit 632E reads out the luminance value stored in the memory 634, equalizes and relates the luminance value to the position of the X-axis shifter 313 of the first positioning jig 310 holding the polarization converter 213 in the X direction to store in the memory 634 (step S479C).

The controlling unit 630 of the control device 600 determines where the above steps S479A to S479C are performed for a predetermined number of times according to the luminance value stored in the memory 634 (step S479D). If the controlling unit 630 determines "No", the drive controller 633 of the controlling unit 630 drives the jig driver 300A by outputting a predetermined control signal to the jig driver 300A. The pulse motor (not shown) is then driven to shift the X-axis shifter 313 of the first positioning jig 310 so that the polarization converter 213 is shifted in the X-axis direction by a predetermined amount (step S479E). Then, the above steps S479A to S479C are performed again.

As described above, the controlling unit 630 controls the jig driver 300A to shift the X-axis shifter 313 of the first positioning jig 310 holding the polarization converter 213 for shifting the polarization converter 213 by a predetermined amount in the X-axis direction so that the operation of acquiring the luminance value in the predetermined area 703 is repeated for the predetermined number of times.

Figure 27:
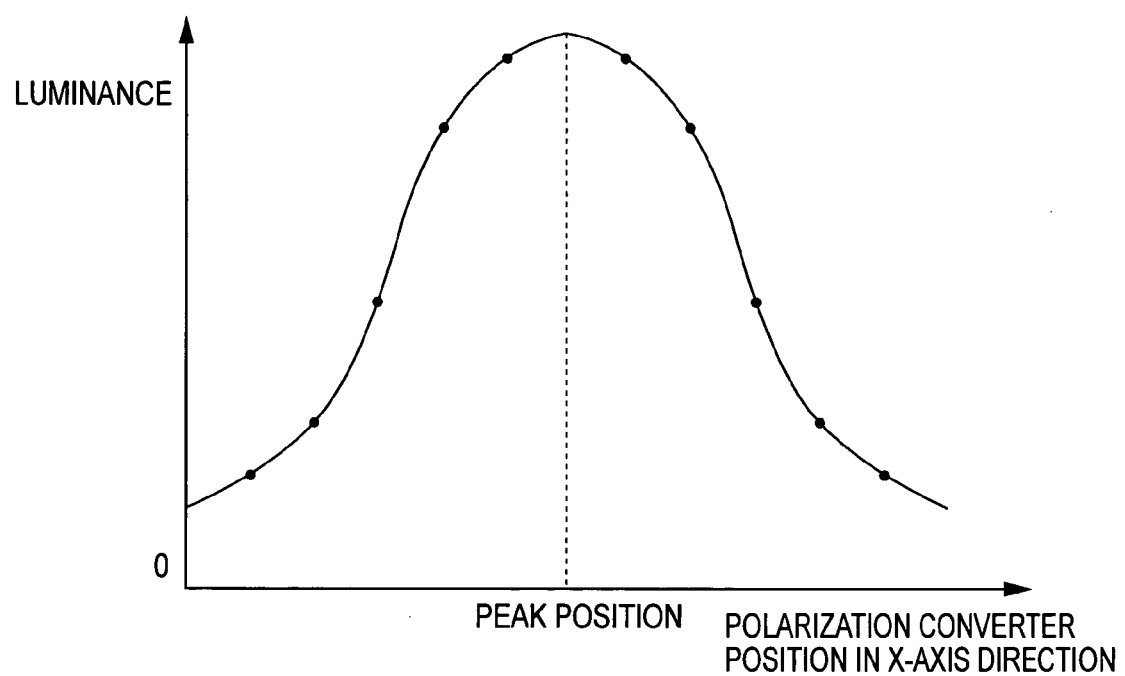
FIG. 27 is an illustration to explain a manufacturing method of the optical unit according to the aforesaid embodiment.

According to such operation, as shown in FIG. 27, a relationship between the position of the polarization converter 213 in the X-axis direction and the luminance value can be acquired.

On the other hand, when the controlling unit 630 determines "Yes" in the step S479D, or the above operation has been performed for the predetermined number of times, the arithmetic unit 632E of the controlling unit 630 reads out the luminance value corresponding to the position of the polarization converter 213 in the X-axis direction stored in the memory 634 to compute a peak position of the luminance value relative to the position of the polarization converter 213 in the X-axis direction (step S479F). In other words, the computed peak position represents the optimum position of the polarization converter 213 relative to the first lens array 211 and the second lens array 212.

After the step S479F, the arithmetic unit 632E computes a deviation between the current position of the X-axis shifter 313 of the first positioning jig 310 holding the polarization converter 213 in the X-axis direction and the computed peak position (step S479G). The deviation is then stored in the memory 634. The computed deviation corresponds to a position adjustment amount of the polarization converter 213.

After the step S479G, the drive controller 633 drives the jig driver 300A by outputting a predetermined control signal to the jig driver 300A based on the deviation stored in the memory 634. The pulse motor (not shown) is then driven to shift the X-axis shifter 313 of the first positioning jig 310 holding the polarization converter 213 so that the polarization converter 213 is shifted to the optimum position (step S479H).

By performing the above step S47, the illumination distribution of the illumination area 702 is equalized.

(4-2-2) Position Adjustment of Superposing Lens 214

Figure 28:
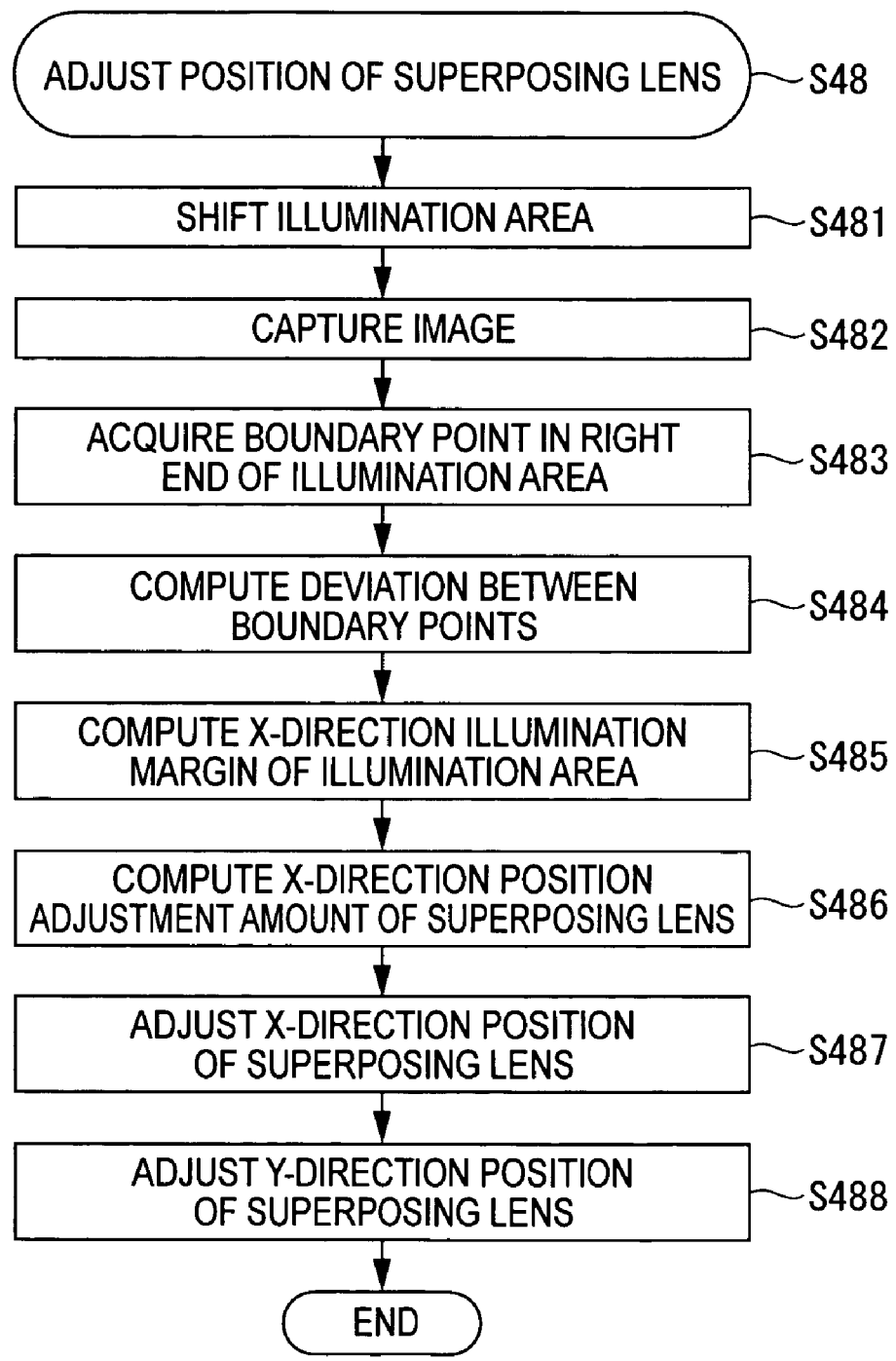
FIG. 28 is a flowchart explaining a manufacturing method of the optical unit according to the aforesaid embodiment.

In the step S47, after adjusting the positions of the second lens array 212 and the polarization converter 213, the control device 600 adjusts the position of the superposing lens 214 based on the optical image picked by the CCD 423G (FIGS. 13 and 14) for green light (step S48). In other words, the above procedure is performed according to a flowchart shown in FIG. 28.

Firstly, the drive controller 633 of the control device 600 drives the jig driver 300A by outputting a predetermined control signal to the jig driver 300A. The pulse motor (not shown) is then driven to shift the X-axis shifter 323 of the second positioning jig 320 holding the superposing lens 214 so that the superposing lens 214 is shifted in the X direction by a predetermined amount XG1 (FIG. 29(A)) (step S481).

The image capture 631 of the controlling unit 630 inputs the G signal output from the CCD 423G (FIGS. 13 and 14) for green light of the optical image detecting device 400 and converts the input signal into an image signal to output to the image processor 632 (step S482).

Figure 29:
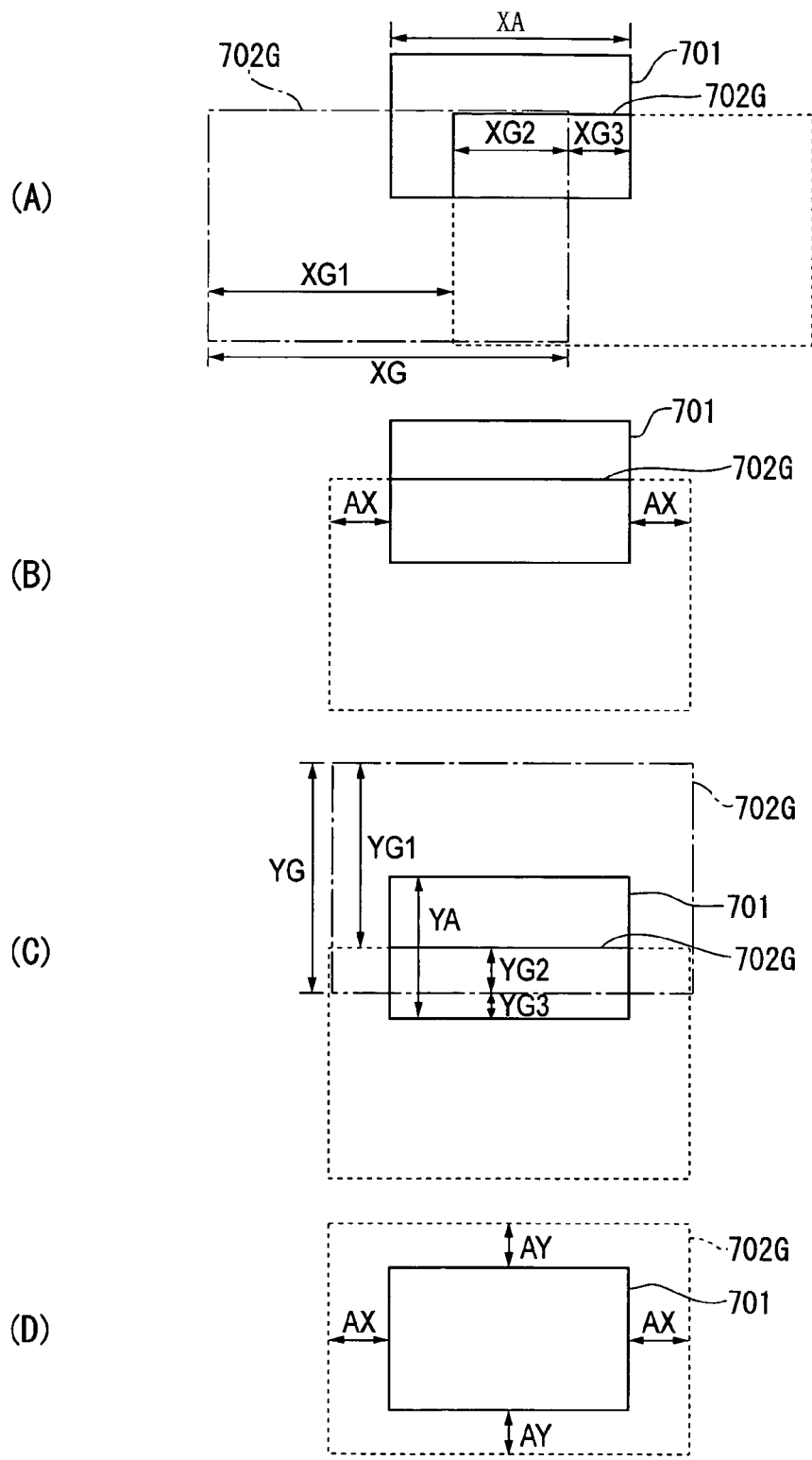
FIG. 29 is an illustration showing an example of an image captured by the control device, which is an optical image picked by the optical image detecting device, according to the aforesaid embodiment.

FIG. 29 is an illustration showing an example of the image captured by the control device 600, which is the optical image picked by the optical image detecting device 400.

In the step S481, as a result of that the superposing lens 214 is shifted in the X direction only by the predetermined amount XG1, the illumination area 702G shifts so that a right end of the illumination area 702G is arranged inside the image formation area 701 as shown by a chained line in FIG. 29(A).

The controlling unit 630 of the control device 600 acquires a boundary point at the right end of the illumination area 702G in the approximately same manner as the above-described steps S472 to S475 (step S483). The acquired boundary point is then stored in the memory 634.

After the step S483, the arithmetic unit 632E of the control device 600 computes a deviation XG2 between the boundary point acquired in the step S483 and stored in the memory 634, and the designed optimum boundary position set in advance (step S484). Incidentally, in the step S477, since the position of the second lens array 212 has been adjusted, the boundary point at the left end of the illumination area 702G shown by a solid or a broken line in FIG. 29(A) is positioned on the designed optimum boundary position set in advance.

After the step S484, the arithmetic unit 632E computes a width XG of the illumination area 702G in the X direction as shown in FIG. 29(A) based on the shift amount XG1 of the superposing lens 214 in the step S481 and the deviation XG2 in the step S484. Further, the arithmetic unit 632E reads out the respective boundary points at the left and right ends of the image formation area 701 stored in the memory 634 to compute the deviation XA (FIG. 29(A)) between the boundary points. The deviation XA corresponds to the width of the image formation area 701 in the X direction. The arithmetic unit 632E then computes illumination margins AX (FIG. 29(B)) of the illumination area 702G in the X direction based on the computed width XG of the illumination area 702G and the width XA of the image formation area 701 (step S485). Specifically, the arithmetic unit 632E subtracts the width XA of the image formation area 701 from the width XG of the illumination area 702G, and then divides the subtracted value by two to compute the illumination margins AX (FIG. 29(B)). That is, the left and right illumination margins AX of the illumination area 702G are the same.

In the step S485, after computing the illumination margins AX, the arithmetic unit 632E reads out the boundary point at the right end of the illumination area 702G and the boundary point at the right end of the image formation area 701 stored in the memory 634. Further, the arithmetic unit 632E computes a deviation XG3 (FIG. 29(A)) between the respective read boundary points to compute a position adjustment amount of the superposing lens 214 in the X direction based on the computed deviation XG3 and the illumination margins AX computed in the step S485 (step S486). The arithmetic unit 632E then stores the computed position adjustment amount in the X direction in the memory 634.

The drive controller 633 of the control device 600 reads out the position adjustment amount of the superposing lens 214 in the X direction stored in the memory 634 to output a control signal corresponding to the read position adjustment amount to the jig driver 300A. Then, the jig driver 300A drives the pulse motor (not shown) to shift the X-axis shifter 323 of the second positioning jig 320 holding the superposing lens 214 so that the superposing lens 214 is shifted in the X direction only by the position adjustment amount computed by the arithmetic unit 632E (step S487). In this state, as shown in FIG. 29(B), the left and right illumination margins of the illumination area 702G are the same.

As described above, after adjusting the position of the superposing lens 214 in the X direction, the position of the superposing lens 214 in the Y direction is adjusted (step S488).

The position of the superposing lens 214 in the Y direction can be adjusted in the approximately same manner as the process (the steps S481 to S487) for the above position adjustment in the X direction.

Specifically, referring to FIGS. 29(C) and (D), the superposing lens 214 is shifted in the Y direction only by a predetermined amount YG1 so that the lower end of the illumination area 702G is arranged inside the image formation area 701 in the same manner as the above-described step S481.

Further, a boundary point at the lower end of the illumination area 702G is acquired to compute a deviation YG2 between the acquired boundary point and the designed optimum boundary position set in advance in the same manner as the above-described steps S482 to S484.

Further, a width YG of the illumination area 702G in the Y direction based on the shift amount YG1 of the superposing lens 214 and the deviation YG2, and also a width YA of the image formation area 701 in the Y direction based on the respective boundary points at the lower end and the upper end of the image formation area 701 in the same manner as the above-described step S485. Then, illumination margins AY of the illumination area 702G in the Y direction are computed based on the computed width YG of the illumination area 702G and the width YA of the image formation area 701.

Furthermore, a position adjustment amount of the superposing lens 214 in the Y direction is computed based on a deviation YG3 between the boundary point at the lower end of the illumination area 702G and the boundary point at the lower end of the image formation area 701, and the illumination margins AY in the same manner as the above-described step S486.

The position of the superposing lens 214 is then adjusted in the Y direction based on the computed position adjustment amount in the Y direction in the same manner as the above-described step S487.

In this state, as shown in FIG. 29(D), the left and right illumination margins AX of the illumination area 702G are the same while the upper and lower illumination margins AY of the illumination area 702G are the same.

(4-2-3) Position Adjustment of Relay Lens 233

Figure 30:
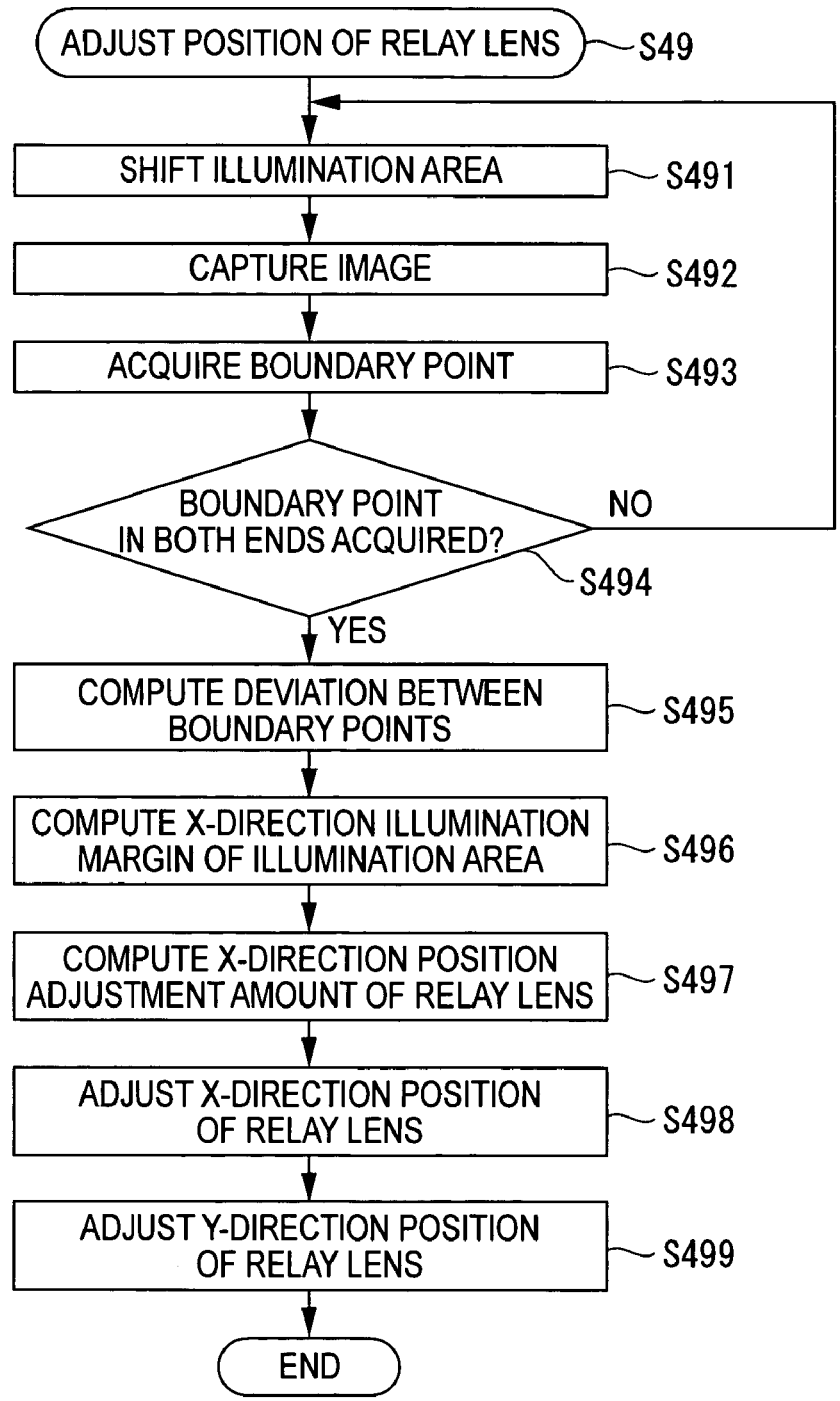
FIG. 30 is a flowchart explaining a manufacturing method of the optical unit according to the aforesaid embodiment.

In the step S48, after adjusting the position of the superposing lens 214, the control device 600 adjusts the position of the relay lens 233 based on the optical image picked by the CCD 423B for blue light (FIGS. 13 and 14) so that the illumination area of the blue light is positioned at a predetermined position relative to the image formation area of the liquid crystal panel 241B (step S49). In other words, the above procedure is performed according to a flowchart shown in FIG. 30.

Firstly, the drive controller 633 of the control device 600 drives the jig driver 300A by outputting a predetermined control signal to the jig driver 300A. The pulse motor (not shown) is driven to shift the X-axis shifter 323 of the second positioning jig 620 holding the relay lens 233 so that the relay lens 233 is shifted in the X direction only by a predetermined amount XB1 (refer to FIG. 31(A)) (step S491). On account of the surface tension of the ultraviolet curing adhesive, the first fixing members 253 suspending the relay lens 233 follow when the relay lens 233 shifts The image capture 631 of the controlling unit 630 inputs the B signal output from the CCD 423B for blue light (FIGS. 13 and 14) of the optical image detecting device 400 and converts the input signal into an image signal to output to the image processor 632 (step S492).

Figure 31:
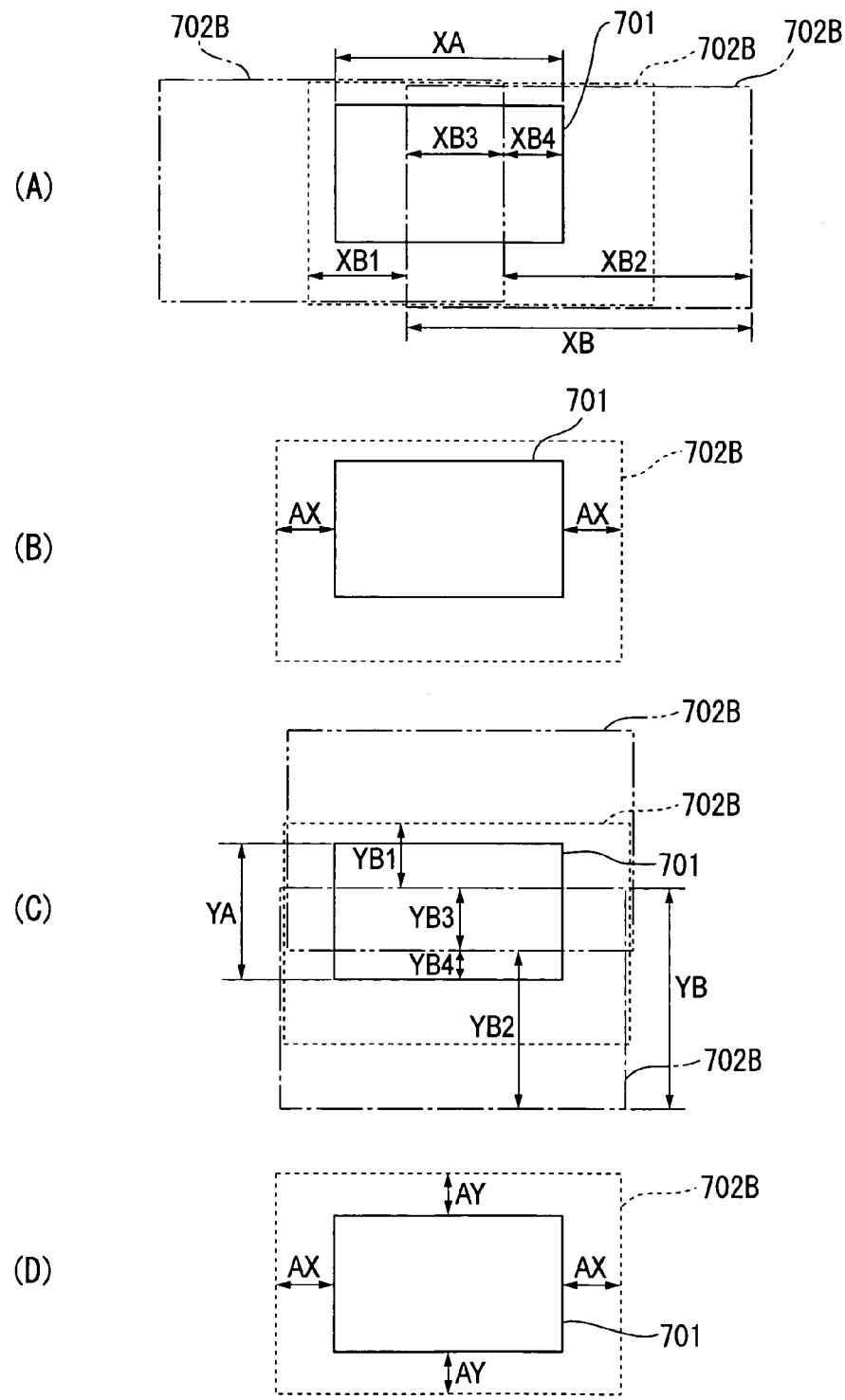
FIG. 31 is an illustration showing an example of an image captured by the control device, which is an optical image picked by the optical image detecting device, according to the aforesaid embodiment.

FIG. 31 is an illustration showing an example of the image captured by the control device 600, which is the optical image picked by the optical image detecting device 400.

In the step S491, as a result of that the relay lens 233 is shifted in the X direction only by the predetermined amount XB1, the illumination area 702B shifts so that a left end of the illumination area 702B is arranged inside the image formation area 701 as shown by a chained line in FIG. 31(A).

Then, the controlling unit 630 of the control device 600 acquires a boundary point at the left end of the illumination area 702B in the approximately same manner as the above-described steps S472 to S475 (step S493). The acquired boundary point is then stored in the memory 634.

After the step S493, the controlling unit 630 of the control device 600 determines whether boundary points at both sides of the illumination area 702B are acquired or not based on the information stored in the memory 634 (step S494).

In the step S494, when the controlling unit 630 determines "No", or determines that a boundary point at only one end of the illumination area 702B is acquired, the step returns to the step S491 so that the drive controller 633 of the control unit 600 shifts the X-axis shifter 323 of the second positioning jig 620 holding the relay lens 233 in a direction opposite to the above shifting direction to shift the relay lens 233 in the X direction only by a predetermined amount XB2 (FIG. 31(A)).

In the step S492, as described above, the image capture 631 of the controlling unit 630 then captures the image picked by the optical image detecting device 400.

As a result of that the relay lens 233 is shifted in the X direction only by the predetermined amount XB2, the illumination area 702B shifts so that a right end of the illumination area 702B is arranged inside the image formation area 701 as shown by a chain double-dashed line in FIG. 31(A).

In the step S493, as described above, the controlling unit 630 of the control device 600 acquires a boundary point at the right end of the illumination area 702B to store the acquired boundary point in the memory 634.

On the other hand, in the step S494, when the controlling unit 630 determines "Yes", or determines that the boundary points at the both (left and right) ends of the illumination area 702B are acquired, the arithmetic unit 632E reads out the boundary points at the left and right ends of the illumination area 702B stored in the memory 634 to compute a deviation XB3 between the above boundary points (step S495).

After the step S495, the arithmetic unit 632E computes a width XB of the illumination area 702B in the X direction as shown in FIG. 31(A) based on the shift amount XB2 of the relay lens 233 in the step S491 and the deviation XB3 computed in the step S495. Further, the arithmetic unit 632E reads out the respective boundary points at the left and right ends of the image formation area 701 stored in the memory 634 to compute the deviation XA (FIG. 31(A)) between the boundary points. The deviation XA corresponds to the width of the image formation area 701 in the X direction. The arithmetic unit 632E then computes illumination margins AX (FIG. 31(B)) of the illumination area 702B in the X direction based on the computed width XB of the illumination area 702B and the width XA of the image formation area 701 in the same manner as the above-described step S485 (step S496).

In the step S496, after computing the illumination margins AX, the arithmetic unit 632E reads out the boundary point at the right end of the illumination area 702B and the boundary point at the right end of the image formation area 701 stored in the memory 634. Further, the arithmetic unit 632E computes a deviation XB4 (FIG. 31(A)) between the respective read boundary points to further compute a position adjustment amount of the relay lens 233 in the X direction based on the computed deviation XB4 and the illumination margins AX computed in the step S496 (step S497). The arithmetic unit 632E then stores the computed position adjustment amount in the X direction in the memory 634.

After the step S497, the drive controller 633 of the control device 600 reads out the position adjustment amount of the relay lens 233 in the X direction stored in the memory 634 to output a control signal corresponding to the read position adjustment amount to the jig driver 300A. Then, the jig driver 300A drives the pulse motor (not shown) to shift the X-axis shifter 323 of the second positioning jig 320 holding the relay lens 233 so that the relay lens 233 is shifted in the X direction only by the position adjustment amount computed by the arithmetic unit 632E (step S498). In this state, as shown in FIG. 31(B), the left and right illumination margins AX of the illumination area 702B are the same.

As described above, after adjusting the position of the relay lens 233 in the X direction, the position of the relay lens 233 in the Y direction is adjusted (step S499). The position of the relay lens 233 in the Y direction can be adjusted in the approximately same manner as the above process (steps S491 to S498) for the position adjustment in the X direction.

Specifically, referring to FIGS. 31(C) and (D), the relay lens 233 is shifted in the Y direction only by a predetermined amount YB1 so that an upper end of the illumination area 702B is arranged inside the image formation area 701 to acquire a boundary point at the upper end of the illumination area 702B in the same manner as the above-described steps S491 to S494. Further, the relay lens 233 is shifted in the Y direction by a predetermined amount YB2 so that a lower end of the illumination area 702B is arranged inside the image formation area 701 to acquire a boundary point at the lower end of the illumination area 702B.

A deviation YB3 between the respective boundary points at the upper and lower ends of the illumination area 702B is acquired in the same manner as the above-described step S495.

A width YB of the illumination area 702B in the Y direction is computed as is a width YA of the image formation area 701 in the Y direction to further compute illumination margins AY of the illumination area 702B in the Y direction based on the widths YB and YA in the same manner as the above-described step S496.

Furthermore, a position adjustment amount of the relay lens 233 in the Y direction is computed based on a deviation YB4 between the boundary point at the lower end of the illumination area 702B and the boundary point at the lower end of the image formation area 701, and the illumination margins AY of the illumination area 702B in the Y direction, in the same manner as the above-described step S497.

The position of the relay lens 233 is then adjusted in the Y direction based on the computed position adjustment amount of the Y direction in the same manner as the above-described step S498.

In this state, as shown in FIG. 31(D), the left and right illumination margins AX of the illumination area 702B are the same while the upper and lower illumination margins AY of the illumination area 702B are the same. Accordingly, the above-described illumination area 702G for green light is coincided with the illumination area 702B for blue light.

(4-2-4) Position Adjustment of Reflection Mirror 223

In the step S49, after the position of the relay lens 233 is adjusted, the control device 600 adjusts the position of the reflection mirror 223 based on the optical image picked by the CCD 423R for red light (FIGS. 13 and 14) to position the illumination area by way of the red light at a predetermined position relative to the image formation area of the liquid crystal panel 241R (step S50).

Incidentally, the description will be omitted since the position of the reflection mirror 223 can be adjusted in the same manner as the position adjustment of the relay lens 233, except that the control device 600 controllably drives the first positioning jig 310 holding the reflection mirror 223, and that the position thereof is adjusted based on the illumination area 702R for red light (FIG. 21). The second fixing members 254 abutting on the reflection mirror 223 follow when the position of the reflection mirror 223 is adjusted on account of the surface tension of the ultraviolet curing adhesive.

(4-2-5) Position Adjustment of Incident-side Polarization Plate 242

Figure 32:
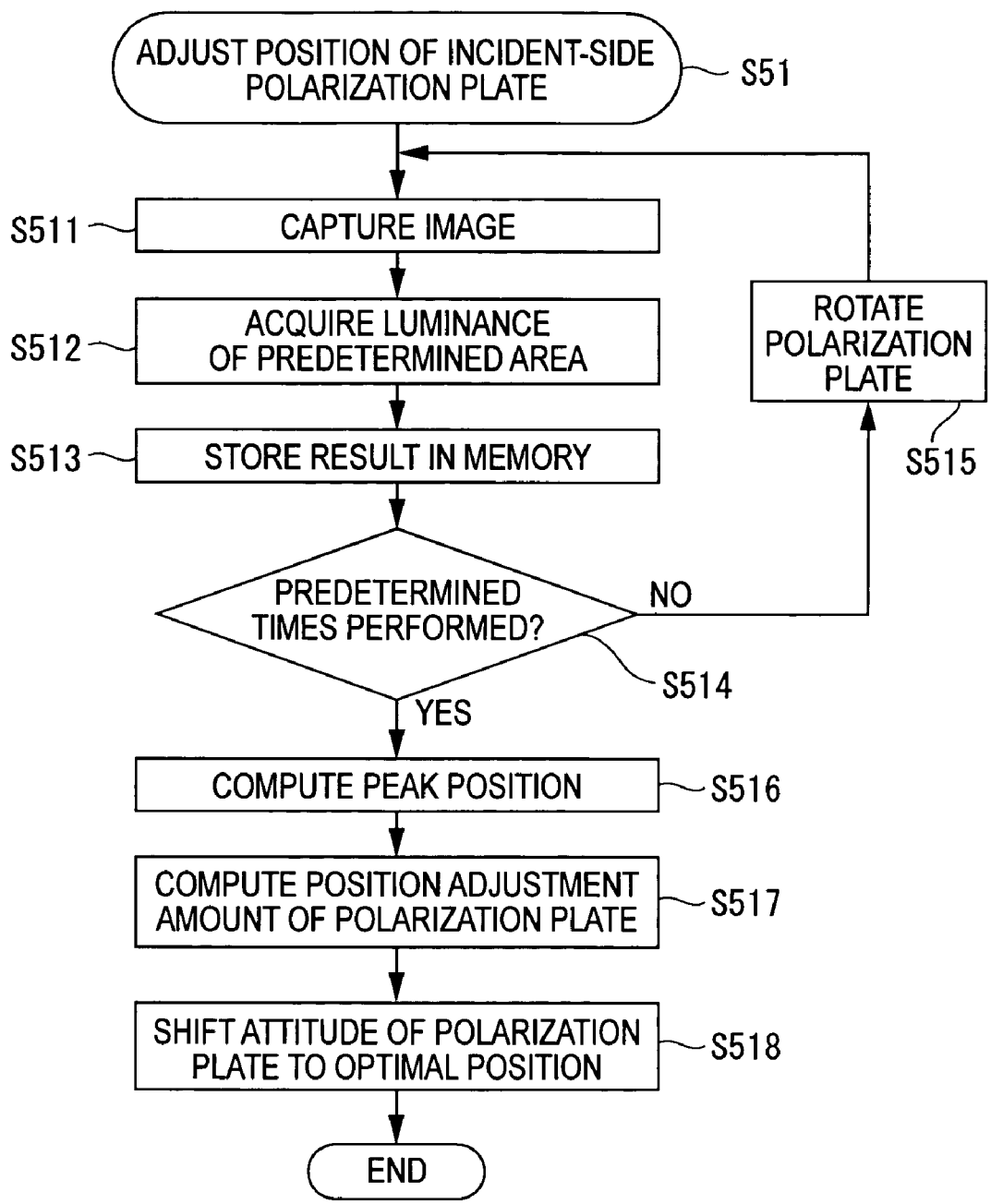
FIG. 32 is a flowchart explaining a manufacturing method of the optical unit according to the aforesaid embodiment.

In the steps S47 to S50, after the positions of the superposing lens 214, the relay lens 233 and the reflection mirror 223 are adjusted while the illumination areas of the green, blue and the red lights are aligned, the control device 600 adjusts the position of the incident-side polarization plates 242 (step S51). In other words, the above procedure is performed according to a flowchart shown in FIG. 32.

Note that, a predetermined pattern generating device (not shown) is used to generate a pattern causing full shade areas (dark and black) on the liquid crystal panels 241R, 241G and 241B so that the optical image detecting device 400 picks the entirely black picked images 700.

Firstly, the image capture 631 of the controlling unit 630 inputs the R, G and B signals output from the optical image detecting device 400 and converts the input signals into an image signal to output to the image processor 632 (step S511).

Figure 33:
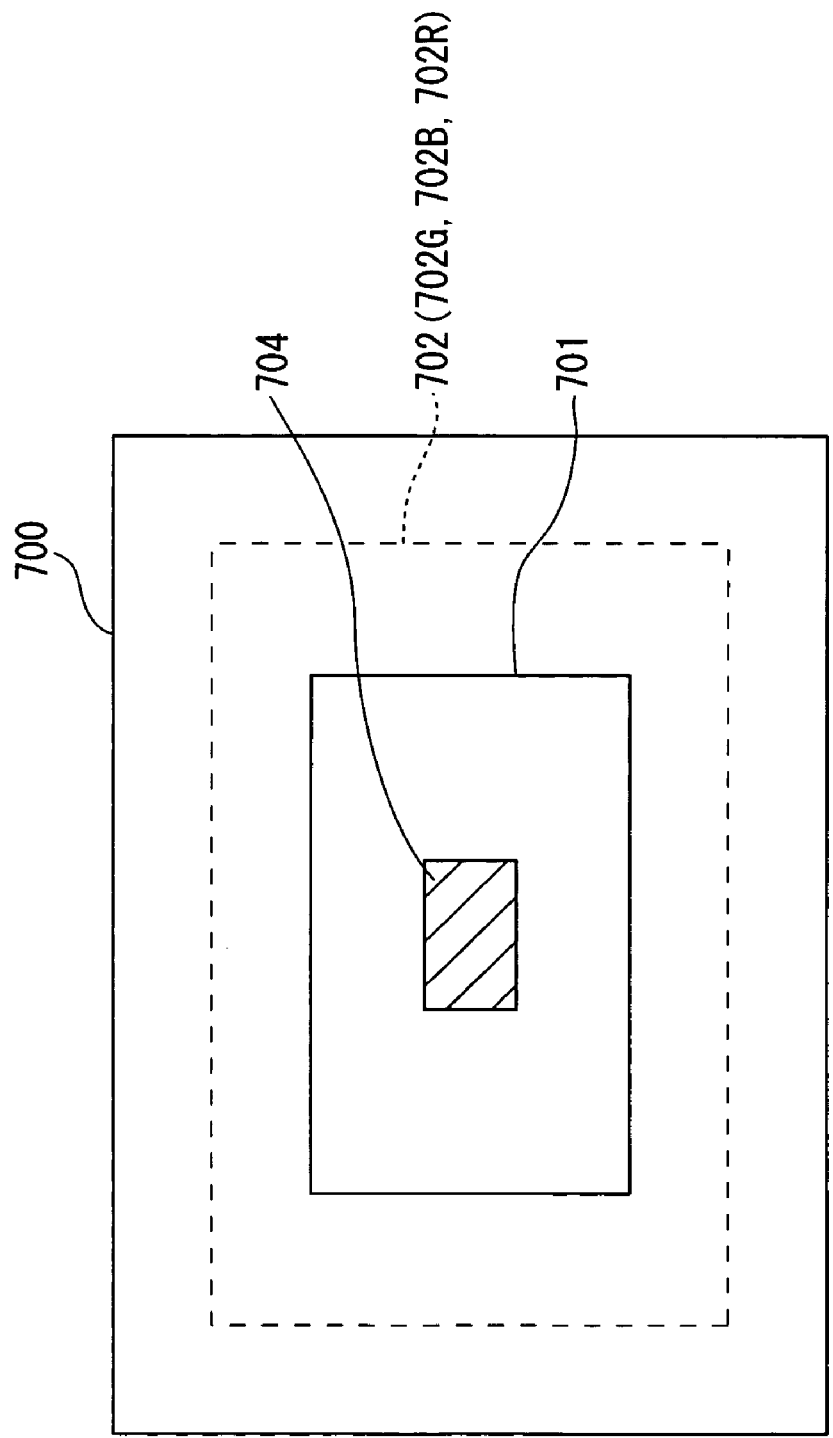
FIG. 33 is an illustration showing an example of an image captured by the control device, which is an optical image picked by the optical image detecting device, according to the aforesaid embodiment.

FIG. 33 is an illustration showing an example of the image captured by the control device 600, which is the optical image picked by the optical image detecting device 400.

Then, the luminance acquiring unit 632A of the control device 600 acquires a luminance values in an area 704 (FIG. 33) at the approximately center of each picked image 700 by way of the red, green and blue lights (step S512). The luminance acquiring unit 632A stores the acquired luminance values of the respective red, green and blue lights in the memory 634.

After the step S512, the arithmetic unit 632E reads out the luminance values of the respective red, green and blue lights stored in the memory 634 to equalize them. The equalized luminance value is related to each turn angle position of the turning portions 333 of the third positioning jig 330 holding the incident-side polarization plates 242 corresponding to each of the R, G and B to store in the memory 634 (step S513).

The controlling unit 630 of the control device 600 determines whether the above-described steps S511 to S513 are performed for a predetermined number of times according to the luminance value stored in the memory 634 (step S514). If the controlling unit 630 determines "No", the drive controller 633 of the controlling unit 630 drives the jig driver 300A by outputting a predetermined control signal to the jig driver 300A. The pulse motors (not shown) are then driven to turn the turning portions 333 of the second positioning jigs 310 for turning the incident-side polarization plates 242 around the illumination optical axis by a predetermined angle (step S515). Then, the above steps S511 to S513 are performed again.

As described above, the controlling unit 630 controls the jig driver 300A to turn the turning portion 333 of the third positioning jig 330 holding the incident-side polarization plate 242 so that the incident-side polarization plates 242 are turned by a predetermined angle to repeatedly acquire the luminance values in the predetermined area 704 for the predetermined number of times.

Figure 34:
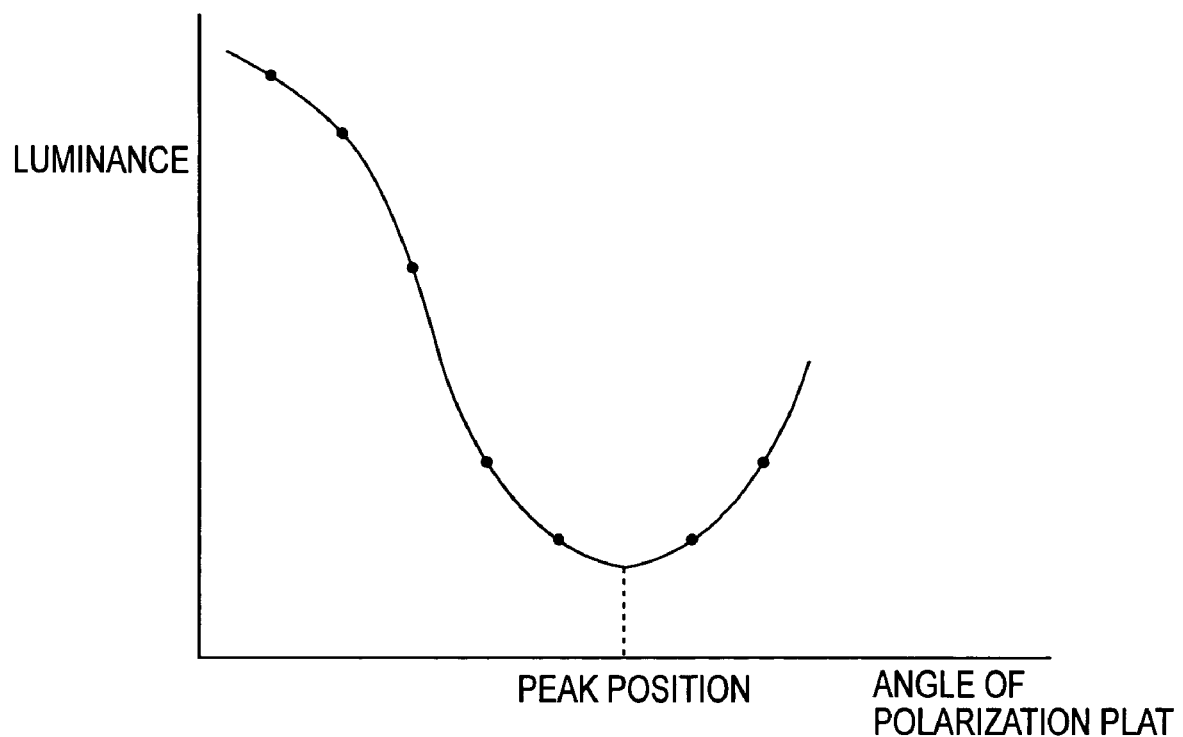
FIG. 34 is an illustration to explain a manufacturing method of the optical unit according to the aforesaid embodiment.

According to such operation, as shown in FIG. 34, a relationship between the attitude positions of the incident-side polarization plates 242 and the luminance values of the picked images 700 can be acquired.

On the other hand, when the controlling unit 630 determines "Yes" in the step S523, or the above operation is performed for the predetermined number of times, the arithmetic unit 632E of the controlling unit 630 reads out the luminance values corresponding to the attitude positions of the incident-side polarization plates 242 associated with the respective R, G and B stored in the memory 634 to compute peak positions of the luminance values relative to the attitude positions of the incident-side polarization plates 242 for the respective R, G and B (step S516). In other words, the computed peak position represents the optimum positions of the incident-side polarization plates 242 for respective red, green and blue lights relative to the liquid crystal panels 241R, 241G and 241B, and the irradiation-side polarization plates 243.

After the step S516, the arithmetic unit 632E computes deviations between the current turn angle positions of the turning portions 333 of the third positioning jigs 330 holding the incident-side polarization plates 242 for the red, green and blue lights, and the respective computed peak positions (step S517). The deviations are then stored in the memory 634. The computed deviations correspond to each position adjustment amount of the incident-side polarization plates 242.

After the step S517, the drive controller 633 drives the jig driver 300A by outputting a predetermined control signal to the jig driver 300A based on the deviations stored in the memory 634. The pulse motors (not shown) are then driven to turn the turning portion 333 of the third positioning jig 330 holding the incident-side polarization plate 242 for each red, green and blue light so that the respective incident-side polarization plates 242 are turned to the optimum positions (step S518).

Incidentally, when the positions of the respective incident-side polarization plates 242 are adjusted, all the incident-side polarization plates 242 can be adjusted at the approximately same time in the above manner, or the respective polarization plates can be adjusted one by one. When the adjustment is performed one by one, the order is not limited particularly.

As described above, after positioning the optical components 212 to 214, 223 and 233 requiring the adjustment, the ultraviolet curing adhesive is irradiated by ultraviolet ray so that the optical components 212 to 214, 223 and 233 are fixed on the container 25A (step S52).

More specifically, the control device 600 drives the ultraviolet irradiator (not shown) after positioning the optical components 212 to 214, 223 and 233. The ultraviolet ray is irradiated from the upper side of the container 25A on the ultraviolet curing adhesive filled between the peripheries of the second lens array 212 and the polarization converter 213; and the respective support portions 251B and 251F (FIG. 4) of the component housing 251 to cure the ultraviolet curing adhesive. Further, the ultraviolet ray is irradiated toward the first fixing members 253 from the lateral side of the container 25A. The irradiated ultraviolet ray passes through the first fixing members 253 to cure the ultraviolet curing adhesive applied between the groove (not shown) of the first fixing members 253 and the respective peripheries of the superposing lens 214 and the relay lens 233; and also the adhesive applied between the peripheries of the first fixing members 253 and the holes 251A. Further, the ultraviolet ray is irradiated toward the second fixing members 254 from the lateral side of the container 25A. The irradiated ultraviolet ray passes through the rectangular frame 254A and the pins (not shown) to cure the ultraviolet curing adhesive applied between the peripheries of the pins and the holes 251C as well as the one applied between the tip ends of the pins and the back side of the reflection face of the reflection mirror 223.

After fixing all the positions of the optical components 211 to 214, 221 to 224, 231 to 234 and 242, and the prism unit on the component housing 251 of the container 25A, the lid 25B is connected to the container 25A by way of screws etc. (step S5) to manufacture the optical unit 2.

(5) Advantages of Embodiment (5-1) The optical component positioning jig 300 includes the first poisoning jig 310 having the first holder 317, the second positioning jig 320 having the second holder 326 and the third positioning jig 330 having the third holder 334, and is mounted and fixed on designed predetermined positions of the optical components 211 to 214, 221 to 224, 231 to 234 and 242 on the first table 210. Accordingly, since the optical component casing 25 may not highly accurately be manufactured, the production cost of the optical component casing 25 can be reduced, and consequently, the production cost of the optical unit 2 can be reduced.

(5-2) Since the first holder 317, the second hold& 326 and the third holder 334 constituting the optical component positioning jig 300 have the first support faces 317A and 327A, the second support faces 317B and 328A, and the third support faces 317C as the external position reference faces for the optical components 211 to 214, 221 to 224, 231 to 234 and 242, the periphery of the optical components 211 to 214, 221 to 224, 231 to 234 and 242 abut on the support faces 317A, 317B, 317C, 327A and 328A, thereby easily positioning the optical components 211 to 214, 221 to 224, 231 to 234 and 242. 221 to 224, 231 to 234 and 242, the periphery of the optical components 11 to 214, 221 to 224, 231 to 234 and 242 abut on the support faces 317A, 317B, 317C, 327A and 328A, thereby easily positioning the optical components 11 to 214, 221 to 224, 231 to 234 and 242.

(5-3) The communication holes 317D and 328B are respectively formed inside the first holder 317, the second holder 326 and the third holder 334 constituting the optical component positioning jig 300. The communication holes 317D and 328B respectively connect the third support face 317C and the second support face 328A at the ends. By the intake of air in the communication holes 317D and 328B with the vacuum pump, the outer periphery of the optical components 211 to 214, 221 to 224, 231 to 234 and 242 can respectively abut on the third support face 317C and the second support face 328A, and thus the optical components 211 to 214, 221 to 224, 231 to 234 and 242 can highly accurately be positioned.

(5-4) The first positioning jig 310 has the Z-axis shifter 312, the X-axis shifter 313 and the shifter 316, and the second positioning jig 320 has the Z-axis shifter 322, the X-axis shifter 323 and the second holder 326, while the second positioning jig 330 has the turning portion 333. Accordingly, by operating the attitude adjusters 312, 313, 316, 322, 323, 326 and 333, the positions of the optical components 212 to 214, 223, 233 and 242 requiring the adjustment can easily be adjusted.

(5-5) Since the optical component positioning jig 300 has the attitude adjusters 312, 313, 316, 322, 323, 326 and 333, the first holder 317, the second holder 326 and the third holder 334 can be arranged at proper positions corresponding to the specifications of the optical unit 2 to be manufactured. Therefore, it can be used for manufacturing various optical units.

(5-6) The manufacturing apparatus 100 of the optical unit 2 includes the optical image detecting device 400. The optical image detecting device 400 directly detects the optical image irradiated by the adjustment light source device 500 and formed by the optical components 211 to 214, 221 to 224, 231 to 234 and 242 and the prism unit in the optical unit 2. Accordingly, as compared to an arrangement that the optical image formed by the optical components 211 to 214, 221 to 224, 231 to 234 and 242 and the prism unit is projected on the screen in an enlarged manner for detecting the optical image projected on the screen, the manufacturing apparatus 100 can be downsized. Further, since the screen is unnecessary, the manufacturing apparatus 100 can be produced at low cost.

(5-7) Since the manufacturing apparatus 100 includes the adjustment light source device 500, there is no need to use the light source device 4 inside the projector 1. That is, it is unnecessary to use a power source and a lamp drive circuit for driving the light source device 4 included in the projector 1, and accordingly there is no need to use a cooling mechanism for cooling the power source, the lamp drive circuit and the light source device upon driving the power source and the lamp drive circuit. Since the illuminance of the adjustment light source device 600 can be adjusted according to the detection sensitivity of the optical image detecting device 400, the optical image can appropriately be detected by the optical image detecting device 400.

(5-8) The first holder 317, the second holder 326 and the third holder 334 constituting the optical component positioning jig 300 can hold the optical components 211 to 214, 221 to 224, 231 to 234 and 242 from the lower side. The table 200 mounts and fixes the optical component positioning jig 300 on the upper side 210B of the first table 210, and also mounts and fixes the container 25A of the optical unit 2 on the upper side 220B of the second table 220. Accordingly, since the optical components 211 to 214, 221 to 224, 231 to 234 and 242 and the container 25A can easily be placed on the manufacturing apparatus 100 from the upper side, the optical unit 2 can be further easily manufactured.

(5-9) The positioning projections 220D are formed on the upper side 220B of the second table 220 for mounting the container 25A at the predetermined position. The container 25A is mounted at the predetermined position on the second table 220 by the positioning projections 220D engaging with the positioning holes 251G formed on the bottom side of the container 25A. Accordingly, since the container 25A can appropriately be placed at the predetermined positions corresponding to the optical components 211 to 214, 221 to 224, 231 to 234 and 242 and the prism unit, the optical unit 2 can highly accurately be manufactured.

(6) Modifications of Embodiment

Incidentally, the scope of the present invention is not restricted to the above embodiment but includes following modifications as long as an object of the present invention can be achieved.

Thought the optical image detecting device 400 directly detects the optical image passed thorough the optical components 211 to 214, 221 to 224, 231 to 234 and 242 and the prism unit in the steps S31 to S33 and S41 to S51 in the above embodiment, it is not limited thereto. For instance, the optical image detected by the optical image detecting device 400 may be output to a monitor or the like so that the positions of the optical components are adjusted while checking the optical image displayed on the monitor with eyes. Alternatively, for example, the manufacturing apparatus 100 may include a screen so that the optical image passed thorough the optical components 211 to 214, 221 to 224, 231 to 234 and 242 and the prism unit is enlarged and projected by the projection lens 3 and projected on the screen. In such constitution including the screen, the optical unit 2 may be manufactured as follows.

Figure 35:
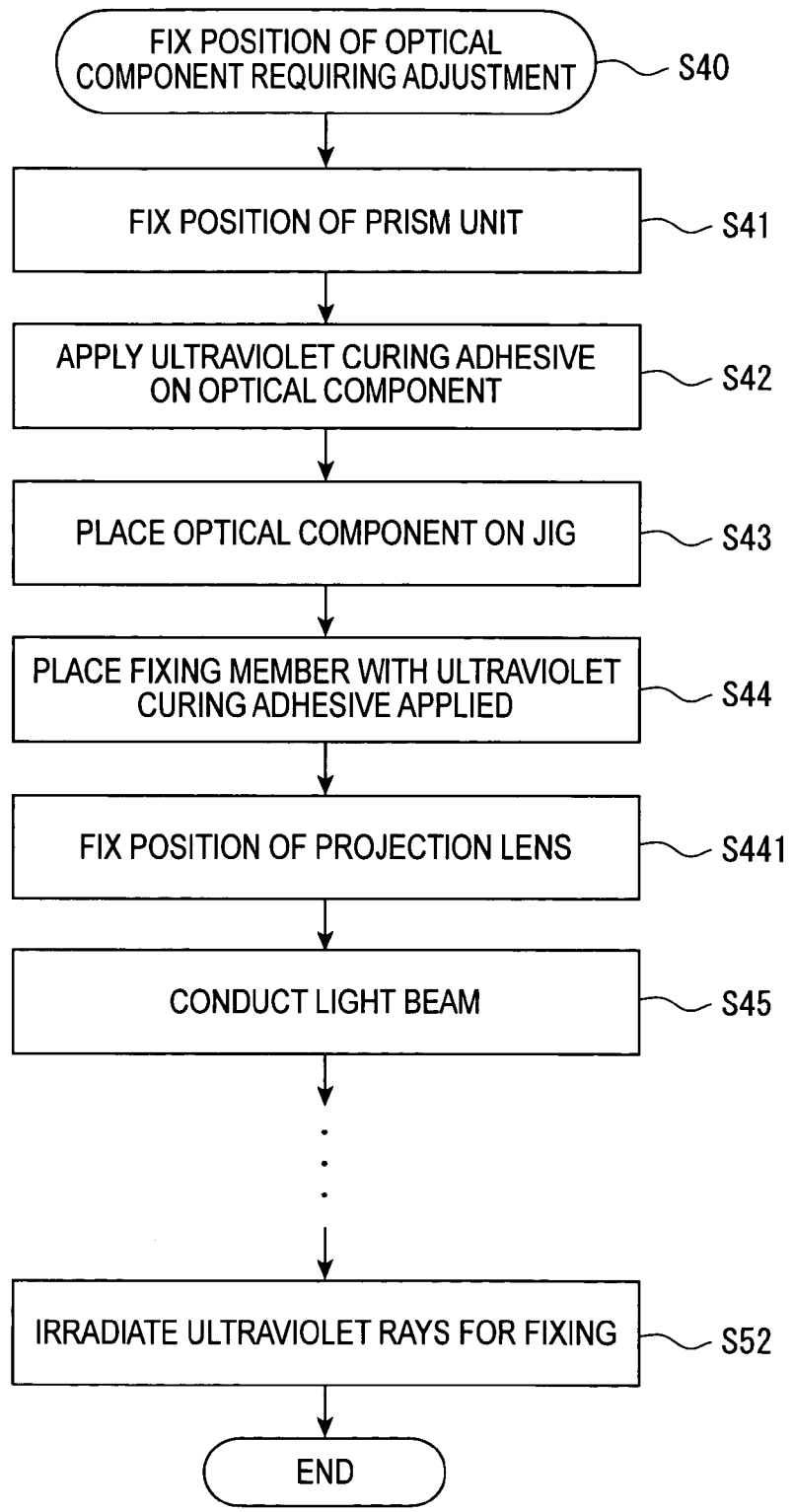
FIG. 35 is a flowchart showing a modification of the manufacturing method of the optical unit according to the aforesaid embodiment.
Figure 36:
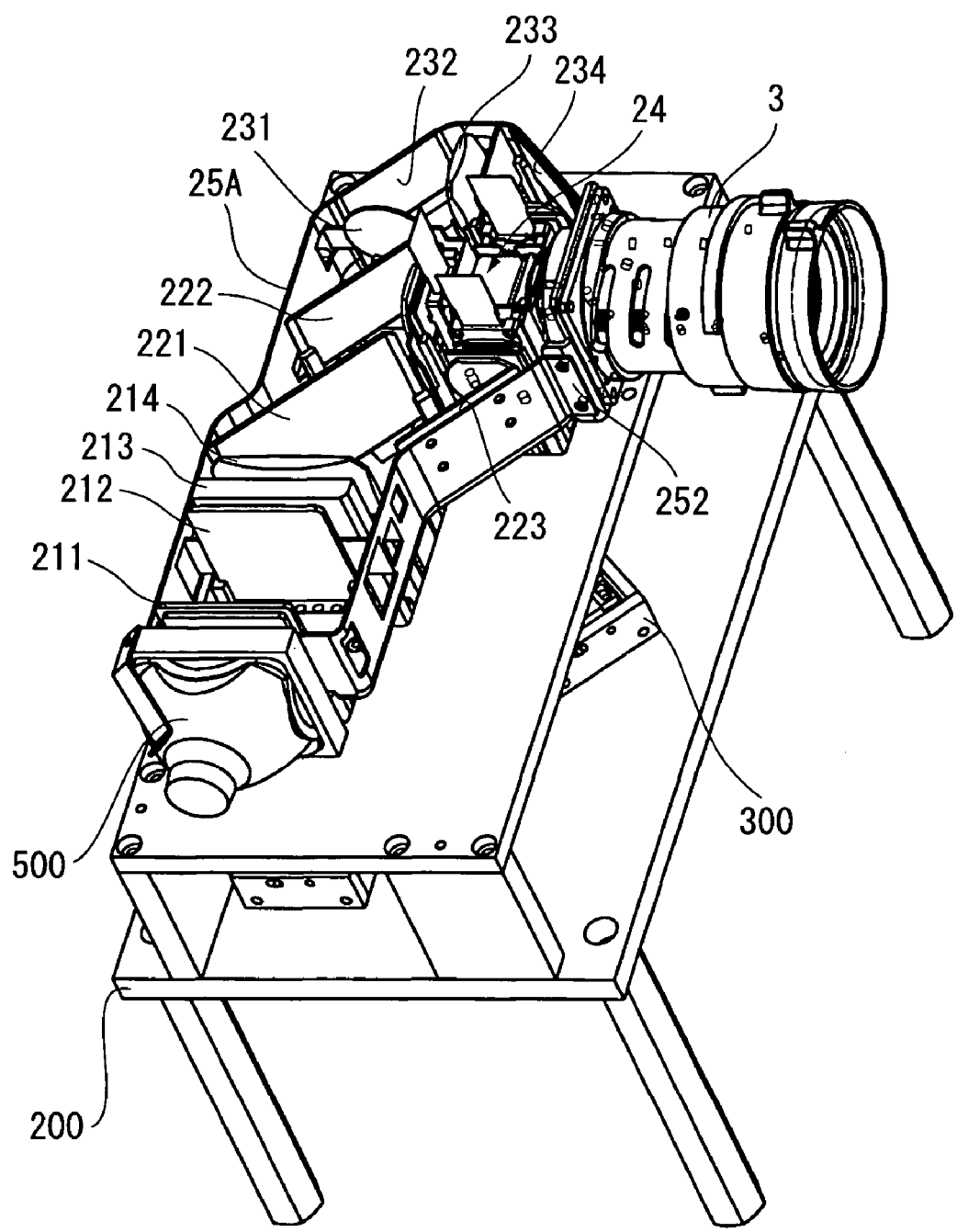
FIG. 36 is an illustration showing the state of a step S441 of FIG. 35.

In the manufacturing method of the optical unit 2, FIG. 35 is a flowchart explaining the operation (step S40) for fixing the positions of the optical components requiring the adjustment, while FIG. 36 is an illustration showing the state of the step S441 of FIG. 35, and FIG. 37 is an illustration showing the state of the step S450 of FIG. 35.

Figure 19:
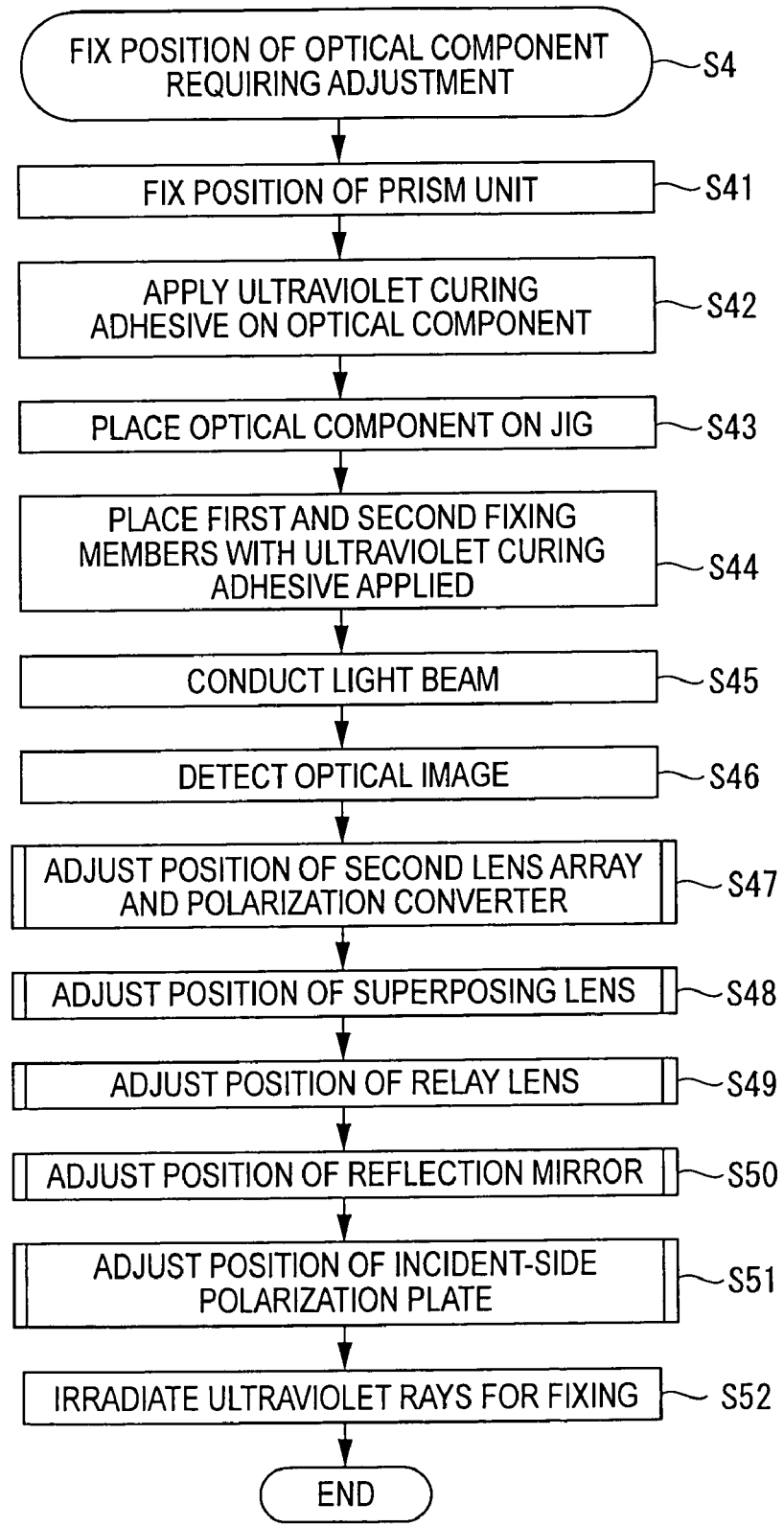
FIG. 19 is a flowchart explaining a manufacturing method of the optical unit according to the aforesaid embodiment.

According to the manufacturing method of the present embodiment, after the above-described step S44 of FIG. 19 as shown in FIG. 35, the position of the projection lens 3 is fixed on the projection lens mount 252 of the container 25A as shown in FIG. 36 (step S441). Incidentally, the position of the projection lens 3 may be fixed on the projection lens mount 252 in advance after the step S2, or the position of the projection lens 3 may be fixed on the projection lens mount 252 after the operation (step 41) for fixing the position of the prism unit.

Thereafter, the adjustment light source device 500 irradiates the light beam (step S450), and the optical image formed by the optical components 211 to 214, 221 to 224, 231 to 234 and 242 and the prism unit is enlarged and projected through the projection lens 3 and projected on the screen 101. The projected image on the screen 101 is detected by the optical image detecting device 400 from the back side of the screen 101, and the above-described steps S46 to S52 shown in FIG. 19 and the step S5 shown in FIG. 16 are performed. Incidentally, after projecting the optical image on the screen 101, the positions of the optical components 212 to 214, 223, 233 and 242 requiring the adjustment may be adjusted by operating the optical component positioning jig 300 while checking the projected optical image with eyes.

The manufacturing operation and the structure of the manufacturing apparatus 100 are the same as the above-described embodiment except those described above.

Thought the optical components 211 to 214, 221 to 224, 231 to 234 and 242 are held by the optical component positioning jig 300 from the lower side, they may be held from the upper side. That is, the container 25A is supported by the second table 220 from the lower side while the optical components 211 to 214, 221 to 224, 231 to 234 and 242 are held by the optical component positioning jig from the upper side. Though the optical component casing holder is configured as the second table 220 to hold the container 25A from the lower side, it may be configured to hold the container 25A from the upper side. That is, the container 25A is held from the upper side while the optical components 211 to 214, 221 to 224, 231 to 234 and 242 are held by the optical component positioning jig from the lower side.

Though the first positioning jig 310 has the Z-axis shifter 312, the X-axis shifter 313 and the shifter 316 as the attitude adjusters, and the second positioning jig 320 has the Z-axis shifter 322, the X-axis shifter 323 and the second holder 326 as the attitude adjusters, and further the third positioning jig 330 has the turning portion 333 as the attitude adjuster in the above embodiment, it is not limited thereto. That is, as long as the optical component positioning jigs 300 can adjust the optical components 212 to 214, 223, 233 and 242 requiring the adjustment, the optical positioning jigs 300 corresponding to the optical components 211, 221, 222, 224, 231, 232, 234 not requiring the adjustment need not have the attitude adjuster.

The attitude adjusting mechanism of the optical component of the first positioning jig 310, the second positioning jig 320 and the third positioning jig is not limited to the above embodiment. Other attitude adjusting mechanism may be applicable.

Though a projector using three optical modulators are taken as an example in the above embodiment, the present invention may be applied to a projector using a single optical modulator, two optical modulators or more than three optical modulators.

Though a liquid crystal panel is used as the optical modulator in the above embodiment, an optical modulator other than the liquid crystal panel such as a device using a micro-mirror may be used.

Though a transmissive optical modulator having different light-incident side and light-irradiation side is used in the above embodiment, a reflective optical modulator having common light-incident side and light-irradiation side may be used.

Though a front-type projector that projects an image in a direction for observing a screen is taken as an example in the above embodiment, the present invention may be applied to a rear-type projector that projects an image in a direction opposite to the direction for observing the screen.

INDUSTRIAL AVAILABILITY

As described above, since the optical component positioning jig of the present invention can reduce the production cost and can easily be manufactured when the optical device is manufactured, it is useful as the optical component positioning jig used in the manufacturing apparatus for manufacturing the optical device.

The invention claimed is:

1. A manufacturing apparatus for manufacturing an optical device including: a plurality of optical components arranged on an optical path of a light beam irradiated by a light source; and an optical component casing in which an illumination optical axis of the light beam is set and the optical components are housed and arranged at predetermined positions on the illumination optical axis, the optical component casing having at least one opening penetrating toward the inside thereof, the manufacturing apparatus comprising:

an optical component positioning jig arranged at designed predetermined positions of the plurality of optical components and having a plurality of holders for holding the plurality of optical components, the optical component positioning jig being capable of adjusting the position of the optical component;

an optical component casing holder for holding the optical component casing so that a part of the optical component positioning jig can be inserted into the opening;

a light beam irradiator for conducting a light beam to the optical device;

an optical image detecting device for detecting an optical image irradiated by the light beam irradiator and passed through the plurality of optical components;

a jig driver that drives the optical component positioning jig; and a controlling unit for controlling the jig driver, the controlling unit including: an image capture that captures an image detected by the optical image detecting device and converts the image into an image signal; a luminance acquiring unit that acquires a luminance value of the image based on the image signal output from the image capture; and an arithmetic unit that computes a position adjustment amount of the optical component based on the luminance value acquired by the luminance acquiring unit.

2. The manufacturing apparatus of the optical device according to claim 1, the controlling unit shifting the optical component to shift an illumination area of the optical image passed through the optical component by controlling the jig driver to drive the optical component positioning jig, the controlling unit including a boundary point acquiring unit that acquires a boundary point of the illumination area based on the luminance value acquired by the luminance acquiring unit, and the arithmetic unit computing a position adjustment amount of the optical component based on the boundary point of the illumination area acquired by the boundary point acquiring unit.

3. The manufacturing apparatus of the optical device according to claim 2, the optical component positioning jig being capable of holding the optical component from the lower side, and the optical component casing holder mounting and fixing the optical component positioning jig thereon, the optical component casing holder including a table on which the optical component casing is mounted.

4. The manufacturing apparatus of the optical device according to claim 1, the optical component positioning jig being capable of holding the optical component from the lower side, and the optical component casing holder mounting and fixing the optical component positioning jig thereon, the optical component casing holder including a table on which the optical component easing is mounted.

5. The manufacturing apparatus of the optical device according to claim 4, a positioning portion for positioning the optical component casing at a predetermined position corresponding to the plurality of optical components being formed on the table.

6. The manufacturing apparatus of the optical device according to claim 1, at least one of the plurality of holders abutting on an outer periphery of the optical component and having a support face as an external position reference face for the optical component.

7. The manufacturing apparatus of the optical device according to claim 6, further comprising:

an intake hole capable of sticking the outer periphery of the optical component thereto being formed on the support face.

8. The manufacturing apparatus of the optical device according to claim 6, further comprising:

an attitude adjuster that changes the position of at least one of the plurality of holders to adjust the attitude of the optical component held by the holder.

9. The manufacturing apparatus of the optical device according to claim 7, further comprising:

an attitude adjuster that changes the position of at least one of the plurality of holders to adjust the attitude of the optical component held by the holder.

10. The manufacturing apparatus of the optical device according to claim 1, further comprising:

a first shifter that moves the holder in Z-axis direction;

a second shifter that moves the holder in X-axis direction; and a third shifter that moves the holder in Y-axis direction and a rotation direction around the Y-axis direction;

the illumination optical axis representing the Z-axis, and two directions orthogonal to each other and orthogonal to the Z-axis representing the X-axis and the Y-axis.

11. The manufacturing apparatus of the optical device according to claim 1, further comprising:

a base, the holder shifting in Y-axis direction relative to the base;

a first shifter that moves the holder in Z-axis direction; and a second shifter that moves the holder in X-axis direction;

the illumination optical axis representing the Z-axis, and two directions orthogonal to each other and orthogonal to the Z-axis representing the X-axis and the Y-axis.

12. The manufacturing apparatus of the optical device according to claim 1, further comprising:

a turning portion that is turnable around the center of the one of the plurality of optical components held by the holder and that is fixed to the holder.

* * * * *